US008356169B2

(12) United States Patent
Ishikawa et al.

(10) Patent No.: US 8,356,169 B2
(45) Date of Patent: *Jan. 15, 2013

(54) ENCRYPTION COMMUNICATION SYSTEM, APPARATUS AND METHOD FOR ALLOWING DIRECT ENCRYPTION COMMUNICATION WITH A PLURALITY OF NODES

(75) Inventors: Yuichi Ishikawa, Tokyo (JP); Norihito Fujita, Tokyo (JP); Akio Iijima, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 1808 days.

This patent is subject to a terminal disclaimer.

(21) Appl. No.: 10/585,997

(22) PCT Filed: Jan. 12, 2005

(86) PCT No.: PCT/JP2005/000219
§ 371 (c)(1),
(2), (4) Date: Jul. 13, 2006

(87) PCT Pub. No.: WO2005/069535
PCT Pub. Date: Jul. 28, 2005

(65) Prior Publication Data
US 2007/0160200 A1 Jul. 12, 2007

(30) Foreign Application Priority Data
Jan. 14, 2004 (JP) ................................. 2004-006541

(51) Int. Cl.
*H04L 29/06* (2006.01)
(52) U.S. Cl. ........ 713/150; 713/176; 713/168; 713/153; 380/255; 380/28; 380/29; 380/30; 726/3; 726/4; 726/5; 709/224; 709/245; 709/219; 709/238; 709/223; 705/44; 705/51; 370/392
(58) Field of Classification Search .................... 380/30
See application file for complete search history.

(56) References Cited

U.S. PATENT DOCUMENTS
5,548,646 A * 8/1996 Aziz et al. ..................... 713/153
(Continued)

FOREIGN PATENT DOCUMENTS
JP 10-112739 A 4/1998
(Continued)

OTHER PUBLICATIONS

Ishikawa et al., "User—customized Network Services provided by Multi-Layer DNS", Technical Report of IEICE, CS2003-81-98, vol. 103, No. 314, The Institute of Elecronics, Information and Communication Engineers, Sep. 12, 2003, pp. 91-94.

(Continued)

*Primary Examiner* — Nathan Flynn
*Assistant Examiner* — Bryan Wright
(74) *Attorney, Agent, or Firm* — Sughrue Mion, PLLC

(57) ABSTRACT

If the communication partner of a client node (A1a) is an encryption communication target node (C1), a DNS Proxy unit (A12a) in the client node rewrites a response to a name resolution request for the communication partner node of an application from the actual IP address of the communication partner node to a loopback address that changes depending on the communication partner. On the basis of the destination loopback address of a data packet transmitted from the application, a communication encryption module (A13a) in the client node identifies the communication partner and the encryption communication path to be used for communication with the communication partner. Hence, encryption communication can simultaneously be executed directly with a plurality of communication partner nodes by using the communication encryption module that operates as an independent process.

53 Claims, 19 Drawing Sheets

U.S. PATENT DOCUMENTS

| | | | |
|---|---|---|---|
| 7,774,592 B2* | 8/2010 | Ishikawa et al. ............... | 713/150 |
| 2003/0048804 A1* | 3/2003 | Inouchi et al. ................. | 370/466 |
| 2004/0039827 A1* | 2/2004 | Thomas et al. ................ | 709/228 |
| 2006/0236124 A1* | 10/2006 | Polozoff et al. ............... | 713/189 |

FOREIGN PATENT DOCUMENTS

| | | | |
|---|---|---|---|
| JP | 11-4249 A | | 1/1999 |
| JP | 2000183951 A | * | 6/2000 |
| JP | 2001320403 A | * | 11/2001 |

OTHER PUBLICATIONS

Fujita et al., "Scalable VPN Architecture using DNS", Proceedings of the 2004 IEICE General Conference, The Institute of Electronics, Information and Communiication Engineers, B-6-200, Mar. 8, 2004, p. 200.

Baba, T. et., al. "Attack the internet from the right angle!" Complete explanation about the mechanism of DNS, Adjust DNS to IPv6, Network World, 8th Edition, vol. 8, No. 3, Mar. 1, 2003, pp. 74-80.

Nakajima, H. et., al. "Secure communication of autonomously selecting encryption key which enable overlapping CUGs" Proceedings of the 1997 Communications Society Conference of the IEICE, Communications Society, The Institute of Electronics, Information and Communication Engineers, Aug. 13, 1997, p. 220, pp. 1-12.

Yamai, N. et., al. "A Management and Operation Method of DNS for Alias Domain Names" Information Processing Society Journal, vol. 43, No. 11, Nov. 15, 2002, pp. 3458-3467.

* cited by examiner

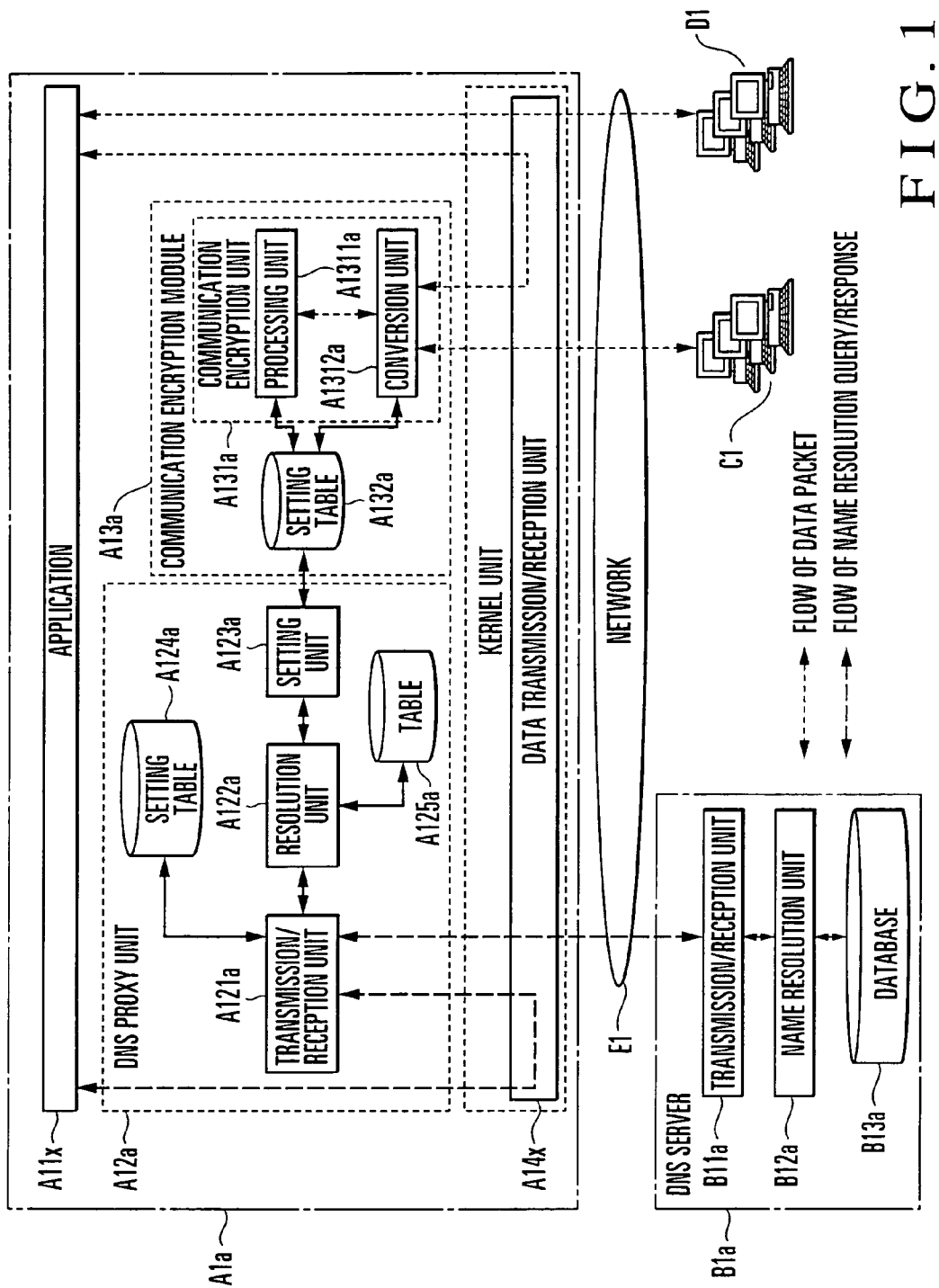

| LOOPBACK ADDRESS | COMMUNICATION PARTNER IP ADDRESS | ENCRYPTION COMMUNICATION PATH SETTING INFORMATION | | |
|---|---|---|---|---|
| | | COMMUNICATION PROTOCOL | DIGITAL CERTIFICATE ID | ENCRYPTION ALGORITHM |
| ... | ... | ... | ... | ... |
| 127.1.1.1 | 133.11.64.24 | SSL | 10 | 3DES |
| 127.2.2.2 | 19.23.43.13 | IPSec | 15 | AES |
| 127.3.3.3 | 1.3.3.2 | SSL | 11 | DES |
| ... | ... | ... | ... | ... |

FIG. 2

| CUG IDENTIFICATION INFORMATION | ENCRYPTION COMMUNICATION PATH SETTING INFORMATION | | |
|---|---|---|---|
| DOMAIN NAME | COMMUNICATION PROTOCOL | DIGITAL CERTIFICATE ID | ENCRYPTION ALGORITHM |
| ... | ... | ... | ... |
| taro.nec.co.jp | SSL | 10 | 3DES |
| jiro.biglobe.ne.jp | IPSec | 15 | AES |
| *.myfriends.com | SSL | 11 | DES |
| *.myfamily.com | IPSec | 12 | 3DES |
| sato.* | SSL | 13 | DES |
| *.satofamily.* | SSL | 14 | AES |
| ... | ... | ... | ... |

FIG. 3

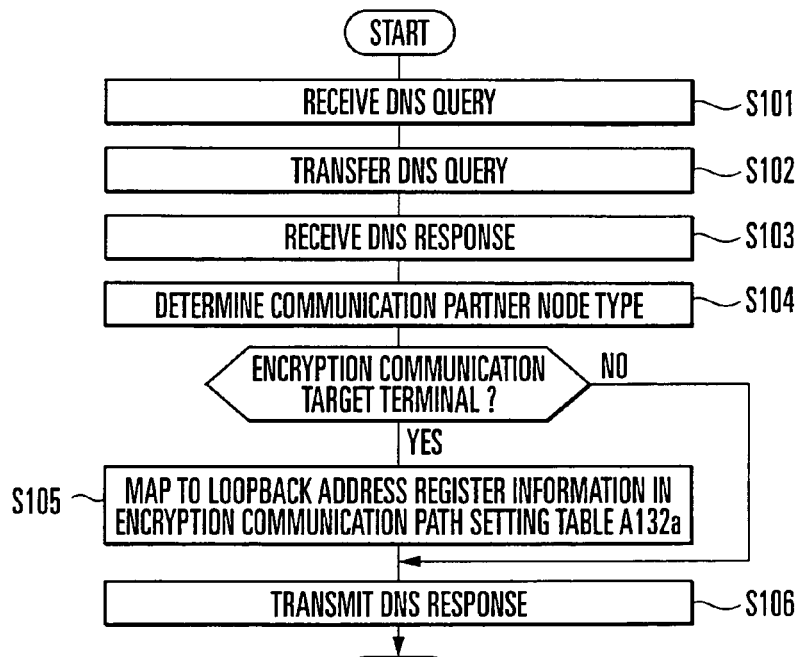

FIG. 4

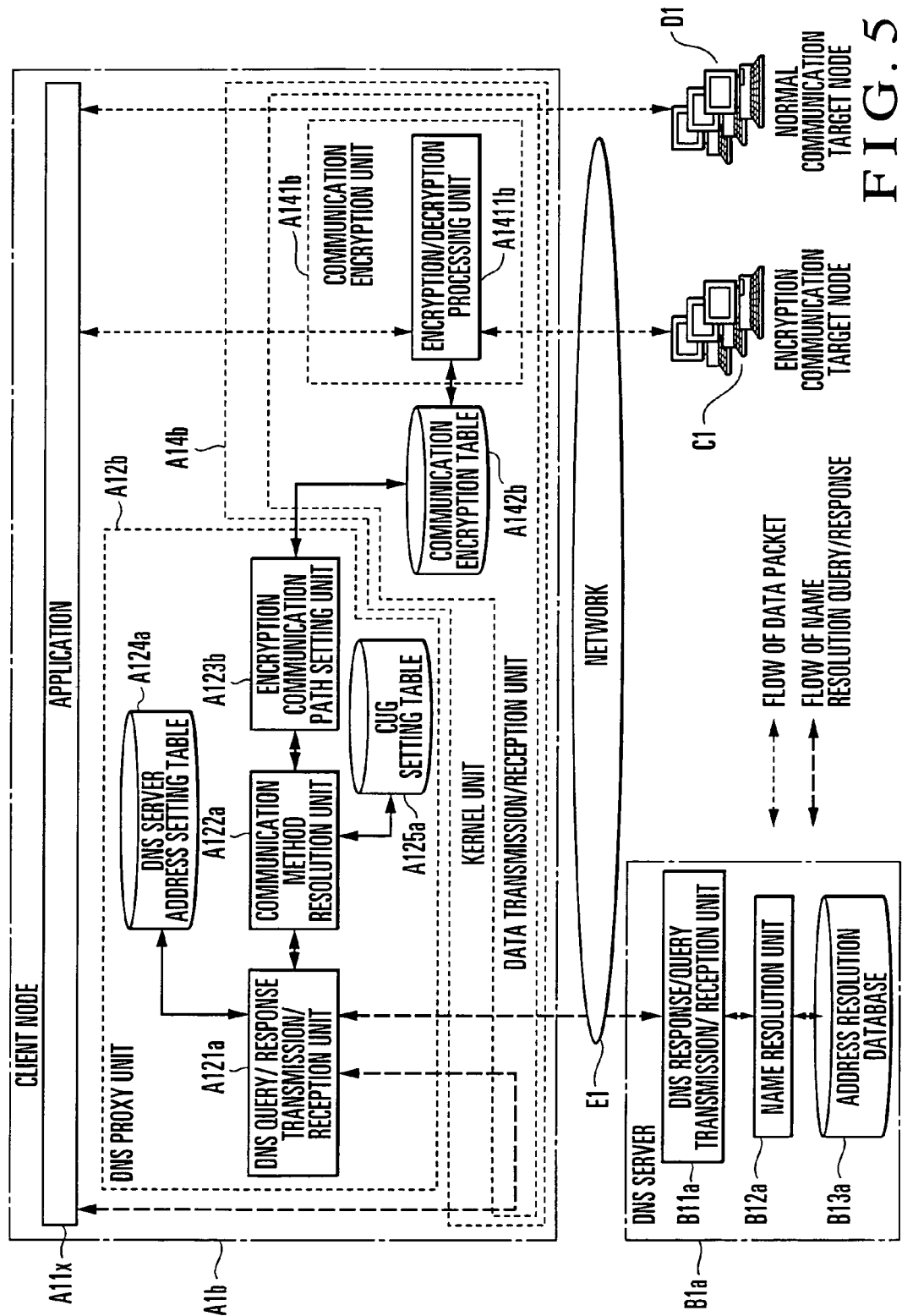

| COMMUNICATION PARTNER IP ADDRESS | ENCRYPTION COMMUNICATION PATH SETTING INFORMATION | | |
|---|---|---|---|
| | COMMUNICATION PROTOCOL | DIGITAL CERTIFICATE ID | ENCRYPTION ALGORITHM |
| ... | ... | ... | ... |
| 133.11.64.24 | IPSec | 10 | 3DES |
| 19.23.43.13 | IPSec | 15 | AES |
| 1.3.3.2 | IPSec | 11 | DES |
| ... | ... | ... | ... |

301

| CUG IDENTIFICATION INFORMATION | ENCRYPTION COMMUNICATION PATH SETTING INFORMATION | | |
|---|---|---|---|
| DOMAIN NAME | COMMUNICATION PROTOCOL | DIGITAL CERTIFICATE ID | ENCRYPTION ALGORITHM |
| ... | ... | ... | ... |
| taro.nec.co.jp | SSL | 10 | 3DES |
|  | IPSec | 13 | AES |
| jiro.biglobe.ne.jp | IPSec | 15 | AES |
| *.myfriends.com | SSL | 11 | DES |
| *.myfamily.com | IPSec | 12 | 3DES |
| ... | ... | ... | ... |

401

| INTERCEPT ADDRESS | COMMUNICATION PARTNER IP ADDRESS | ENCRYPTION COMMUNICATION PATH SETTING INFORMATION | | |
|---|---|---|---|---|
| | | COMMUNICATION PROTOCOL | DIGITAL CERTIFICATE ID | ENCRYPTION ALGORITHM |
| ... | ... | ... | ... | ... |
| fe80::3090 | aa91::1001 | SSL | 10 | 3DES |
| fe81::3091 | bb92::1002 | IPSec | 15 | AES |
| ... | ... | ... | ... | ... |

601

F I G. 15

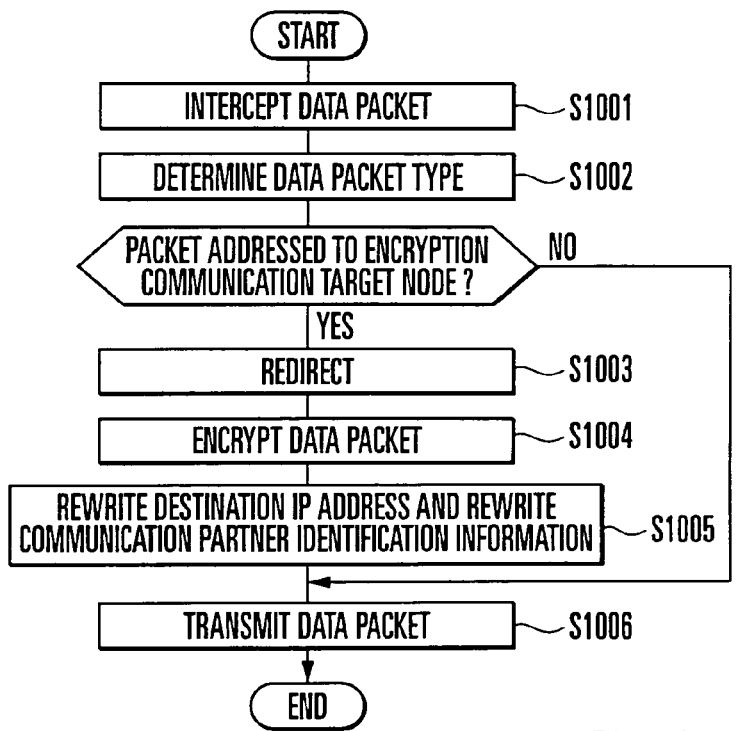

ENCRYPTION COMMUNICATION SYSTEM, APPARATUS AND METHOD FOR ALLOWING DIRECT ENCRYPTION COMMUNICATION WITH A PLURALITY OF NODES

This application claims priority from PCT Application No. PCT/JP2005/000219 filed Jan. 12, 2005, and from Japanese Patent Application No. 2004-006541 filed Jan. 14, 2004, which applications are incorporated herein by reference.

TECHNICAL FIELD

The present invention relates to an encryption communication method and encryption communication system which execute, on an open network to which many and unspecified nodes are connected, secure communication between a plurality of nodes belonging to a specific group, a node apparatus, a name resolution server, and a program for implementing them.

BACKGROUND ART

Conventionally, on an open network (e.g., Internet or public hot spot) to which many and unspecified nodes are connected, various encryption communication methods are used to encrypt communication between nodes such as nodes, servers, and gateway apparatuses and provide a secure communication path to prevent any third party from peeping the communication contents, as described in, e.g., RFC2401 or RFC3546.

Encryption communication protocols to implement an encryption communication method of this type are roughly classified in the following way depending on the layer to be encrypted.

Layer 4 (Transport Layer) and Upper Layers
SSL (Secure Socket Layer), TLS (Transport Layer Security), SSH (Secure Shell)
Layer 3 (Network Layer) and Lower Layers
IPsec, L2TP (Layer 2 Tunneling Protocol) over IPsec, Ethernet® over IPsec In encryption communication with another node by using these encryption communication protocols, the conventional encryption communication methods can be classified into the following three types depending on the forms of communication encryption.

(1) A form to encrypt communication in individual applications such as an Web browser and e-mail application (2) A form to encrypt communication by using a communication encryption module (3) A form to encrypt communication by using a function provided by the kernel unit of an OS (Operating System)

The encryption communication method of form (1) uses the above-described communication encryption protocol for layer 4 and upper layers. For example, to encrypt HTTP (Hyper Text Transfer Protocol) communication with a communication partner having a domain name "example.com", a URL (Universal Resource Locator) such as "https://example.com/index.html" is input in a Web browser to encrypt the HTTP communication with the communication partner by SSL. Such a communication encryption form cannot be used unless the application supports the communication encryption protocol, as a matter of course.

In communication encryption of form (2) using a communication encryption module, the above-described communication encryption protocol for layer 4 and upper layers is mainly used. The communication encryption module operates as an independent process. The communication encryption module intercepts data packets transmitted/received between an application and a communication partner, encrypts/decrypts the packets, and transmits them to the communication partner/application. Examples of the communication encryption module are stunnel that SSL-encrypts an arbitrary TCP (Transport Control Protocol) connection and SSH port forwarding to encryption-tunnel an arbitrary TCP connection by SSH.

The communication encryption method of form (2) can encrypt communication of an arbitrary application because the method can encrypt communication independently of whether an application supports the communication encryption protocol, like the communication encryption method of form (3). This communication encryption form can encrypt communication with consciousness of an application, unlike the communication encryption method of form (3). Hence, only communication of a specific application can be done.

FIG. 25 shows the outline of communication encryption processing by the communication encryption method of form (2). A communication encryption module A13x includes a communication encryption unit A131x to execute communication encryption processing, and an encryption communication path setting table A132x in which only a set of the address of a target node (to be referred to as an encryption communication target node) C1 of encryption communication and encryption communication path setting information is registered. The communication encryption module A13x operates as an independent process by itself. To cause the communication encryption module A13x to execute communication encryption processing of a data packet transmitted from an application A11x, the application A11x temporarily transfers the data packet to the communication encryption module A13x to execute necessary encryption processing. After that, the communication encryption module A13x transmits the data packet to the actual communication partner, Hence, the application A11x transmits the data packet by designating the loopback address, i.e., "127.0.0.1" (and the reception port number of the process (communication encryption module) as needed) as the destination address, instead of directly designating the IP address of the actual communication partner, such that the communication encryption module A13x can receive the data packet. Upon receiving the data packet from the application A11x, the communication encryption module A13x causes an encryption/decryption processing unit A1311x of the communication encryption unit A131x to encrypt the data packet (by using protocol: SSL, encryption algorithm: DES, and digital certificate ID: 11 in FIG. 25) in accordance with encryption communication path setting information for the preset communication partner (node of IP address "1.2.3.4" in FIG. 25) by looking up the encryption communication path setting table A132x. Then, the communication encryption module A13x causes an address conversion unit A1312x to rewrite the destination to IP address "1.2.3.4" and transmits the data packet.

The encryption communication method of form (2) may employ the arrangement with a client node A1x incorporating the communication encryption module A13x, as shown in FIG. 25, or an arrangement in which the communication encryption module is provided as a communication encryption proxy node by an external node. In this case, the application transmits a data packet by designating the IP address of the external node to the destination address. The communication encryption module executes necessary encryption processing for the received data packet and transmits it to a preset communication partner (the IP address of the encryption communication target node is designated).

In the encryption communication method of form (3) which executes communication encryption by using a function provided by the kernel unit of an OS, the above-described communication encryption protocol for layer 3 and lower layers is mainly used. For example, to encrypt all IP packets to a communication partner having an IP address "1.2.3.4", IPsec setting in a transport mode or tunneling mode is done for the communication partner (IP address=1.2.3.4) in OS setting.

The encryption communication method of form (3) can encrypt communication of an arbitrary application because the method can encrypt communication independently of whether an application supports the communication encryption protocol, like the encryption communication method of form (2). However, in the communication encryption form (3), generally, communication with a communication partner having a preset IP address is totally encrypted without consciousness of an application, unlike the encryption communication method of form (2). Hence, it is therefore impossible to encrypt only communication of a specific application.

FIG. 26 shows the outline of communication encryption processing by the encryption communication method of form (3). A communication encryption unit A141y to execute communication encryption processing and an encryption communication path setting unit A142y in which the address of an encryption communication target node and encryption communication path setting information are registered are included in a data transmission/reception unit A14y in the kernel unit of an OS. All data packets transmitted from the application A11x are transferred to the data transmission/reception unit A14y for transmission processing. The communication encryption unit A141y in the data transmission/reception unit A14y refers to the encryption communication path setting unit A142y on the basis of the destination address of the data packet. When the destination address is registered as an encryption communication target node (when the destination address is "1.2.3.4" or "5.6.7.8" in FIG. 26), the data packet is encrypted in accordance with the registered encryption communication path setting information (protocol: IPsec, encryption algorithm: DES, and digital certificate ID: 11 in FIG. 25) and transmitted to the communication partner.

DISCLOSURE OF INVENTION

Problem to be Solved by the Invention

The above-described encryption communication method using a communication encryption module is advantageous because it can encrypt only communication of a specific application and also implement communication encryption independently of whether an application supports a communication encryption protocol. However, encryption communication can be done only with a single communication partner preset in the communication encryption module. The reason is as follows.

A communication encryption module of layer 4 level can set a communication partner for each destination port. However, only a single communication partner can be set in correspondence with one destination port. That is, an application can execute encryption communication only with a single preset communication partner unless the destination port number is changed for each communication partner. However, it is fundamentally impossible to change the destination port for each communication partner (because a default port number is determined for each protocol, e.g., No. 80 for http and No. 25 for smtp). For this reason, the encryption communication method provided by the conventional communication encryption module only provides an encryption communication path to a single node and cannot be used for encryption communication using a plurality of encryption communication paths.

It is an object of the present invention to provide an encryption communication method using a communication encryption module which allows direct encryption communication with a plurality of nodes by forming encryption communication paths for the plurality of nodes.

Means of Solution to the Problem

According to the present invention, there is provided an encryption communication method characterized by comprising the step a of causing an application to transmit a data packet in which a loopback address serving as an IP address for closed communication in a self node is set as a destination address, the application executing encryption communication with another node apparatus connected to a network, and the step b of causing a communication encryption module operating as an independent process to receive the data packet having the loopback address set as the destination address and transmitted from the application, read out a communication partner IP address corresponding to the loopback address set as the destination address of the data packet from a first encryption communication path setting table that holds a plurality of correspondences between the communication partner IP address and the loopback address, rewrite the destination address of the data packet to the readout communication partner IP address, and encrypt and transmit the data packet.

According to the present invention, there is provided an encryption communication method characterized by comprising the step a of causing an application on a client node to transmit a data packet in which a first intercept address is set as a destination address, the application executing encryption communication with another node apparatus connected to a network, and the step b of causing a communication encryption module provided in a communication encryption node and operating as an independent process to receive the data packet having the first intercept address set as the destination address and transmitted from the application, read out a communication partner IP address corresponding to the first intercept address set as the destination address of the data packet from a first encryption communication path setting table that holds a plurality of correspondences between the communication partner IP address and the first intercept address, and encrypt and transmit the data packet in which the readout communication partner IP address is set as the destination address of the data packet.

According to the present invention, there is provided an encryption communication method characterized by comprising the step a of causing an application to transmit a data packet in which an IP address of another node apparatus is set as a destination address, the application executing encryption communication with the other node apparatus connected to a network, the step b of causing a redirection unit provided in a data transmission/reception unit of a kernel unit to intercept the data packet transmitted from the application to the other node apparatus, look up a redirection table that holds a criterion to determine a data packet to be encrypted and a rewrite rule of communication partner identification information, determine on the basis of the criterion held in the redirection table whether the data packet is the data packet to be encrypted, and if the data packet is the data packet to be encrypted, rewrite predetermined information of the data packet in accordance with the rewrite rule and redirect the data packet to a communication encryption module, and the step c of causing the communication encryption module to rewrite the communication partner identification information of the data packet redirected from the data transmission/reception unit by looking up an encryption communication path setting table that stores a correspondence between the rewrite rule of the communication partner identification information of the data packet redirected from the data transmission/reception unit and an IP address of another node apparatus of the application, encrypt the data packet in which the destination IP address of the other node apparatus is set, and transmit the data packet to the other node apparatus.

According to the present invention, there is provided an encryption communication method characterized by comprising the step a of causing an application on a client node to transmit a data packet in which an intercept address corresponding to an IP address of another node apparatus is set as a destination address, the application executing encryption communication with the other node apparatus connected to a network, the step b of causing a redirection unit provided in a data transmission/reception unit of a kernel unit in a communication encryption node to intercept the data packet transmitted from the application, look up a redirection table that holds a criterion to determine a data packet to be encrypted and a rewrite rule of communication partner identification information, determine on the basis of the criterion held in the redirection table whether the data packet is the data packet to be encrypted, and if the data packet is the data packet to be encrypted, rewrite predetermined information of the data packet in accordance with the rewrite rule and redirect the data packet to a communication encryption module provided in the communication encryption node, and the step c of causing the communication encryption module to rewrite the communication partner identification information of the data packet redirected from the data transmission/reception unit by looking up an encryption communication path setting table that stores a correspondence between the rewrite rule of the communication partner identification information of the data packet redirected from the data transmission/reception unit and an IP address of another node apparatus of the application, encrypt the data packet in which the destination IP address of the other node apparatus is set, and transmit the data packet to the other node apparatus.

According to the present invention, there is provided a node apparatus characterized by comprising an application that communicates with another node apparatus connected to a network, and a communication encryption module which operates as an independent process, the communication encryption module comprising a first encryption communication path setting table which holds a correspondence between a communication partner IP address and a loopback address serving as an IP address for closed communication in a self node, and a first communication encryption unit which receives the data packet having the loopback address set as the destination address and transmitted from the application, reads out a communication partner IP address corresponding to the loopback address set as the destination address of the data packet from the first encryption communication path setting table, rewrites the destination address of the data packet to the readout communication partner IP address, and encrypts and transmits the data packet.

According to the present invention, there is provided a node apparatus characterized by comprising an application that communicates with another node apparatus connected to a network, a communication encryption module which operates as an independent process, and a data transmission/reception unit provided in a kernel unit, the data transmission/reception unit comprising a redirection table which holds a criterion to determine a data packet to be encrypted and a rewrite rule of communication partner identification information, and a redirection unit which intercepts a data packet transmitted from the application to the other node apparatus, determines on the basis of the criterion held in the redirection table whether the data packet is the data packet to be encrypted, and if the data packet is the data packet to be encrypted, rewrites predetermined information of the data packet in accordance with the rewrite rule and redirects the data packet to the communication encryption module, and the communication encryption module comprising an encryption communication path setting table which holds a correspondence between the rewrite rule of the communication partner identification information of the data packet redirected from the data transmission/reception unit and an IP address of the other node apparatus of the application, and a communication encryption unit which rewrites the communication partner identification information of the data packet redirected from the data transmission/reception unit by looking up the encryption communication path setting table, encrypts the data packet in which a destination IP address of the other node apparatus is set, and transmits the data packet to the other node apparatus.

According to the present invention, there is provided a communication encryption node apparatus connected, through a network, to a client node apparatus in which an application that communicates with another node apparatus connected to the network operates, characterized by comprising a communication encryption module which operates as an independent process, the communication encryption module comprising a first encryption communication path setting table which holds a correspondence between a communication partner IP address and a first intercept address, and a first communication encryption unit which receives a data packet having the first intercept address set as a destination address and transmitted from the application, reads out, from the first encryption communication path setting table, a communication partner IP address corresponding to the first intercept address set as the destination address of the data packet, and encrypts and transmits the data packet in which the readout communication partner IP address is set as the destination address of the data packet.

According to the present invention, there is provided a communication encryption node apparatus connected, through a network, to a client node apparatus in which an application that communicates with another node apparatus connected to the network operates, characterized by comprising a communication encryption module which operates as an independent process, a data transmission/reception unit provided in a kernel unit, and a name resolution proxy unit which relays a name resolution query transmitted from the application to a name resolution server to resolve an IP address of the other node apparatus and a name resolution response as a response to the name resolution query, the data transmission/reception unit comprising a redirection table which holds a correspondence between an intercept address and a loopback address serving as an IP address for closed communication in a self node, and a redirection unit which receives a data packet having the intercept address set as a destination address and transmitted from the application, reads out, from the redirection table, a loopback address corresponding to the intercept address set as the destination address of the data packet, and redirects the data packet to the communication encryption module by rewriting the destination address of the data packet to the readout loopback address, the communication encryption module comprising an encryption communication path setting table which holds a correspondence between a communication partner IP address, a loopback address, and encryption communication path setting information to be used for communication with a communication partner, and a communication encryption unit which reads out, from the encryption communication path setting table, encryption communication path setting information and a communication partner IP address corresponding to the loopback address set as the destination address of the data packet redirected from the data transmission/reception unit, encrypts the data packet in which the readout communication partner IP address is set as the destination address of the data packet in accordance with the readout encryption communication path setting information, and transmits the data packet, and the name resolution proxy unit comprising a setting table which holds a correspondence between a specifying condition to specify an encryption communication target node and encryption communication path setting information, a communication method resolution unit which determines whether information of the other node apparatus contained in one of the name resolution query and the name resolution response matches any one of specifying conditions held in the setting table, an encryption communication path setting unit which registers, in the encryption communication path setting table, a correspondence between encryption communication path setting information corresponding to the matched specifying condition, the IP address of the other node apparatus resolved by the name resolution response, and a loopback address that is not used in any other communication session, and registers, in the redirection table, a correspondence between the loopback address in the correspondence and an intercept address that is not used in any other communication session, and a name resolution query/response transmission/reception unit which transmits, to the application as the name resolution response, an intercept address corresponding to the IP address of the other node apparatus contained in the name resolution response received from the name resolution server.

According to the present invention, there is provided a communication encryption node apparatus connected, through a network, to a client node apparatus in which an application that communicates with another node apparatus connected to the network operates, characterized by comprising a communication encryption module which operates as an independent process, a data transmission/reception unit provided in a kernel unit, and a name resolution proxy unit which relays a name resolution query transmitted from the client node to a name resolution server to resolve an IP address of the other node apparatus and a name resolution response as a response to the name resolution query, the data transmission/reception unit comprising a redirection table which holds a correspondence between an intercept address and a rewrite rule of communication partner identification information, and a redirection unit which intercepts a data packet transmitted from the client node apparatus to the other node apparatus, and redirects the data packet to the communication encryption module by rewriting the communication partner identification information of the data packet in accordance with the rewrite rule of the communication partner identification information corresponding to an intercept address designated as a destination address of the data packet upon looking up the redirection table and by rewriting the destination address of the data packet to a loopback address serving as an IP address for closed communication in a self node, the communication encryption module comprising an encryption communication path setting table which holds a correspondence between a communication partner IP address, communication partner identification information, and encryption communication path setting information to be used for communication with a communication partner, and a communication encryption unit which reads out, from the encryption communication path setting table, encryption communication path setting information and a communication partner IP address corresponding to the communication partner identification information of the data packet redirected from the data transmission/reception unit, rewrites the destination address of the other node apparatus to the readout communication partner IP address, encrypts the data packet in accordance with the readout encryption communication path setting information, and transmits the data packet, and the name resolution proxy unit comprising a name resolution query/response transmission/reception unit which transmits, to the name resolution server, the name resolution query transmitted from the application to resolve the IP address of the other node apparatus, receives, from the name resolution server, the name resolution response containing a determination result indicating whether the other node apparatus is an encryption communication target node, encryption communication path setting information, and the IP address of the other node apparatus, replaces the IP address of the other node apparatus contained in the name resolution response with the intercept address in the correspondence between the encryption communication path setting information, the IP address of the other node apparatus resolved by the name resolution response, and an intercept address that is not used in any other communication session, and transmits the name resolution response to the client node apparatus if the other node apparatus is an encryption communication target node, and an encryption communication path setting unit which registers, in the encryption communication path setting table, a correspondence between the encryption communication path setting information, the IP address of the other node apparatus resolved by the name resolution response, and communication partner identification information that is not used in any other communication session, and registers, in the redirection table, a correspondence between a rewrite rule to the communication partner identification information that is not used in any other communication session and the intercept address that is not used in any other communication session if the other node apparatus is the encryption communication target node.

According to the present invention, there is provided a name resolution server characterized in that, for a name resolution query to resolve an IP address corresponding to a domain name, whether communication to be executed in a query source of the name resolution query by using a response result to the name resolution query is a target to be encrypted is identified on the basis of the domain name, and if it is determined that the communication is an encryption communication target, a name resolution response containing information necessary for the encryption communication in addition to the IP address corresponding to the domain name is returned.

According to the present invention, there is provided an encryption communication system characterized by comprising a node apparatus in which an application that communicates with another node apparatus connected to a network operates, and a name resolution server to cause the application to resolve an IP address of the other node apparatus, the node apparatus comprising a communication encryption module which operates as an independent process, and the communication encryption module comprising a first encryption communication path setting table which holds a correspondence between a communication partner IP address and a loopback address serving as an IP address for closed communication in a self node, and a first communication encryption unit which receives a data packet having the loopback address set as a destination address and transmitted from the application, reads out, from the first communication encryption path setting table, a communication partner IP address corresponding to the loopback address set as the destination address of the data packet, rewrites the destination address of the data packet to the readout communication partner IP address, and encrypts and transmits the data packet.

According to the present invention, there is provided an encryption communication system characterized by comprising a client node apparatus in which an application that communicates with another node apparatus connected to a network operates, a communication encryption node apparatus connected to the client node apparatus through the network, and a name resolution server to cause the application to resolve an IP address of the other node apparatus, the communication encryption node apparatus comprising a communication encryption module which operates as an independent process, and a name resolution proxy unit which relays the name resolution query transmitted from the application to the name resolution server to resolve the IP address of the other node apparatus and the name resolution response as the response to the name resolution query, and the communication encryption module comprising a first encryption communication path setting table which holds a correspondence between a communication partner IP address and a first intercept address, and a first communication encryption unit which receives a data packet having the first intercept address set as a destination address and transmitted from the application, reads out, from the first encryption communication path setting table, a communication partner IP address corresponding to the first intercept address set as the destination address of the data packet, and encrypts and transmits the data packet in which the readout communication partner IP address is set as the destination address of the data packet.

According to the present invention, there is provided an encryption communication system characterized by comprising a node apparatus in which an application that communicates with another node apparatus connected to a network operates, and a name resolution server to cause the application to resolve an IP address of the other node apparatus, the node apparatus comprising a communication encryption module which operates as an independent process, a data transmission/reception unit provided in a kernel unit, and a name resolution proxy unit which relays a name resolution query transmitted from the application to the name resolution server to resolve an IP address of the other node apparatus and a name resolution response as a response to the name resolution query, the data transmission/reception unit comprising a redirection table which holds a correspondence between an IP address of an encryption communication target node and a rewrite rule of communication partner identification information, and a redirection unit which intercepts a data packet transmitted from the application to the other node apparatus, determines whether the data packet is an encryption target by comparing a destination IP address of the data packet with the IP address of the encryption communication target node registered in the redirection table, and if the data packet is the encryption target, redirects the data packet to the communication encryption module by rewriting the communication partner identification information of the data packet in accordance with the rewrite rule of the corresponding communication partner identification information on the redirection table and rewriting the destination address of the data packet to a loopback address serving as an IP address for closed communication in a self node, the communication encryption module comprising an encryption communication path setting table which holds a correspondence between a communication partner IP address, communication partner identification information, and encryption communication path setting information to be used for communication with a communication partner, and a communication encryption unit which reads out, from the encryption communication path setting table, encryption communication path setting information and a communication partner IP address corresponding to the communication partner identification information of the data packet redirected from the data transmission/reception unit, rewrites the destination address of the other node apparatus to the readout communication partner IP address, encrypts the data packet in accordance with the readout encryption communication path setting information, and transmits the data packet, and the name resolution server comprising, in addition to a function related to name resolution, a setting table which holds a correspondence between a specifying condition to specify an encryption communication target node and encryption communication path setting information, a communication method resolution unit which determines whether information of the other node apparatus contained in one of the name resolution query and the name resolution response matches any one of specifying conditions held in the setting table, and a name resolution response/query transmission/reception unit which adds encryption communication path setting information corresponding to the matched specifying condition to the name resolution response and transmits the name resolution response, and the name resolution proxy unit comprising an encryption communication path setting unit which registers, in the encryption communication path setting table, a correspondence between the encryption communication path setting information, the IP address of the other node apparatus resolved by the name resolution response, and communication partner identification information that is not used in any other communication session, and registers, in the redirection table, a correspondence between IP address of the encryption communication target node and a rewrite rule of communication partner identification information that is not used in any other communication session upon receiving the name resolution response added the encryption communication path setting information from the name resolution server, and a name resolution query/response transmission/reception unit which transmits, to the application as the name resolution response, the IP address of the other node apparatus contained in the name resolution response received from the name resolution server.

According to the present invention, there is provided an encryption communication system characterized by comprising a client node apparatus in which an application that communicates with another node apparatus connected to a network operates, a communication encryption node apparatus connected to the client node apparatus through the network, and a name resolution server to cause the application to resolve an IP address of the other node apparatus, the communication encryption node apparatus comprising a communication encryption module which operates as an independent process, a data transmission/reception unit provided in a kernel unit, and a name resolution proxy unit which relays a name resolution query transmitted from the client node to a name resolution server to resolve an IP address of the other node apparatus and a name resolution response as a response to the name resolution query, the data transmission/reception unit comprising a redirection table which holds a correspondence between an intercept address and a rewrite rule of communication partner identification information, and a redirection unit which intercepts a data packet transmitted from the client node apparatus to the other node apparatus, and redirects the data packet to the communication encryption module by rewriting the communication partner identification information of the data packet in accordance with the rewrite rule of the communication partner identification information corresponding to an intercept address designated as a destination address of the data packet upon looking up the redirection table and by rewriting the destination address of the data packet to a loopback address serving as an IP address for closed communication in a self node, the communication encryption module comprising an encryption communication path setting table which holds a correspondence between a communication partner IP address, communication partner identification information, and encryption communication path setting information to be used for communication with a communication partner, and a communication encryption unit which reads out, from the encryption communication path setting table, encryption communication path setting information and a communication partner IP address corresponding to the communication partner identification information of the data packet redirected from the data transmission/reception unit, rewrites the destination address of the other node apparatus to the readout communication partner IP address, encrypts the data packet in accordance with the readout encryption communication path setting information, and transmits the data packet, the name resolution server comprising, in addition to a function related to name resolution, a setting table which holds a correspondence between a specifying condition to specify an encryption communication target node and encryption communication path setting information, a communication method resolution unit which determines whether information of the other node apparatus contained in one of the name resolution query and the name resolution response matches any one of specifying conditions held in the setting table, and a name resolution response/query transmission/reception unit which adds encryption communication path setting information corresponding to the matched specifying condition to the name resolution response and transmits the name resolution response, and the name resolution proxy unit comprising an encryption communication path setting unit which registers, in the encryption communication path setting table, a correspondence between the encryption communication path setting information, the IP address of the other node apparatus resolved by the name resolution response, and communication partner identification information that is not used in any other communication session, and registers, in the redirection table, a correspondence between a rewrite rule of communication partner identification information that is not used in any other communication session and an intercept address that is not used in any other communication session upon receiving the name resolution response added the encryption communication path setting information from the name resolution server, and a name resolution query/response transmission/reception unit which replaces the IP address of the other node apparatus contained in the name resolution response received from the name resolution server with the intercept address in the correspondence and transmits the name resolution response to the client node apparatus.

According to the present invention, there is provided a program which causes a computer included in a node apparatus in which an application that communicates with another node apparatus connected to a network operates to function as communication encryption means provided in a communication encryption module which operates as an independent process, and name resolution proxy means for relaying a name resolution query transmitted from the application to a name resolution server to resolve an IP address of the other node apparatus and a name resolution response as a response to the name resolution query, characterized in that the communication encryption means receives a data packet transmitted from the application, in which a loopback address serving as an IP address for closed communication in a self node is set as a destination address, reads out a communication partner IP address corresponding to the loopback address set as the destination address of the data packet from a first encryption communication path setting table that holds a plurality of correspondences between the communication partner IP address and the loopback address, rewrites the destination address of the data packet to the readout communication partner IP address, and encrypts and transmits the data packet.

According to the present invention, there is provided a program which causes a computer included in a communication encryption node apparatus connected, through a network, to a client node apparatus in which an application that communicates with another node apparatus connected to the network operates to function as communication encryption means provided in a communication encryption module which operates as an independent process, and name resolution proxy means for relaying a name resolution query transmitted from the application to a name resolution server to resolve an IP address of the other node apparatus and a name resolution response as a response to the name resolution query, characterized in that the communication encryption means receives a data packet having a first intercept address set as a destination address and transmitted from the application, reads out a communication partner IP address corresponding to the first intercept address set as the destination address of the data packet from a first encryption communication path setting table that holds a plurality of correspondences between the communication partner IP address and the first intercept address, and encrypts and transmits the data packet in which the readout communication partner IP address is set as the destination address of the data packet.

According to the present invention, there is provided a program which causes a computer included in a node apparatus in which an application that communicates with another node apparatus connected to a network operates to function as communication encryption means provided in a communication encryption module which operates as an independent process, and a redirection means provided in a data transmission/reception unit of a kernel unit, characterized in that the redirection means intercepts a data packet transmitted from the application to the other node apparatus, determines on the basis of a criterion held in a redirection table that holds the criterion to determine a data packet to be encrypted and a rewrite rule of communication partner identification information whether the data packet is the data packet to be encrypted, and if the data packet is the data packet to be encrypted, rewrites predetermined information of the data packet in accordance with the rewrite rule and redirects the data packet to the communication encryption module, and the communication encryption means rewrites the communication partner identification information of the data packet redirected from the data transmission/reception unit by looking up an encryption communication path setting table that holds a correspondence between the rewrite rule of the communication partner identification information of the data packet redirected from the data transmission/reception unit and an IP address of the other node apparatus of the application, encrypts the data packet in which a destination IP address of the other node apparatus is set, and transmits the data packet to the other node apparatus.

According to the present invention, there is provided a program characterized by causing a computer included in a name resolution server to function as name resolution query/response transmission/reception means for transmitting/receiving a name resolution query to resolve an IP address corresponding to a domain name and a name resolution response as a response to the name resolution query, and communication method resolution means for identifying for the name resolution query on the basis of the domain name whether communication to be executed in a query source of the name resolution query by using a response result to the name resolution query is a target to be encrypted, for the name resolution query received by the name resolution query/response transmission/reception means, the communication method resolution means identifying on the basis of information contained in one of the name resolution query and the response to the name resolution query whether the communication to be executed in the query source of the name resolution query by using the response result to the name resolution query is the encryption communication target, and if it is determined that the communication is the encryption communication target, returning, through the name resolution query/response transmission/reception unit, the name resolution response containing information necessary for the encryption communication in addition to the IP address corresponding to the domain name.

Effects of the Invention

As the first effect, even in encryption communication using a communication encryption module, encryption communication paths can be formed directly between a client node and a plurality of communication partner nodes, and the encryption communication paths can selectively be used in accordance with the communication partner node. As a result, encryption communication can simultaneously be executed directly with the plurality of communication partner nodes.

The reason will be described below. The communication encryption module receives a data packet having a loopback address or intercept address set as the destination address and transmitted from an application, reads out a communication partner IP address corresponding to the loopback address or intercept address set as the destination address of the data packet from an encryption communication path setting table that holds a plurality of correspondences between a communication partner IP address and a loopback address or intercept address, rewrites the destination address of the data packet to the readout communication partner IP address, and encrypts and transmits the data packet. Alternatively, a redirection unit provided in a data transmission/reception unit of a kernel unit intercepts a data packet transmitted from an application to another node apparatus, looks up a redirection table that holds a criterion to determine a data packet to be encrypted and a rewrite rule of communication partner identification information, determines on the basis of the criterion held in the redirection table whether the data packet is the data packet to be encrypted, and if the data packet is the data packet to be encrypted, redirects the data packet to the communication encryption module by rewriting predetermined information of the data packet in accordance with the rewrite rule, and the communication encryption module rewrites the communication partner identification information of the data packet redirected from the data transmission/reception unit by looking up the encryption communication path setting table that stores a correspondence between the rewrite rule of communication partner identification information of the data packet redirected from the data transmission/reception unit and the IP address of another node apparatus of the application, encrypts the data packet in which the destination IP address of the other node apparatus is set, and transmits the data packet to the other node apparatus.

As the second effect, a CUG can be designated by a domain name or domain name condition. A constant CUG setting cost can be maintained independently of the scale of CUG (the number of encryption communication target nodes participating in the CUG) in which a client node participates or the frequency of CUG structure change (i.e., participation of new nodes and withdrawal of existing participant nodes).

This is because the node type of a communication partner is determined on the basis of the contents of a DNS message transmitted/received when an application requests name resolution of the communication partner.

As the third effect, when the client node communicates with an encryption communication target node, the communication encryption module or the data transmission/reception unit of the OS kernel unit can flexibly selectively be used for communication encryption on the basis of a predetermined criterion.

This is because the client node includes the communication encryption module and the data transmission/reception unit having a communication encryption function, and they are selectively used on the basis of the predetermined criterion.

As the fourth effect, CUG setting can unitarily be managed by a DNS server or a communication encryption node. Consequently, each node participating a CUG need not do setting.

This is because if the communication partner is an encryption communication target node (CUG participant node), the DNS server or communication encryption node returns information indicating that the communication partner is an encryption communication target node as well as a name resolution response in response to a communication partner name resolution request from the client node.

As the fifth effect, even a client node incapable of additionally installing the communication encryption module can execute encryption communication with a plurality of communication partner nodes by setting an external communication encryption node in the DNS server.

This is because the communication encryption node receives a name resolution request from the client node, determines on the basis of the contents of the name resolution request whether the communication partner node of the client node is an encryption communication target node, and if the communication partner node is an encryption communication target node, encrypts the data packet transmitted from the client node.

As the sixth effect, in an arrangement for intercepting a data packet transmitted from an application to another node apparatus and redirecting the data packet to the communication encryption module, the application can transmit the data packet not to the loopback address but to the IP address of the communication partner. For this reason, if a communication log should be kept in the application, the IP address of the communication partner can be recorded.

BRIEF DESCRIPTION OF DRAWINGS

FIG. 1 is a block diagram showing the arrangement of the first embodiment of the present invention;

FIG. 2 is a view showing an example of an encryption communication path setting table according to the first embodiment of the present invention;

FIG. 3 is a view showing an example of a CUG setting table according to the first embodiment of the present invention;

FIG. 4 is a flowchart showing the operation of a DNS Proxy unit according to the first and fourth embodiments of the present invention upon receiving a name resolution request;

FIG. 5 is a block diagram showing the arrangement of an assumed example of the second embodiment of the present invention;

FIG. 15 is a view showing an example of an encryption communication path setting table according to the fourth embodiment of the present invention;

FIG. 19 is a view showing a redirection table according to the fifth embodiment of the present invention;

FIG. 20 is a view showing an example of an encryption communication path setting table according to the fifth embodiment of the present invention;

FIG. 21 is a flowchart showing the operation of a client node according to the fifth embodiment of the present invention;

BEST MODE FOR CARRYING OUT THE INVENTION

Figures 6, 7:
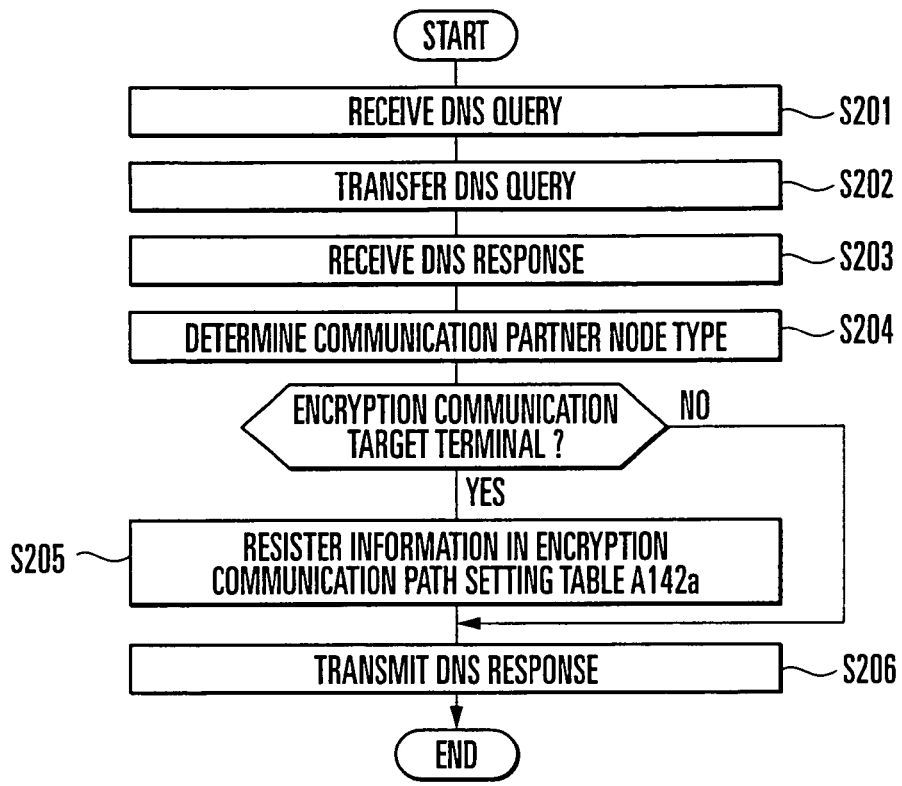
FIG. 6 is a flowchart showing the operation of a DNS Proxy unit according to the assumed example of the second embodiment of the present invention upon receiving a name resolution request.
FIG. 7 is a view showing an example of an encryption communication path setting table according to the assumed example of the second embodiment of the present invention.

The first embodiment of the present invention will be described next in detail with reference to the accompanying drawings.

Referring to FIG. 1, the first embodiment of the present invention is implemented by a client node A1$a$, DNS (Domain Name System) server B1$a$, encryption communication target node C1, and normal communication target node D1. The client node A1$a$, DNS server B1$a$, encryption communication target node C1, and normal communication target node D1 are connected through a network E1. The encryption communication target node C1 executes encryption communication with the client node A1$a$. The normal communication target node D1 executes normal communication without encryption with the client node A1$a$.

The client node A1$a$ includes an application A11$x$, DNS Proxy unit A12$a$, communication encryption module A13$a$, and data transmission/reception unit A14$x$. The data transmission/reception unit A14$x$ is provided in the kernel unit to transmit/receive a data packet.

The application A11$x$ is software such as a Web browser, e-mail software, or video conference software to implement its purpose by using a computer. The application A11$x$ has a function of requesting to resolve the name of a communication partner to an IP address.

In the scope of this specification, "name" indicates all identifiers directly or indirectly corresponding to one or a plurality of IP addresses or an IP address scope (more specifically, when a "name" is given, one or a plurality of IP addresses or an IP address scope can be specified directly or indirectly: a "name" need not always be specified from an IP address or IP address scope). For example, the "name" includes the following identifiers.

Identifier A having a correspondence of A←→1.2.3.4 ("1.2.3.4" is an example of an IP address)

Identifier B having a correspondence of 1.2.3.0/24 ("1.2.3.0/24" is an example of an IP address scope)

Identifier C having correspondences of C←→1.2.3.4 and C←→5.6.7.8

Identifier D having a correspondence of D←→ A

A typical example of the name currently used in the Internet is a domain name (e.g., "sato.biglobe.ne.jp" or "suzuki.nec.com": the domain name is also called FQDN (Fully Qualified Domain Name)).

Specifying one or a plurality of IP addresses or an IP address scope corresponding to a name on the basis of the name is generally called name resolution. A typical mechanism of name resolution is a DNS. When a DNS is used, a domain name can be resolved to an IP address. Other examples of the name resolution mechanism are NIS (Network Information Service) and WINS (Windows® Internet Name Service). In this specification, "name resolution" is not limited to the above-described examples and is used as a term to indicate "specifying one or a plurality of IP addresses or an IP address scope corresponding to a name on the basis of the name" (for example, the name resolution mechanism also includes a Web server with a CGI (Common Gateway Interface) that receives a character string and displays an IP address corresponding to it).

For the descriptive convenience, a domain name and DNS will be exemplified as a name and name resolution mechanism, respectively. However, the following explanation can be applied to any name and name resolution mechanism. In application, a domain name and DNS are replaced with a name and name resolution, respectively (e.g., DNS server→name resolution server, DNS query message→name resolution query message, and DNS response message→name resolution response message).

In this embodiment, the application A11x requests resolution of domain name of communication partner→IP address by transmitting a DNS query message to the loopback address (e.g., "127.0.0.1") assigned to the DNS Proxy unit A12a. Hence, the DNS query message transmitted from the application A11x is received by the DNS Proxy unit A12a. A loopback address is an IP address used for closed communication in a node and generally corresponds to an IP address within a scope of "127.0.0.0/8".

The application A11x designates an IP address contained in the name resolution result of the DNS response message received from the DNS Proxy unit A12a to the destination address of a transmission data packet and transmits the data.

Generally, the function of receiving a name resolution request from the application and creating/transmitting a DNS query message and the function of acquiring a name resolution result from a DNS response message received from the DNS server and transferring the name resolution result to the application are provided as a system function of the fundamental software (also referred to as an OS (Operating System)) of the node. In this specification, these functions will be expressed as "causing an application to transmit/receive a DNS message" for the descriptive convenience, including the above-described expressions.

The DNS Proxy unit A12a includes a DNS query/response transmission/reception unit A121a, communication method resolution unit A122a, encryption communication path setting unit A123a, DNS server address setting table A124a, and CUG (Closed User Group) setting table A125a.

The DNS Proxy unit A12a has a function of, upon receiving a name resolution request from the application A11x, causing the DNS server B1a to resolve the IP address of the communication partner of the application A11x, determining the node type of the communication partner (the node type of a communication partner indicates whether a communication partner is an encryption communication target node or a target node of normal communication (to be referred to as a normal communication target node hereinafter)), if the communication partner is an encryption communication target node, mapping the IP address of the communication partner to the loopback address, registering the loopback address and the IP address of the encryption communication target node in an encryption communication path setting table A132a provided in the communication encryption module A13a, and returning the mapped loopback address to the application A11x as a name resolution result. If the communication partner is a normal communication target node, the IP address of the communication partner is returned as a name resolution result without executing mapping and registration.

The arrangement of the DNS Proxy unit A12a will be described below. The DNS query/response transmission/reception unit A121a will be described first.

Upon receiving a DNS query message from the application A11x, the DNS query/response transmission/reception unit A121a transmits the DNS query message to the external DNS server B1a registered in the DNS server address setting table A124a. Upon receiving a DNS response message from the external DNS server B1a as the response to the DNS query message, the DNS query/response transmission/reception unit A121a transfers a name resolution result contained in the DNS response message to the communication method resolution unit A122a. The name resolution result transferred to the communication method resolution unit A122a contains the domain name (i.e., the domain name of the communication partner of the application A11x) as the target of name resolution and the resolved IP address (i.e., the IP address of the communication partner). The DNS query/response transmission/reception unit A121a transfers the name resolution result to the communication method resolution unit A122a and receives a determination result from it. In accordance with the determination result, the DNS response message is transmitted to the application A11x. The DNS response message transmission processing of the DNS query/response transmission/reception unit A121a branches to two patterns depending on the node type of the communication partner of the application A11x.

When Communication Partner is Normal Communication Target Node

In this case, the communication method resolution unit A122a sends a determination result to notify the DNS query/response transmission/reception unit A121a that the communication partner of the application A11x is a normal communication target node. At this time, the DNS query/response transmission/reception unit A121a directly transmits, to the application A11x, the name resolution result received from the external DNS server B1a.

When Communication Partner is Encryption Communication Target Node

In this case, the communication method resolution unit A122a sends a loopback address to the DNS query/response transmission/reception unit A121a. At this time, the DNS query/response transmission/reception unit A121a rewrites the IP address of the communication partner of the application A11x, which is resolved by the external DNS server B1a, to the loopback address sent from the communication method resolution unit A122a and transmits the loopback address to the application A11x.

The communication method resolution unit A122a will be described next. The communication method resolution unit A122a determines the node type of the communication partner of the application A11x by looking up the CUG setting table A125a on the basis of the name resolution result received from the DNS query/response transmission/reception unit A121a. If the communication partner of the application A11x is an encryption communication target node, the communication method resolution unit A122a grasps the setting information of an encryption communication path to be used for communication of the communication partner by looking up the CUG setting table A125a.

The communication method resolution unit A122a can use a domain name as a communication partner identifier to determine the node type. In determining the node type of the communication partner of the application A11x by using a domain name, the communication method resolution unit A122a checks whether the domain name of the communication partner is wholly or partially registered in the CUG setting table A125a as the domain name of the encryption communication target node. For example, assume that the domain name of the communication partner is "sato.biglobe.ne.jp". In this case, the communication method resolution unit A122a checks whether the domain name "sato.biglobe.ne.jp" or a domain name condition that matches "sato.biglobe.ne.jp" (e.g., a domain prefix such as "sato.*" (indicating a domain name with a front label "sato"), a domain suffix such as "*.biglobe.ne.jp" (indicating a domain name with a back label "biglobe.ne.jp"), or an arbitrary domain name condition such as "*.biglobe.*" (indicating an arbitrary domain name including a label "biglobe")) is registered in the CUG setting table A125a as the domain name of the encryption communication target node.

The communication method resolution unit A122a can also determine the node type of the communication partner by using an IP address in addition to the domain name. In this case, the communication method resolution unit A122a checks whether the IP address of the communication partner is wholly or partially registered in the CUG setting table A125a as the IP address of the encryption communication target node. For example, assume that the IP address of the communication partner is "133.11.64.24". In this case, the communication method resolution unit A122a checks whether an IP address "133.11.64.24" or an IP address scope including "133.11.64.24" (e.g., "133.11.64.0/24" or "133.11.0.0/16") is registered in the CUG setting table A125 as the IP address of the encryption communication target node.

The communication method resolution unit A122a determines the node type of the communication partner of the application A11x by the above-described method. Upon determining that the node type is a normal communication target node, the communication method resolution unit A122a notifies the DNS query/response transmission/reception unit A121a of it. On the other hand, upon determining that the node type of the communication partner is an encryption communication target node, the communication method resolution unit A122a transfers, to the encryption communication path setting unit A123a, the name resolution result received from the DNS query/response transmission/reception unit A121a and encryption communication path setting information to be used for communication with the communication partner and receives a loopback address from the encryption communication path setting unit A123a. The received loopback address is transferred to the DNS query/response transmission/reception unit A121a.

The encryption communication path setting unit A123a will be described next. The encryption communication path setting unit A123a has a function of, upon receiving the name resolution result and encryption communication path setting information from the communication method resolution unit A122a, mapping the IP address of the communication partner of the application A11x, which is contained in the name resolution result, to the loopback address and notifying the communication method resolution unit A122a of the loopback address. As the loopback address to be mapped, an address which is not used in any other communication session is selected by looking up the encryption communication path setting table A132a. The encryption communication path setting unit A123a also has a function of registering, in the encryption communication path setting table A132a, the correspondence between the selected loopback address and the name resolution result and encryption communication path setting information received from the communication method resolution unit A122a.

The DNS server address setting table A124a will be described next. The address of the external DNS server B1a is registered in the DNS server address setting table A124a. The DNS server address setting table A124a is looked up by the DNS query/response transmission/reception unit A121a in transmitting a DNS query message.

The CUG setting table A125a will be described next. Information about a CUG (Closed User Group) in which the client node A1 participates is registered in the CUG setting table A125a. A CUG indicates a group including two or more specific nodes. Communication in the group is encrypted so that any third party outside the group cannot peep it. That is, any other node in the CUG including the client node A1a as a participant serves as an encryption communication target node for the client node A1a. The CUG setting table A125a is looked up by the communication method resolution unit A122a to determine the node type of the communication partner of the application A11x. More specifically, the identification information of each node (i.e., encryption communication target node) in the CUG including the client node A1a as a participant is registered in the CUG setting table A125a. The identification information of a node registered in the CUG setting table A125a is, e.g., a domain name condition (for example, when "*.myfriends.com" is registered, a communication partner having a domain name (e.g., "sato.myfriends.com") matching "*.myfriends.com" is an encryption communication target node) or an IP address scope (for example, when "10.1.0.0/16" is registered, a communication partner having an IP address (e.g., "10.1.2.1") included in "10.1.0.0/16" is an encryption communication target node).

The setting information of an encryption communication path to be used for communication with a node in the CUG can also be registered in the CUG setting table A125a, although this registration information is not essential. Detailed examples of the encryption communication path setting information are a communication protocol (e.g., IPsec, SSL (Secure Socket Layer), or TLS (Transport Layer Security)), digital certificate ID (a digital certificate is an electronic certificate to prove self presence and includes, e.g., X.509 of ITU-T (International Telecommunication Union-Telecommunication Standardization Sector) recommendation: in this description, a digital certificate ID indicates an identifier to be used to select a digital certificate to be used by the application A11x in a session), and an encryption algorithm (e.g., DES (Data Encryption Standard), 3DES (triple-DES), or AES (Advanced Encryption Standard)).

FIG. 3 shows an example of the CUG setting table A125a. In a CUG setting table 201 shown in FIG. 3, domain name conditions are registered as encryption communication target node identification information, and communication protocols, digital certificate IDs, and encryption algorithms are registered as encryption communication path setting information. For example, the fourth entry of the CUG setting table 201 shown in FIG. 3 is set such that communication partner nodes (e.g., yamada.myfriends.com and sato.myfriends.com) having domain names matching a domain name condition "*.myfriends.com" are encryption communication target nodes, and encryption communication with those nodes is executed by using a communication protocol: SSL, digital certificate ID: 11, and encryption algorithm: DES.

When the DNS Proxy unit A12a has the table 201 shown in FIG. 3 as the CUG setting table A125a, the communication method resolution unit A122a determines the node type of the communication partner by using the domain name of the communication partner. For example, assume that the domain name of the communication partner is "taro.nec.co.jp". This domain name is registered in the second entry of the table 201. For this reason, the communication method resolution unit A122a determines that the communication partner is an encryption communication target node. Assume that the domain name of the communication partner is "yamada.myfriends.com". The domain name itself is not registered in the table 201. However, since the domain suffix ":myfriends.com" is registered in the fourth entry of the table 201, the communication method resolution unit A122a determines even in this case that the communication partner is an encryption communication target node. If the domain name of the communication partner does not match any of the domain names registered in the table 201, the communication method resolution unit A122a determines that the communication partner is a normal communication target node.

The arrangement of the DNS Proxy unit A12a has been described above.

The arrangement of the communication encryption module A13a will be described next. The communication encryption module A13a includes a communication encryption unit A131a and the encryption communication path setting table A132a.

The communication encryption unit A131a will be described first. The communication encryption unit A131a has a function of identifying the communication partner of the application A11x, grasping the encryption communication path to be used for communication, and encrypting the communication by looking up the encryption communication path setting table A132a on the basis of the destination loopback address of a data packet received from the application A11x. The communication encryption unit A131a also has a function of decrypting a data packet received from an external communication partner node and transferring the data packet to the application A11x. The communication encryption unit A131a includes an encryption/decryption processing unit A1311a and an address conversion unit A1312a.

The encryption/decryption processing unit A1311a has a function of looking up the encryption communication path setting table A132a on the basis of the destination loopback address of a data packet received from the application A11x and encrypting the received data packet in accordance with encryption communication path setting information registered in this table. The encryption/decryption processing unit A1311a also has a function of looking up the encryption communication path setting table A132a on the basis of the transmission source address of a data packet received from an external communication partner node and decrypting the received data packet in accordance with encryption communication path setting information registered in this table.

The address conversion unit A1312a has a function of looking up the encryption communication path setting table A132a on the basis of the destination loopback address of a data packet received from the application A11x and converting the destination loopback address into the IP address of a communication partner which corresponds to the destination loopback address in the encryption communication path setting table A132a. The address conversion unit A1312a also has a function of looking up the encryption communication path setting table A132a on the basis of the transmission source address of a data packet received from an external communication partner node and converting the transmission source address into a loopback address which corresponds to the transmission source address in the encryption communication path setting table A132a.

The encryption communication path setting table A132a will be described next. Loopback addresses, the IP addresses of communication partners corresponding to the loopback addresses, and encryption communication path setting information to be used for communication with the communication partners are registered in the encryption communication path setting table A132a by the encryption communication path setting unit A123a. That is, the encryption communication path setting table A132a holds an IP address, assigned loopback address, and encryption communication path setting information for each communication partner serving as an encryption communication target node. The encryption communication path setting table A132a is looked up by the encryption communication path setting unit A123a to map the IP address of the communication partner of the application A11x to a loopback address and by the communication encryption unit A131a to encrypt communication. FIG. 2 shows an example of the encryption communication path setting table A132a. Examples of the encryption communication path setting information registered in the encryption communication path setting table are a communication protocol, the ID of a digital certificate to be used, and an encryption algorithm.

Assume a case wherein the communication encryption module A13a holds a table 101 shown in FIG. 2 as the encryption communication path setting table A132a. An example of communication encryption processing will be described, in which the communication encryption unit A131a receives a data packet with a destination address "127.1.1.1" from the application A11x. Upon receiving a data packet, the address conversion unit A1311a transfers it to the encryption/decryption processing unit A1311a. The encryption/decryption processing unit A1311a looks up the encryption communication path setting table A132a and grasps an entry corresponding to the destination address "127.1.1.1". In this case, the second entry of the table 101 corresponds to "127.1.1.1". As a result, "communication protocol: SSL, digital certificate ID: 10, encryption algorithm: 3DES" is acquired as encryption communication path setting information to be used for communication. The encryption/decryption processing unit A1311a encrypts the data packet received from the application A11x by the 3DES algorithm in accordance with procedures defined by the SSL protocol on the basis of the encryption communication path setting information and transfers the data packet to the address conversion unit A1312a. The address conversion unit A1312a also looks up the encryption communication path setting table A132a to check an entry corresponding to the destination address "127.1.1.1" and grasps the IP address of the communication partner. In this case, "133.11.64.24" is grasped as the IP address of the communication partner. The address conversion unit A1312a converts the destination address from "127.1.1.1" to "133.11.64.24" and transmits the data packet.

When a data packet encrypted by the 3DES algorithm is received by the SSL protocol from an external node with an IP address "133.11.64.24", the communication encryption unit A131a looks up the encryption communication path setting table A132a, as in encryption processing. The encryption/decryption processing unit A1311a decrypts the data packet. Then, the address conversion unit A1312a converts the transmission source address from "133.11.64.24" to "127.1.1.1" and transmits the data packet to the application A11x.

In the above-described example, address conversion is done after encryption/decryption processing. Conversely, encryption/decryption processing may be done after address conversion. Address conversion and encryption/decryption processing may be executed simultaneously in parallel.

The DNS server B1a will be described next. The DNS server B1a executes name resolution requested by a DNS query message and returns a resolution result to the request source by a DNS response message. The DNS server B1a includes a DNS response/query transmission/reception unit B11a, name resolution unit B12a, and address resolution database B13a. These components have the following functions.

The DNS response/query transmission/reception unit B11a receives a DNS query message from the client node A1a and transfers a name resolution request contained in the message to the name resolution unit B12a. The DNS response/query transmission/reception unit B11a also sends a name resolution result received from the name resolution unit B12a to the client node A1 by a DNS response message.

The name resolution unit B12a executes resolution processing for a name resolution request received from the DNS response/query transmission/reception unit B11a by looking up the address resolution database B13a and transfers a name resolution result to the DNS response/query transmission/reception unit B11a.

Domain names and corresponding IP addresses are registered in the address resolution database B13a.

The operation of the client node A1a when the application A11x communicates with the encryption communication target node C1 or normal communication target node D1 in this embodiment will be described next in detail.

Operations of the client node A1a are roughly classified into an operation executed when the application A11x issues a name resolution request for the domain name of a communication partner and an operation executed when a data packet is transmitted to the communication partner.

The operation of the client node A1a when the application A11x issues a name resolution request will be described first.

The application A11x requests name resolution of a communication partner by transmitting a DNS query message to a loopback address (e.g., "127.1.1.1"). The DNS query message transmitted from the application A11x is received by the DNS Proxy unit A12a (more specifically, the DNS query/response transmission/reception unit A121a in the DNS Proxy unit A12a). Subsequent processing is executed in the DNS Proxy unit A12a.

The operation of the DNS Proxy unit A12a upon receiving a DNS query message from the application A11x will be described with reference to FIG. 4.

Upon receiving a DNS query message from the application A11x (step S101), the DNS query/response transmission/reception unit A121a transfers the received DNS query message to the external DNS server B1a registered in the DNS server address setting table A124a (step S102) and receives a DNS response message from the DNS server B1a as a response (step S103).

The DNS query/response transmission/reception unit A121a extracts a name resolution result from the received DNS response message and transfers the name resolution result to the communication method resolution unit A122a. The communication method resolution unit A122a determines the type (encryption communication target node or normal communication target node) of the communication partner by looking up the CUG setting table A125a on the basis of the received name resolution result (step S104). If the communication partner is an encryption communication target node, the communication method resolution unit A122a grasps encryption communication path setting information registered in the CUG setting table A125a.

A case wherein the communication partner is a normal communication target node will be described first. In this case, the communication method resolution unit A122a sends the determination result to the DNS query/response transmission/reception unit A121a. The DNS query/response transmission/reception unit A121a transfers the DNS response message received from the DNS server B1a to the application A11x (step S106).

Upon receiving the DNS response message, the application A11x starts communication to the IP address of the communication partner given by the received DNS response message. In this case, a data packet transmitted from the application A11x is transmitted directly to the communication partner without intervention of the communication encryption module so that normal communication with the communication partner is executed.

A case wherein the communication partner is an encryption communication target node will be described next. In this case, the communication method resolution unit A122a transfers, to the encryption communication path setting unit A123a, the name resolution result received from the DNS query/response transmission/reception unit A121a and encryption communication path setting information acquired from the CUG setting table A125a. Upon receiving the name resolution result, the encryption communication path setting unit A123a maps the IP address of the communication partner of the application A11x to a loopback address that is not used in any other communication session by looking up the encryption communication path setting table A132a and sends the mapped loopback address to the communication method resolution unit A122a. The encryption communication path setting unit A123a also registers, in the encryption communication path setting table A132a, the correspondence between the mapped loopback address, the IP address of the communication partner contained in the name resolution result received from the communication method resolution unit A122a, and the encryption communication path setting information (step S105).

The communication method resolution unit A122a sends the loopback address received from the encryption communication path setting unit A123a to the DNS query/response transmission/reception unit A121a. Upon receiving the loopback address from the communication method resolution unit A122a, the DNS query/response transmission/reception unit A121a creates a DNS response message by rewriting the address of the communication partner contained in the name resolution result received from the DNS server B1a to the loopback address and transmits the DNS response message to the application A11x. That is, the application A11x receives the loopback address selected by the encryption communication path setting unit A123a as the name resolution result for the domain name of the communication partner (step S106).

Upon receiving the DNS response message, the application A11x recognizes the loopback address contained in the name resolution result as the true address of the communication partner and transmits a data packet to the loopback address. As a result, the data packet transmitted from the application A11x is intercepted by the communication encryption module A13a and subjected to processing for communication encryption.

The operation of the client node A1 when the application A11x issues a name resolution request has been described above.

The operation when the application A11x transmits a data packet to a communication partner will be described next.

Upon receiving a DNS response message from the DNS Proxy unit A12a, the application A11x transmits a data packet to an address contained in the name resolution result given by the DNS response message.

The operation when the communication partner is a normal communication target node will be described first. In this case, the IP address of the communication partner is sent to the application A11x as the name resolution result. The application A11x transmits a data packet to the IP address. Hence, the data packet is transmitted directly to the communication partner without intervention of the communication encryption module A13a.

The operation when the communication partner is an encryption communication target node will be described next. In this case, the loopback address is sent to the application A11x as the name resolution result. The application A11x transmits a data packet to the received loopback address. As a result, the data packet transmitted to the loopback address is received by the communication encryption module A13a. In the communication encryption module A13a, the data packet is processed by the communication encryption unit A131a.

Upon receiving the data packet from the application A11x, the communication encryption unit A131a acquires encryption communication path setting information to be used for communication with the communication partner of the application A11x and the IP address of the communication partner by looking up the encryption communication path setting table A132a on the basis of the destination loopback address of the data packet. Using the acquired encryption communication path setting information, the communication encryption unit A131a causes the encryption/decryption processing unit A1311a to encrypt the data packet received from the application A11x, causes the address conversion unit A1312a to rewrite the destination loopback address of the data packet to the IP address of the communication partner, and transmits the data packet to the communication partner via the encryption communication path.

In the above description, the node type of the communication partner is determined after the DNS Proxy unit A12a receives the name resolution result of the communication partner from the external DNS server B1a. In this embodiment, as another method, the node type of the communication partner may be determined before the DNS Proxy unit A12a requests the external DNS server B1a to execute name resolution of the communication partner. In this case, the node type cannot be determined on the basis of the IP address of the communication partner. The node type is determined on the basis of, e.g., a domain. At this time, control can be done such that, e.g., the DNS server to receive the name resolution request (i.e., receive a DNS query message) changes depending on the node type of the communication partner. Hence, a DNS server dedicated to an encryption communication group can be formed.

The effects of this embodiment will be described below.

In this embodiment, the DNS Proxy unit A12a intercepts a DNS message that is transmitted/received to/from the DNS server B1a when the application A11x in the client node A1 requests name resolution of the communication partner. The type of the communication partner is determined on the basis of information contained in the DNS message. If the communication partner is an encryption communication target node, the DNS Proxy unit A12a rewrites the IP address of the communication partner to a loopback address and returns a DNS response message to the application A11x. The loopback address to be given by the DNS response message changes depending on the communication partner of the application A11x. For this reason, the communication encryption module A13a which has received a data packet from the application A11x can identify the communication partner of the application A11x on the basis of the destination loopback address and identify the encryption communication path to be used for communication with the communication partner. Hence, the client node A1 can simultaneously execute encryption communication directly with a plurality of communication partners.

In this embodiment, the type of the communication partner is determined by intercepting the DNS message, as described above. Hence, the type of the communication partner can be determined on the basis of the domain name, and the identification information of the encryption communication target node can be designated by the domain name. When identification information is designated by a domain name, setting need not be changed even when the IP address of the communication partner dynamically changes (e.g., when the IP address is assigned by DHCP), unlike a case wherein designation is done by using an IP address. In addition, an encryption communication target node can also be designated by a domain name condition (e.g., a domain prefix such as "sato.*" (indicating an FQDN with front label "sato"), a domain suffix such as "*.biglobe.ne.jp" (indicating an FQDN with a back label "biglobe.ne.jp"), or a condition such as "*.biglobe.*" (indicating an arbitrary FQDN including a label "biglobe")). When communication is to be executed by using an encryption communication path with setting common to a plurality of nodes included in a group, the setting can be done for each group by using a domain name condition common to nodes included in each group (e.g., defining the domain suffix of nodes in a group as "*.myfriends.com"). Hence, the setting cost can be reduced. If setting is to be done simply for each group, an IP address scope such as "10.2.1.0/24" can also be used. However, if the IP addresses of nodes included in a group do not belong to the same IP address scope, the IP address scope cannot be used as the identification information of the group, and it is impossible to freely form a group including arbitrary nodes. To the contrary, a domain name can freely be added independently of the IP address. Hence, a group can freely be formed.

When the type of a communication partner (whether a communication partner is an encryption communication target node) is determined on the basis of a domain name, the above-described effects can be obtained. However, the present invention is not limited to determination based on a domain name. The determination may be done on the basis of an IP address. Not only in the first embodiment but also in all following embodiments to be described below, the type of a communication partner can be determined on the basis of an IP address.

The second embodiment of the present invention will be described next. First, an assumed example of the second embodiment will be described in detail with reference to the accompanying drawings.

Referring to FIG. 5, the assumed example of the second embodiment of the present invention is different from the first embodiment of the present invention mainly in that the function of the communication encryption module A13a is provided not by an independent process but as the function of a data transmission/reception unit A14b in the kernel unit of the OS. More specifically, in the presumed example, the data transmission/reception unit A14b includes a communication encryption unit A141b and an encryption communication path setting table A142b. An encryption communication path setting unit A123b in a DNS Proxy unit A12b sets an encryption communication path for the encryption communication path setting table A142b in the data transmission/reception unit A14b. The assumed example will be described below with the focus on different points from the first embodiment of the present invention (i.e., the encryption communication path setting unit A123b and data transmission/reception unit A14b).

The encryption communication path setting unit A123b will be described first. The encryption communication path setting unit A123b has a function of registering, in the encryption communication path setting table A142b included in the data transmission/reception unit A14b, the IP address of an encryption communication target node and encryption communication path setting information to be used for communication with the encryption communication target node. More specifically, the encryption communication path setting unit A123b registers, in the encryption communication path setting table A142b, the IP address of a communication partner contained in the name resolution result of the communication partner of an application A11x, which is received from a communication method resolution unit A122a, and encryption communication path setting information to be used for communication with the communication partner.

In this assumed example, the encryption communication path setting unit A123b does not convert the IP address of the communication partner serving as an encryption communication target node into a loopback address, unlike the first embodiment of the present invention. The reason is as follows. In the first embodiment of the present invention, the communication encryption module A13a (communication encryption unit A131a) is an independent process. The encryption communication path setting unit A123a maps the IP address of a communication partner to a loopback address so that the communication encryption module A13a can intercept a data packet transmitted from the application A11x. In this assumed example, however, the communication encryption unit A141b is included in the data transmission/reception unit A14b and can therefore intercept all data packets transmitted from the application A11x. For this reason, the IP address of a communication partner need not be mapped to a loopback address to intercept a data packet transmitted from the application A11x.

The data transmission/reception unit A14b will be described next. The data transmission/reception unit A14b includes the communication encryption unit A141b and encryption communication path setting table A142b. All data packets transmitted from the application A11x to external nodes are intercepted by the data transmission/reception unit A14b and subjected to transmission processing.

The IP address of an encryption communication target node and encryption communication path setting information to be used for communication with the encryption communication target node are registered in the encryption communication path setting table A142b. Registration is dynamically done by the encryption communication path setting unit A123b. A table 301 shown in FIG. 7 indicates an example of the encryption communication path setting table A142b. In this example, communication partner IP addresses and encryption communication path setting information, i.e., communication protocols, digital certificate IDs, and encryption algorithms are registered.

Unlike the communication encryption unit A131a of the first embodiment of the present invention, the communication encryption unit A141b has no function of converting the address of a received data packet. The communication encryption unit A141b has only the function of executing encryption/decryption processing. The reason is as follows. In the first embodiment of the present invention, since the destination address of an intercepted data packet is converted into a loopback address, the communication encryption unit A131a must convert the destination address into the IP address of the communication partner of the application A11x again. In this assumed example, however, the communication encryption unit A141b can intercept a data packet transmitted from the application A11x independently of the destination address.

The communication encryption unit A141b includes an encryption/decryption processing unit A1411b. The encryption/decryption processing unit A1411b has the same functions as the encryption/decryption processing unit A1311a of the first embodiment of the present invention. More specifically, the encryption/decryption processing unit A1411b grasps encryption communication path setting information to be used to transmit a data packet by looking up the encryption communication path setting table A142b on the basis of the destination address of an intercepted data packet and encrypts the data packet in accordance with the encryption communication path setting information.

An operation example of the communication encryption unit A141b will be described below. For example, assume that the data transmission/reception unit A14b holds the table 301 shown in FIG. 7 as the encryption communication path setting table A142b. A case will be described in which the data transmission/reception unit A14b intercepts a data packet with a destination address "133.11.64.24".

When the data transmission/reception unit A14b intercepts a data packet, the communication encryption unit A141b looks up the encryption communication path setting table A142b. In the example shown in FIG. 7, the second entry of the encryption communication path setting table A142b corresponds to the intercepted data packet. The communication encryption unit A141b encrypts the data packet in accordance with the setting information (communication protocol: IPsec, digital certificate ID: 10, encryption algorithm: 3DES) registered in the second entry and transmits the data packet.

The arrangement of the data transmission/reception unit A14b has been described above.

The operation of a client node A1b when the application A11x communicates with an encryption communication target node C1 or normal communication target node D1 in this assumed example will be described next in detail.

Operations of the client node A1b are roughly classified into an operation executed when the application A11x issues a name resolution request for the domain name of a communication partner and an operation executed when a data packet is transmitted to the communication partner.

The operation of the client node A1b when the application A11x issues a name resolution request will be described first.

As in the first embodiment of the present invention, the application A11x requests name resolution of a communication partner by transmitting a DNS query message to a loopback address (e.g., "127.1.1.1"). The DNS query message transmitted from the application A11x is received by the DNS Proxy unit A12b (more specifically, the DNS query/response transmission/reception unit A121a in the DNS Proxy unit A12b). Subsequent processing is executed in the DNS Proxy unit A12b.

The operation of the DNS Proxy unit A12b upon receiving a DNS query message from the application A11x will be described with reference to FIG. 6.

The operation (steps S201 to S204 in FIG. 6) of the DNS Proxy unit A12b after receiving a DNS query message from the application A11x until receiving a DNS response message from an external DNS server and determining the node type of the communication partner is the same as that of the DNS Proxy unit A12a according to the first embodiment of the present invention. The operation when the node type of the communication partner is a normal communication target node is also the same as that of the first embodiment of the present invention.

Only the operation (step S205 in FIG. 6) of the encryption communication path setting unit A123b when the node type of the communication partner is an encryption communication target node is different from the first embodiment of the present invention. More specifically, upon receiving a name resolution result and encryption communication path setting information from the communication method resolution unit A122a, the encryption communication path setting unit A123b registers these pieces of information in the encryption communication path setting table A142b (step S205). After registration, the DNS query/response transmission/reception unit A121a transmits, to the application A11x, a DNS response message containing the name resolution result received from a DNS server B1b (step S206).

The operation when the application A11x transmits a data packet to a communication partner will be described next.

In this assumed example, the DNS Proxy unit A12b directly notifies the application of the communication partner IP address resolved by the DNS server B1b independently of the node type of the communication partner, unlike the first embodiment of the present invention. Upon receiving a DNS response message from the DNS Proxy unit A12b, the application A11x transmits a data packet to the received IP address (i.e., the IP address of the communication partner). All transmitted data packets are intercepted by the data transmission/reception unit A14b.

When the data transmission/reception unit A14b intercepts the data packet, the communication encryption unit A141b checks by looking up the encryption communication path setting table A142b on the basis of the destination IP address of the received data packet whether the destination IP address is registered as the IP address of an encryption communication target node. If the node type is an encryption communication target node, the data packet is encrypted and transmitted. If the node type is a normal communication target node, the data packet is directly transmitted.

In the above description, the node type of the communication partner is determined after the DNS Proxy unit A12b receives the name resolution result of the communication partner from the external DNS server B1a. Even in this assumed example, as another method, the node type of the communication partner may be determined before the DNS Proxy unit A12b requests the external DNS server B1a to execute name resolution of the communication partner, as in the first embodiment of the present invention.

The second embodiment will now be described in detail with reference to the accompanying drawings.

Figure 8:
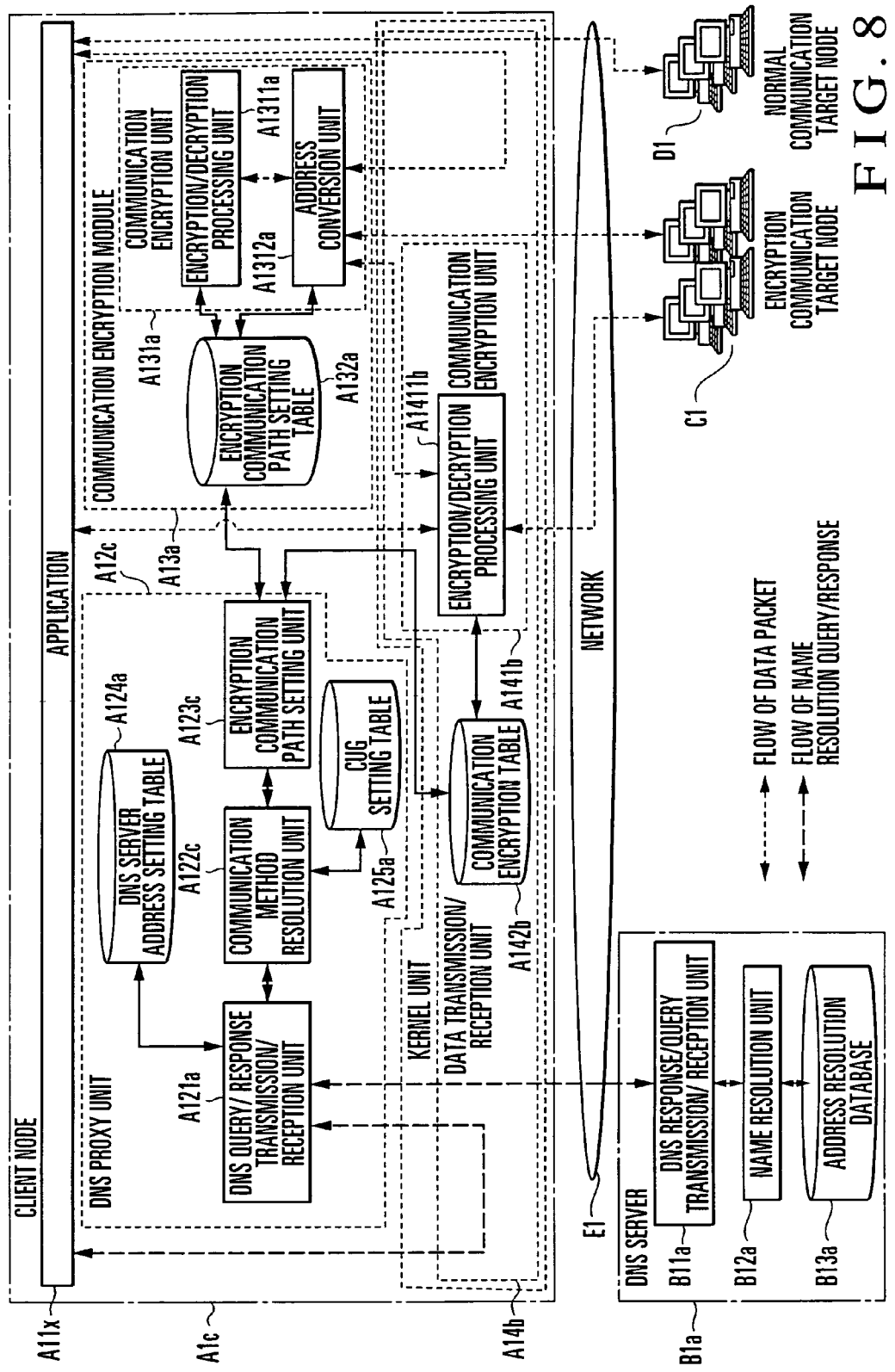
FIG. 8 is a block diagram showing the arrangement of the second embodiment of the present invention.

Referring to FIG. 8, the second embodiment of the present invention is different from the first embodiment of the present invention in that a client node A1c includes both a communication encryption module A13a described in the first embodiment of the present invention and a data transmission/reception unit A14b (i.e., the data transmission/reception unit A14b includes a communication encryption unit A141b and an encryption communication path setting unit A142b) described in the assumed example. That is, in this embodiment, the client node A1c has both the communication encryption function of the communication encryption module A13a and the communication encryption function of the data transmission/reception unit A14b.

The modules included in the client node A1c have the same functions as those of the modules in the assumed example and the first embodiment of the present invention except a communication method resolution unit A122c and encryption communication path setting unit A123c of a DNS Proxy unit A12c.

The communication method resolution unit A122c will be described first. In addition to the functions of corresponding units in the assumed example and the first embodiment of the present invention, the communication method resolution unit A122c has a function of, when the communication partner of an application A11x is an encryption communication target node, determining on the basis of a predetermined criterion which of the communication encryption module A13a and data transmission/reception unit A14b should encrypt communication with the communication partner (or whether both of them should execute encryption) and notifying the encryption communication path setting unit A123c of the determination result.

A detailed criterion can be defined for, e.g., each CUG (i.e., (group of) encryption communication target nodes). For example, communication encryption should be executed by the data transmission/reception unit A14b for encryption communication with a communication partner having a domain name "*.myfriends.com". Communication encryption should be executed by the communication encryption module A13a for encryption communication with a communication partner having a domain name "*.mycompany.com". A criterion is thus defined and registered in a CUG setting table A125a. The criterion may be defined on the basis of encryption communication path setting information to be used for communication with a communication partner. For example, communication encryption should be executed by the data transmission/reception unit A14b when an encryption communication path with a communication protocol IPsec is to be used. Communication encryption should be executed by the communication encryption module A13a when an encryption communication path with a communication protocol SSL is to be used. A criterion is thus defined and set in the communication method resolution unit A122c.

The encryption communication path setting unit A123c will be described next. The encryption communication path setting unit A123c has a function of registering encryption communication path setting information in one (or both) of an encryption communication path setting table A132a and the encryption communication path setting table A142b on the basis of the determination result received from the communication method resolution unit A122c.

Figures 9, 10:
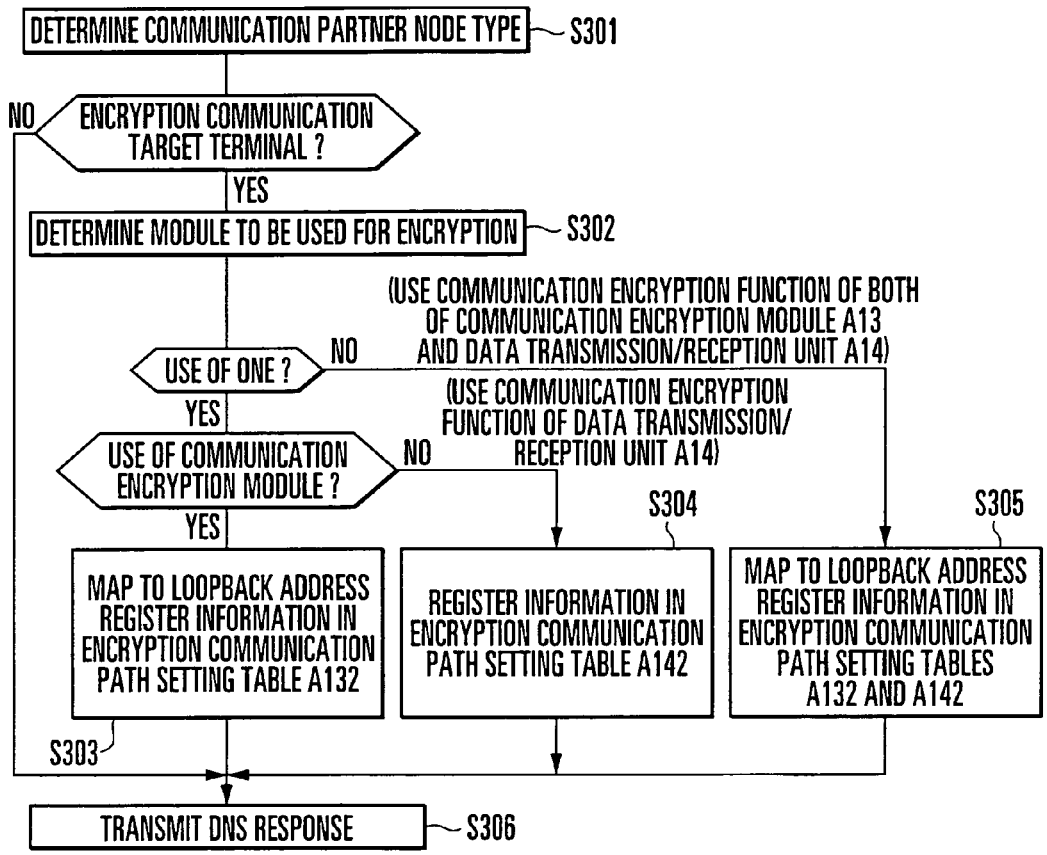
FIG. 9 is a flowchart showing the operation of a DNS Proxy unit according to the second embodiment of the present invention upon receiving a name resolution request.
FIG. 10 is a view showing an example of a CUG setting table according to the second embodiment of the present invention.

The operations of the communication method resolution unit A122c and encryption communication path setting unit A123c of this embodiment will be described below in detail with reference to FIG. 9.

Upon receiving a communication partner name resolution result from a DNS query/response transmission/reception unit A121a, the communication method resolution unit A122c determines by looking up the CUG setting table A125a whether the communication partner is an encryption communication target node (step S301). If the communication partner is an encryption communication target node, the communication method resolution unit A122c grasps encryption communication path setting information to be used for communication with the communication partner and determines in accordance with a predetermined criterion which unit should encrypt communication with the communication partner (step S302). Then, the communication method resolution unit A122c transfers, to the encryption communication path setting unit A123c, the communication partner name resolution result, encryption communication path setting information to be used for communication with the communication partner, and the determination result about the unit to encrypt communication with the communication partner.

Upon receiving the pieces of information from the communication method resolution unit A122c, the encryption communication path setting unit A123c registers the encryption communication path setting information on the basis of the determination result. Processing branches to the following three contents on the basis of the determination result.

(1) If it is Determined to Cause the Communication Encryption Module A13a to Execute Communication Encryption In this case, like the encryption communication path setting unit A123a of the first embodiment of the present invention, the encryption communication path setting unit A123c maps the IP address of the communication partner to a loopback address that is not used in any other communication session by looking up the encryption communication path setting table A132a and registers, in the encryption communication path setting table A132a, the loopback address, the IP address of the communication partner contained in the name resolution result, and the encryption communication path setting information to be used for communication with the communication partner (step S303). The loopback address is transferred to the communication method resolution unit A122c.

(2) If it is Determined to Cause the Data Transmission/Reception Unit A14b to Execute Communication Encryption In this case, like the encryption communication path setting unit A123a of the assumed example of the second embodiment of the present invention, the encryption communication path setting unit A123c registers, in the encryption communication path setting table A142b, the IP address of the communication partner contained in the name resolution result of the communication partner of the application A11x, which is received from the communication method resolution unit A122c, and the encryption communication path setting information to be used for communication with the communication partner (step S304).

(3) If it is Determined to Cause Both the Communication Encryption Module A13a and Data Transmission/Reception Unit A14b to Execute Communication Encryption In this case, the above-described operations (1) and (2) are executed (step S305).

Upon receiving the loopback address from the encryption communication path setting unit A123c (i.e., the cases (1) and (3)), the communication method resolution unit A122c transfers the loopback address to the DNS query/response transmission/reception unit A121. In this case, the loopback address is eventually sent to the application A11x as the name resolution result of the communication partner (step S306). The data packet transmitted from the application A11x is intercepted and encrypted by the communication encryption module A13a. In the case (3), after encryption processing by the communication encryption module A13a, encryption processing by the data transmission/reception unit A14b is also executed. In the case (2), the IP address of the communication partner of the application A11x is transferred to the DNS query/response transmission/reception unit A121a. In this case, the application A11x is eventually notified of the IP address of the communication partner as the name resolution result of the communication partner (step S306). The data packet transmitted from the application A11x is encrypted by the data transmission/reception unit A14b.

A detailed example of the operation will be described below. Assume that the DNS Proxy unit A12c holds a table 401 shown in FIG. 10 as the CUG setting table A125a. The predetermined criterion is defined such that "communication encryption should be executed by the data transmission/reception unit A14b when an encryption communication path with a communication protocol IPsec is to be used, and communication encryption should be executed by the communication encryption module A13a when an encryption communication path with a communication protocol SSL is to be used". A case will be described in which the domain name of the communication partner of the application A11x is "tom.myfamily.com".

Upon receiving a name resolution result from the DNS query/response transmission/reception unit A121a, the communication method resolution unit A122c determines the node type of the communication partner of the application A11x by looking up the CUG setting table A125a. In this case, the fifth entry of the table 401 matches the condition. It is determined that the communication partner is an encryption communication target node. As encryption communication path setting information to be used for communication with the communication partner, "communication protocol: IPsec, digital certificate ID: 12, encryption algorithm: 3DES" is acquired. In this case, IPsec is used for the encryption communication path with the communication partner. Hence, the communication method resolution unit A122c determines in accordance with the predetermined criterion that communication with the communication partner should be encrypted by the data transmission/reception unit A14b. In addition to the name resolution result received from the DNS query/response transmission/reception unit A121a, the communication method resolution unit A122c transfers, to the encryption communication path setting unit A123, the pieces of information including "communication partner node type: encryption communication target node, encryption communication path setting information to be used for communication with the communication partner: "communication protocol: IPsec, digital certificate ID: 12, encryption algorithm: 3DES", and module to encrypt communication with the communication partner: data transmission/reception unit A14b". Upon receiving the pieces of information, the encryption communication path setting unit A123c registers, in the encryption communication path setting table A142b, the IP address of the communication partner of the application A11x, which is contained in the name resolution result, and the encryption communication path setting information to be used for communication with the communication partner. The communication method resolution unit A122c transfers the node type of the communication partner of the application A11x to the DNS query/response transmission/reception unit A121a. As a result, the application A11x is notified of the IP address of the communication partner as the name resolution result of the communication partner. The data packet transmitted from the application A11x is encrypted by the data transmission/reception unit A14b.

In the above description, the node type of the communication partner is determined after the DNS Proxy unit A12c receives the name resolution result of the communication partner from an external DNS server B1a. Even in this embodiment, as another method, the node type of the communication partner may be determined before the DNS Proxy unit A12c requests the external DNS server B1a to execute name resolution of the communication partner, as in the first embodiment of the present invention.

The effects of this embodiment will be described next. In this embodiment, the communication encryption function provided by the communication encryption module A13a and the communication encryption function provided by the data transmission/reception unit A14b can flexibly be used selectively in accordance with a predetermined criterion. For example, the module to encrypt communication is selectively used in accordance with the communication protocol supported by the communication partner. Even when the communication protocol supported by the communication partner is limited (for example, only IPsec is supported), encryption communication with the communication partner can be implemented.

The third embodiment of the present invention will be described next in detail with reference to the accompanying drawings.

Figure 11:
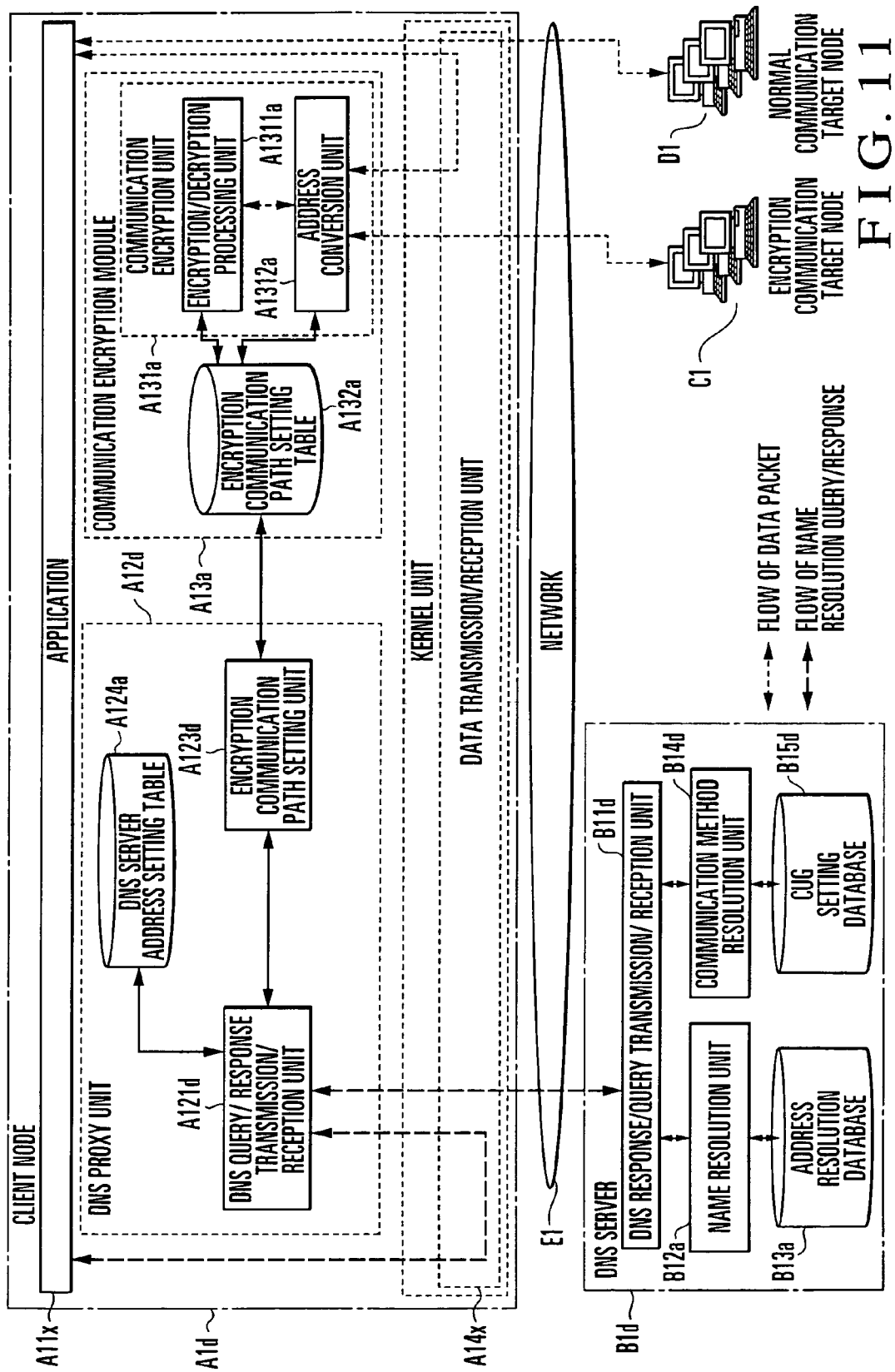
FIG. 11 is a block diagram showing the arrangement of the third embodiment of the present invention.

Referring to FIG. 11, the third embodiment of the present invention is different from the first embodiment of the present invention in that a communication method resolution unit and a CUG setting table are included not in a DNS Proxy unit A12d but in a DNS server B1d. In this embodiment, the node type of the communication partner of an application A11x and encryption communication path setting information to be used when the communication partner is an encryption communication target node are resolved not in a client node A1d but by the external DNS server B1d.

The third embodiment will be described below with the focus on different points from the first embodiment of the present invention (i.e., the DNS Proxy unit A12d and DNS server B1d).

The DNS Proxy unit A12d will be described first. In this embodiment, the DNS Proxy unit A12d has a function of requesting the DNS server B1d to execute name resolution of the communication partner of the application A11x and resolve the node type of the communication partner (and if the communication partner is an encryption communication target node, encryption communication path setting information to be used for communication with the communication partner), and if the communication partner is an encryption communication target node, registering the encryption communication path setting information resolved by the DNS server B1d in an encryption communication path setting table A132a.

In addition to a function of requesting the external DNS server B1d to execute name resolution of the communication partner of the application A11x, a DNS query/response transmission/reception unit A121d has a function of requesting the external DNS server B1d to resolve the node type of the communication partner of the application A11x and, if the communication partner is an encryption communication target node, encryption communication path setting information to be used for communication with the communication partner. Upon receiving a DNS query message, the DNS query/response transmission/reception unit A121d transfers the message to the DNS server B1d and executes reception processing of a DNS response message received as a response. The DNS response message received from the DNS server B1d contains the node type information of the communication partner in addition to the name resolution result of the communication partner of the application A11x. If the communication partner is an encryption communication target node, the DNS response message also contains encryption communication path setting information to be used for communication with the communication partner.

When the DNS response message indicates that the communication partner is a normal communication target node, the DNS query/response transmission/reception unit A121d notifies, by the DNS response message, the application A11x of the name resolution result of the communication partner contained in the received message. Conversely, when the DNS response message indicates that the communication partner is an encryption communication target node, the DNS query/response transmission/reception unit A121d transfers, to an encryption communication path setting unit A123d, the name resolution result of the communication partner and the encryption communication path setting information to be used for communication with the communication partner. Then, a loopback address is received from the encryption communication path setting unit A123d. The DNS query/response transmission/reception unit A121d rewrites the IP address of the communication partner to the received loopback address and notifies, by the DNS response message, the application A11x of the name resolution result.

The encryption communication path setting unit A123d has the same functions as those of the encryption communication unit A123d of the first embodiment of the present invention.

The address of the external DNS server B1d is registered in a DNS server address setting table A124a.

The arrangement of the DNS Proxy unit A12d has been described above.

The DNS server B1d will be described next. In addition of a name resolution function provided in a normal DNS server, the DNS server B1d has a function of resolving the type of a node as the target of a name resolution request and, if the node is an encryption communication target node, a function of resolving encryption communication path setting information to be used for communication with the node.

The DNS server B1d includes a DNS response/query transmission/reception unit B11d, name resolution unit B12a, address resolution database B13a, communication method resolution unit B14d, and CUG setting database B15d. Each unit will be described below.

The DNS response/query transmission/reception unit B11d transfers a name resolution request (more specifically, the domain name of the name resolution target contained in the received DNS query message or the identifier (e.g., the IP address or domain name) of the client node A1d) received from the client node A1d to the name resolution unit B12a and receives a name resolution result (more specifically, the IP address of the resolution result is contained in addition to information contained in the name resolution request) from the name resolution unit B12a. The DNS response/query transmission/reception unit B11d transfers the name resolution result to the communication method resolution unit B14d and receives the type information of the name resolution request target node from the communication method resolution unit B14d. If the name resolution request target node is an encryption communication node, the DNS response/query transmission/reception unit B11d receives encryption communication path setting information to be used for communication with the node. The DNS response/query transmission/reception unit B11d creates a DNS response message on the basis of the pieces of information received from the name resolution unit B12a and communication method resolution unit B14d and transmits the DNS response message to the client node A1d.

Upon receiving a name resolution request, the name resolution unit B12a executes name resolution by looking up the address resolution database B13a and transfers the name resolution result to the DNS response/query transmission/reception unit B11d.

Domain names and corresponding IP addresses are registered in the address resolution database B13a.

Upon receiving the name resolution result from the DNS response/query transmission/reception unit B11d, the communication method resolution unit B14d resolves the type of the communication partner by looking up the CUG setting database B15d. If the communication partner is an encryption communication target node, the communication method resolution unit B14d also resolves encryption communication path setting information to be used for communication with the node. A detailed example of the resolution operation will be described later. After this processing, the communication method resolution unit B14d transfers the resolution result to the DNS response/query transmission/reception unit B11d.

The identification information of each encryption communication target node is registered in the CUG setting database B15d. Encryption communication path setting information to be used for communication can also be registered. These pieces of information can be registered as indicated by a table 201 shown in FIG. 3. The identification information of each encryption communication target node may be registered in the CUG setting database B15d in correspondence with each client node or each group of client nodes. With this registration method, such control is possible that even with a communication method resolution request for the same node, the communication method changes depending on the client node. For example, when the type of a certain node is resolved as an encryption communication target node for a specific client node, encryption communication from the specific client node can be permitted.

Figure 12:
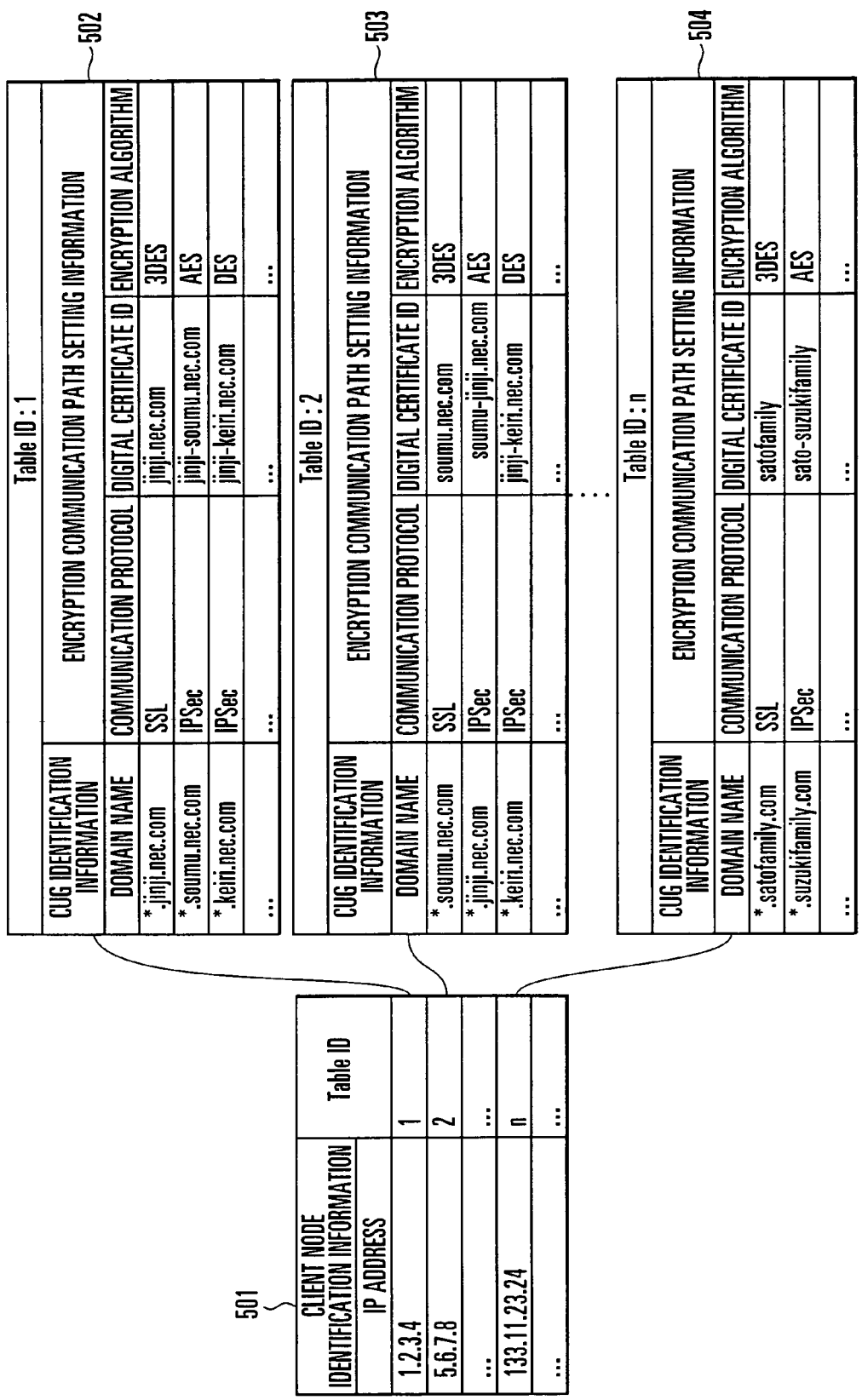
FIG. 12 is a view showing an example of a CUG setting database according to the third embodiment of the present invention.

FIG. 12 shows a detailed example of the CUG setting database B15d. The CUG setting database B15d shown in FIG. 12 includes the following two kinds of tables (1) and (2) in which the identification information of encryption communication target nodes and encryption communication path setting information to be used for communication are registered for each client node or each group of client nodes.

(1) A table in which the identification information of encryption communication target nodes and encryption communication path setting information to be used for communication are registered. Tables 502 to 504 are of this type. In the tables 502 to 504, the identification information of each encryption communication target node is registered in the form of a domain name. As encryption communication path setting information (encryption communication path specifications), communication protocols, digital certificate IDs, and encryption algorithms are registered.

(2) A table in which the identification information of client nodes and the identifiers of the tables (1) to be looked up for communication method resolution triggered by reception of a DNS query message from the client nodes are registered. A table 501 is of this type. In the table 501, the identification information of each client node is registered in the form of an IP address. The identifiers of the tables 502 to 504 to be looked up for communication method resolution triggered by reception of a DNS query message from the client nodes with the IP addresses are registered.

A detailed example of the communication method resolution operation when the DNS server B1d holds the CUG setting database B15d shown in FIG. 12 will be described below.

For example, when a DNS query message is received from a client node with an IP address "1.2.3.4", the table 501 is looked up. The first entry that matches the client node identification information (IP address: 1.2.3.4) is checked. On the basis of the registered contents of the first entry, the table with Table ID 1, i.e., the table 502 is looked up. When the domain name as the target of name resolution request of the client node is "kojima.jinji.nec.com", the first entry of the table 502 is checked. The communication method is resolved to [communication node type: encryption communication target node, communication protocol: SSL, digital certificate ID: jinji.nec.com, encryption algorithm: 3DES].

When a client node with an IP address "5.6.7.8" requests name resolution of "kojima.jinji.nec.com" in the same way as described above, the second entry of the table 503 is finally checked. The communication method is resolved to be different from the above example, i.e., to [communication node type: encryption communication target node, communication protocol: IPsec, digital certificate ID: soumu-jinji.nec.com, encryption algorithm: AES].

When a client node with an IP address "133.11.23.24" requests name resolution of "kojima.jinji.nec.com" in the same way as described above, the table 504 is looked up. However, no entry matching "kojima.jinji.nec.com" is registered in the table 504. Hence, the communication method is resolved to [communication node type: normal communication target node].

The operations of the client node A1d and DNS server B1d of this embodiment will be described next.

The operation of the client node A1d will be described first. Operations of the client node A1d are roughly classified into an operation executed when the application A11x issues a name resolution request for the domain name of a communication partner and an operation executed when a data packet is transmitted to the communication partner. The latter operation is the same as that described in the first embodiment of the present invention, and a description thereof will be omitted. The operation in requesting name resolution is different from that of the first embodiment of the present invention in the operation after receiving a DNS response message from the external DNS server (from step S104 in FIG. 4). The operation after receiving a DNS response message from the external DNS server will be described below.

Upon receiving a DNS response message from the DNS server B1d, the DNS query/response transmission/reception unit A121d checks the node type information of the communication partner contained in the message. If the communication partner is a normal communication target node, a new DNS response message is created on the basis of the name resolution result contained in the DNS response message received from the DNS server B1d, and transmitted to the application A11x. If the communication partner is an encryption communication target node, the DNS query/response transmission/reception unit A121d transfers, to the encryption communication path setting unit A123d, the name resolution result of the communication partner contained in the DNS response message received from the DNS server B1d and encryption communication path setting information to be used for communication with the communication partner. The encryption communication path setting unit A123d registers, in the encryption communication path setting table A132a, the information of the encryption communication target node and notifies the DNS query/response transmission/reception unit A121d of a loopback address in accordance with the same procedures as in the operation of the first embodiment of the present invention.

The DNS query/response transmission/reception unit A121d rewrites the IP address of the communication partner to the loopback address received from the encryption communication path setting unit A123d and notifies, by the DNS response message, the application A11x of the loopback address.

Upon receiving the DNS response message, the application A11x designates, as the destination address, the address contained in the name resolution result given by the DNS response message and transmits a data packet.

The operation of the DNS server B1d will be described next. Upon receiving a DNS query message from the client node A1d, the DNS server B1d executes name resolution of the communication partner of the client node A1d. The DNS server B1d also resolves the communication method to be employed for communication between the client node A1d and the communication partner. More specifically, the DNS server B1d resolves the node type of the communication partner, and if the node is an encryption communication target node for the client node A1d, resolves encryption communication path setting information to be used for communication with the node. The DNS server B1d transmits the resolution result to the client node A1d by a DNS response message.

Figure 13:
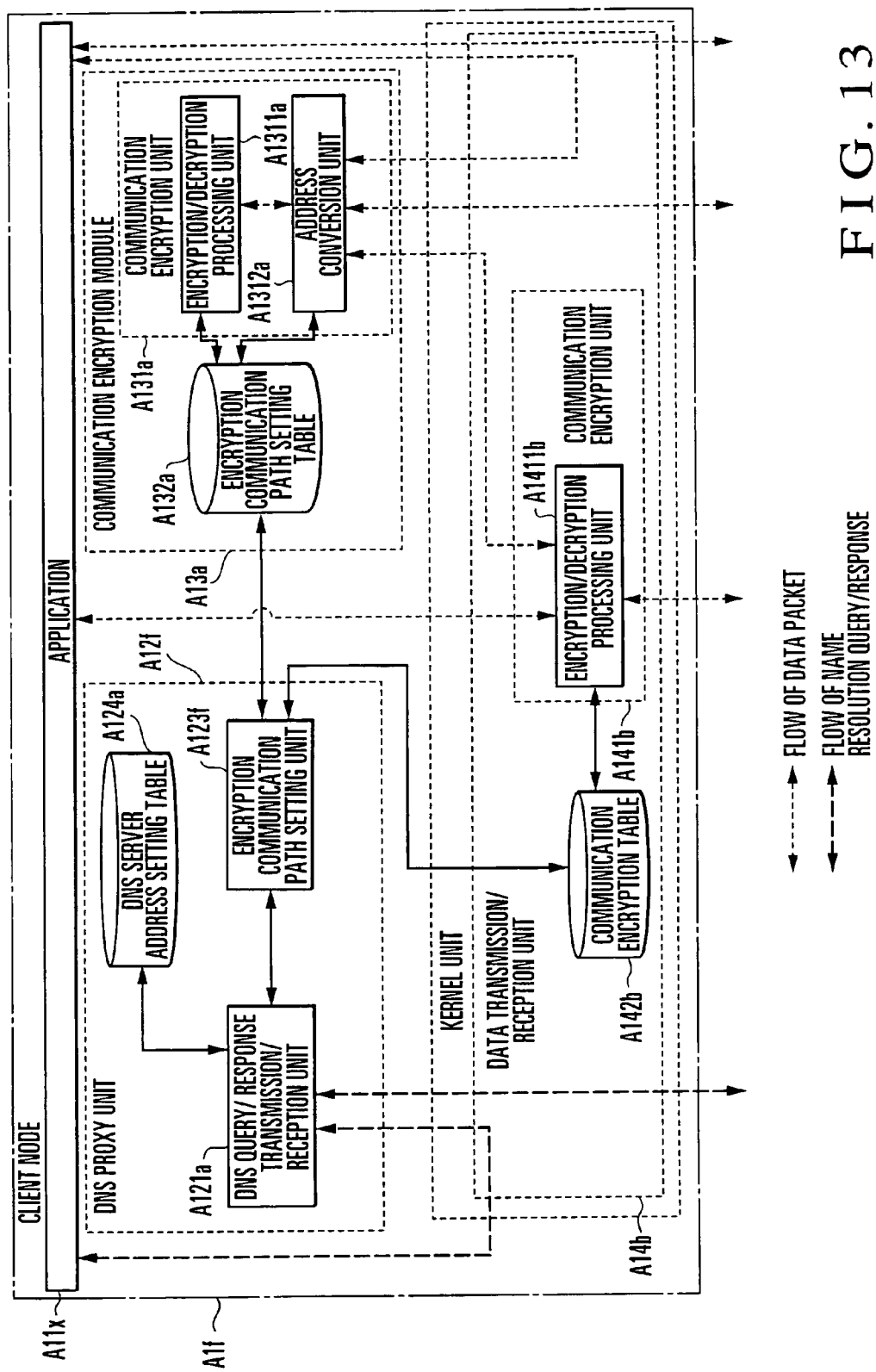
FIG. 13 is a block diagram showing the arrangement of a client node according to a modification to the third embodiment of the present invention.

In the above description, as the arrangement of the client node A1d, the function of encrypting a data packet transmitted from the application A11x is provided by a communication encryption module A13a, as in the first embodiment of the present invention. In this embodiment, however, as the arrangement of the client node A1d, the data packet encryption function may be provided by both the communication encryption module A13a and a data transmission/reception unit A14b, as in the second embodiment of the present invention. FIG. 13 shows the arrangement of a client node A1f of this arrangement. In this case, an encryption communication path setting unit A123f and the data transmission/reception unit A14b have the same functions as those of the encryption communication path setting unit A123c and data transmission/reception unit A14b of the second embodiment of the present invention.

The client node A1f shown in FIG. 13 comprises the communication encryption module A13a that operates as an independent process, the data transmission/reception unit A14b provided in the kernel unit, and a name resolution proxy unit A12f which relays a name resolution query transmitted from the application A11x to the name resolution server to resolve the IP address of another node apparatus and a name resolution response as the response to the query.

The communication encryption module A13a comprises the encryption communication path setting table A132a which holds the correspondence between a communication partner IP address, loopback address, and encryption communication path setting information, and a communication encryption unit A131a which receives a data packet transmitted from the application A11x and having a loopback address set as the destination address, reads out, from the encryption communication path setting table A132a, encryption communication path setting information and a communication partner IP address corresponding to the loopback address set as the destination address of the data packet, and rewrites the destination address of the data packet to the readout communication partner IP address, and encrypts the data packet in accordance with the readout encryption communication path setting information and transmits the data packet.

The data transmission/reception unit A14b comprises an encryption communication path setting table A142b which holds the correspondence between a communication partner IP address and encryption communication path setting information, and a communication encryption unit A141b which receives a data packet transmitted from the application, when the communication partner IP address set as the destination address of the data packet is registered in the encryption communication path setting table A142b, reads out corresponding encryption communication path setting information from the encryption communication path setting table A142b, and encrypts the data packet in accordance with the readout encryption communication path setting information and transmits the data packet.

The name resolution server (not shown) comprises, in addition to the functions associated with name resolution, a setting table which holds the correspondence between encryption communication path setting information and a domain name condition to specify an encryption communication target node, a communication method resolution unit which determines whether the domain name of the other node apparatus contained in a name resolution query or name resolution response matches any one of domain name conditions held in the setting table, and if the domain name matches a condition, determines which of the communication encryption module and the data transmission/reception unit should encrypt communication, and a name resolution response/query transmission/reception unit which adds encryption communication path setting information corresponding to the matched domain name condition and the determination result to the name resolution response and transmits it. The name resolution proxy unit A12f comprises the encryption communication path setting unit A123f which, upon receiving the name resolution response with the encryption communication path setting information and determination result from the name resolution server, registers, in the encryption communication path setting table A132a, the correspondence between the encryption communication path setting informa-tion corresponding to the matched domain name condition, the IP address of the other node apparatus resolved by the name resolution response, and the loopback address that is not used in any other communication session when it is determined to cause the communication encryption module to encrypt communication, and registers, in the encryption communication path setting table A142b, the correspondence between the encryption communication path setting information corresponding to the matched domain name condition and the IP address of the other node apparatus resolved by the name resolution response when it is determined to cause the data transmission/reception unit to encrypt communication, and a name resolution query/response transmission/reception unit A121a which replaces the IP address of the other node apparatus contained in the name resolution response received from the name resolution server with the loopback address in the correspondence and transmits the name resolution response to the application when it is determined to cause the communication encryption module to encrypt communication.

The effects of this embodiment will be described next. In this embodiment, the DNS server B1d unitarily manages the identification information of encryption communication target nodes and encryption communication path setting information to be used for communication. For this reason, individual client nodes need not set and hold the information. Especially in communication executed by a group including a plurality of client nodes, even when encryption communication path setting information or the like is changed, one change in the DNS server B1d suffices. Hence, the information on the DNS server B1d can efficiently be shared in the group.

The fourth embodiment of the present invention will be described next with reference to the accompanying drawings.

Figure 14:
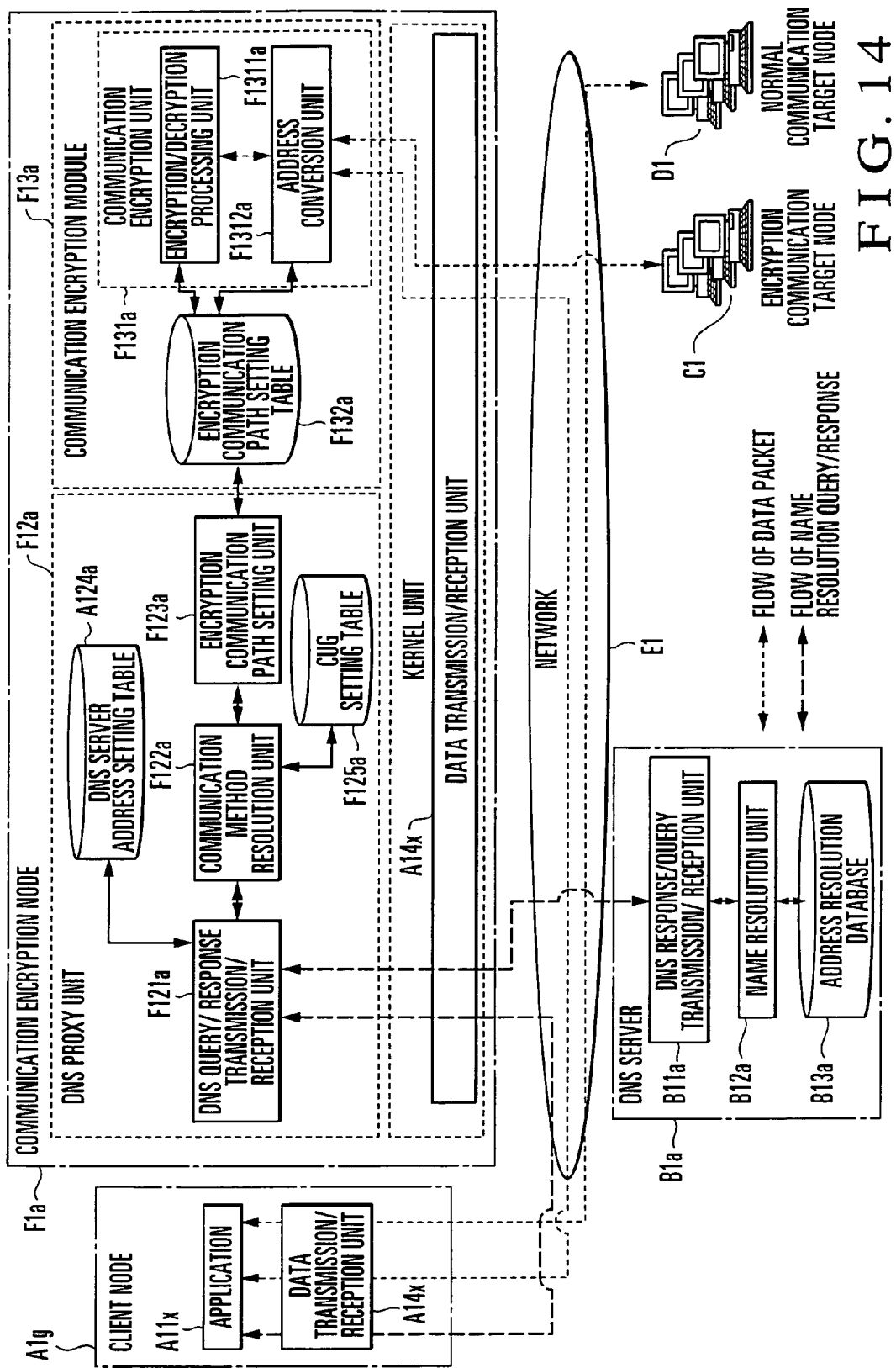
FIG. 14 is a block diagram showing the arrangement of the fourth embodiment of the present invention.

Referring to FIG. 14, the fourth embodiment of the present invention is different from the first embodiment of the present invention in that a client node A1g includes neither DNS Proxy unit nor communication encryption module, and these modules are included in an external communication encryption node F1a. More specifically, this embodiment is different from the first embodiment of the present invention mainly in the following two points.

(1) The node type (i.e., whether the communication partner is an encryption communication target node or normal communication target node) of the communication partner of the client node A1g and encryption communication path setting information to be used for communication with the communication partner when the communication partner is an encryption communication target node are resolved by the communication encryption node F1a.

(2) When the client node A1g communicates with an encryption communication target node, communication encryption processing is executed by the communication encryption node F1a.

The fourth embodiment will be described below with the focus on different points from the first embodiment of the present invention.

The client node A1g will be described first. The client node A1g includes an application A11x and a data transmission/reception unit A14x. The application A11x and data transmission/reception unit A14x have the same functions as those described in the first embodiment of the present invention. In this embodiment, the address of the communication encryption node F1a is set in the client node A1g as a DNS server.

The communication encryption node F1a will be described next. The communication encryption node F1a includes a DNS Proxy unit DNS Proxy unit F12a, communication encryption module A13a, and data transmission/reception unit A14x.

The DNS Proxy unit F12a will be described first. The DNS Proxy unit F12a has the same arrangement as that of the DNS Proxy unit A12a of the first embodiment of the present invention. The DNS Proxy unit F12a has a function of determining the node type of the communication partner of the client node A1g and registering encryption communication path setting information in an encryption communication path setting table F132a. The DNS Proxy unit F12a is different from the DNS Proxy unit A12a of the first embodiment of the present invention in the following two points.

(1) The DNS Proxy unit F12a executes reception processing of a name resolution request from the external client node A1g.

(2) When the communication partner of the client node A1g is an encryption communication target node, the DNS Proxy unit F12a converts the IP address of the communication partner into an intercept address and sends it as a name resolution result in response to a name resolution request for the communication partner. An intercept address indicates an address that allows the communication encryption node F1a to intercept a transmission data packet of the client node A1g when the address is designated as the destination address of the data packet. A detailed example is the IP address of the communication encryption node F1a itself. This will be described later in detail. As will be described later, the IP address of the communication partner is directly used according to circumstances. In that case, the IP address of the communication partner is sent as a name resolution result even after the IP address of the communication partner is converted into the intercept address.

Each module included in the DNS Proxy unit F12a will be described below.

A DNS query/response transmission/reception unit F121a has the same functions as those of the DNS query/response transmission/reception unit A121a of the first embodiment of the present invention except that a DNS response/query message is transmitted/received to/from the external client node A1g.

A communication method resolution unit F122a has the same functions as those of the communication method resolution unit A122a of the first embodiment of the present invention.

An encryption communication path setting unit F123a is different from the encryption communication path setting unit A123a of the first embodiment of the present invention in that the IP address of the communication partner contained in a name resolution result received from the communication method resolution unit F122a is mapped not to a loopback address but to an intercept address. A detailed operation will be described below.

Upon receiving a name resolution result from the communication method resolution unit F122a, the encryption communication path setting unit F123a selects an intercept address that is not used in any other communication session by looking up the encryption communication path setting table F132a, maps the IP address of the communication partner of the client node A1g, which is contained in the name resolution result, to the intercept address, and sends the intercept address to the DNS query/response transmission/reception unit F121a. The encryption communication path setting unit F123a also registers, in the encryption communication path setting table F132a, the correspondence between the selected intercept address, the name resolution result received from the communication method resolution unit F122a, and encryption communication path setting information to be used for communication with the communication partner of the client node A1g.

The same information as in the DNS server address setting table A124a of the first embodiment of the present invention is registered in a DNS server address setting table A124a.

In a CUG setting database F125a, the identification information of encryption communication target nodes (CUG participant nodes) and encryption communication path setting information to be used for communication are registered, as in the CUG setting table A125a of the first embodiment of the present invention. The CUG setting database F125a is looked up by the communication method resolution unit F122a to determine the type of the communication partner of the client node A1g. In the CUG setting database F125a, node identification information and encryption communication path setting information may be registered for each encryption communication target node, as in the CUG setting table A125a of the first embodiment of the present invention. Alternatively, a plurality of encryption communication target nodes may be put into a group, and node identification information and encryption communication path setting information can be registered for each group. In the CUG setting database F125a, the identification information of each encryption communication target node and encryption communication path setting information to be used for communication may be registered for each client node or each group of client nodes, as in the CUG setting database B15d of the third embodiment of the present invention. In this case, the pieces of information are registered in a form shown in, e.g., FIG. 12.

The arrangement of the DNS Proxy unit F12a has been described above.

The communication encryption module F13a will be described next.

A communication encryption unit F131a encrypts a data packet transmitted from the client node A1 to an encryption communication target node. Detailed procedures of the encryption processing will be described below.

When the client node A1g communicates with an encryption communication target node, an intercept address is designated as the destination address of a data packet transmitted from the client node A1g (because an intercept address is sent from the DNS Proxy unit F12a as a name resolution result in response to a name resolution request for an encryption communication target node). All data packets are intercepted by the communication encryption node F1a. The intercepted data packet is transferred to the communication encryption unit F131a. The communication encryption unit F131a grasps the IP address of the communication partner corresponding to the destination intercept address and encryption communication path setting information to be used for communication with the communication partner by looking up the encryption communication path setting table F132a on the basis of the destination address of the intercepted data packet. The communication encryption unit F131a encrypts the intercepted data packet in accordance with the grasped encryption communication path setting information and transmits the data packet to the communication partner of the client node A1g.

A detailed example of the above-described communication encryption processing will be described below. As a detailed example, a case wherein the communication encryption module F12a holds a table 601 shown in FIG. 15 as the encryption communication path setting table F132a is assumed. An example will be described in which the communication encryption node F1*a* intercepts a data packet with a destination address "fe80::3090" transmitted from the client node A1*g*.

First, the communication encryption unit F131*a* looks up the encryption communication path setting table F132*a* and grasps an entry corresponding to the destination address "fe80::3090". In this case, the second entry of the table 601 corresponds to the destination address. The communication encryption unit F131*a* consequently acquires "communication protocol: SSL, digital certificate ID: 10, encryption algorithm: 3DES" as encryption communication path setting information to be used for communication. The communication encryption unit F131*a* rewrites the destination address of the intercepted data packet from "fe80::3090" to "aa91::1001" as the IP address of the communication partner, encrypts the data packet by the 3DES algorithm in accordance with the encryption communication path setting information, and transmits the data packet to the communication partner by the SSL protocol.

Detailed procedures of the communication encryption processing by the communication encryption unit F131*a* have been described above.

The name resolution result (e.g., the IP address of the communication partner) of the communication partner of the client node A1*g*, encryption communication path setting information to be used for communication with the communication partner, and intercept address corresponding to these pieces of information are registered in the encryption communication path setting table F132*a*. The encryption communication path setting table F132*a* is looked up by the encryption communication path setting unit F123*a* to map the IP address of the communication partner of the client node A1*g* to an intercept address and by the communication encryption unit F131*a* to encrypt communication. FIG. 15 shows an example of the encryption communication path setting table F132*a*.

In the encryption communication path setting table 601 shown in FIG. 15, the IP address and domain name of each communication partner of the client node A1*g* are registered as information contained in a name resolution result in correspondence with an intercept address.

IP addresses usable as an intercept address will be described next.

For example, the following two addresses can be used as an intercept address.

(1) The IP address of the communication encryption node F1*a* itself (2) An arbitrary address outside the address scope of a subnet to which the client node A1*g* belongs.

When the IP address (1) of the communication encryption node F1*a* itself is used as an intercept address, the communication encryption node F1*a* must be assigned a plurality of IP addresses. The reason will be described. The communication encryption node F1*a* identifies the communication partner of the client node A1*g* on the basis of the intercept address designated as the destination address of a data packet transmitted from the client node A1*g*. Hence, if a plurality of communication partners or client nodes are assumed to be used, a plurality of IP addresses must selectively be used. The larger the number of IP addresses is, the larger the number of usable communication partners or client nodes is. For this reason, it is convenient that IP addresses should be assigned to the communication encryption node F1*a* as much as possible.

When an arbitrary address (2) outside the address scope of a subnet to which the client node A1*g* belongs is used as an intercept address, the communication encryption node F1*a* must be the default gateway of the client node A1*g*. When the client node A1*g* transmits a data packet to an address outside the address scope of the subnet to which the client node A1*g* belongs, the data packet passes through the communication encryption node F1*a* serving as the default gateway for routing processing. If the communication partner of the client node A1*g* is present outside the subnet to which the client node A1*g* belongs, the IP address of the communication partner can directly be used as an intercept address.

The operation of the communication encryption node F1*a* after the client node A1*g* requests name resolution of the communication partner until communication with the communication partner starts in this embodiment will be described next.

Operations of the communication encryption node F1*a* are classified into an operation upon receiving a DNS query from the client node A1*g* and an operation upon intercepting a data packet transmitted from the client node A1*g*.

The operation upon receiving a DNS query from the client node A1*g* will be described with reference to FIG. 2.

When the communication encryption node F1*a* receives a DNS query message from the client node A1*g* (step S101), the DNS query/response transmission/reception unit F121*a* transmits the received DNS query message to an external DNS server B1*a* registered in the DNS server address setting table F124*a* (step S102) and receives a DNS response message from the DNS server B1*a* as a response (step S103).

The DNS query/response transmission/reception unit F121*a* extracts a name resolution result from the received DNS response message and transfers the name resolution result to the communication method resolution unit F122*a*.

The communication method resolution unit F122*a* determines the node type (encryption communication target node or normal communication target node) of the communication partner by looking up the CUG setting database F125*a* on the basis of the received name resolution result (step S104). The subsequent operation changes depending on the type of the communication partner.

A case wherein the communication partner is a normal communication target node will be described first. In this case, the communication method resolution unit F122*a* sends the determination result to the DNS query/response transmission/reception unit F121*a*. The DNS query/response transmission/reception unit F121*a* newly creates a DNS response message on the basis of the name resolution result received from the DNS server B1 and transmits the DNS response message to the client node A1*g* (step S106).

Upon receiving the DNS response message, the client node A1*g* transmits a data packet by setting, as the destination address, the IP address of the communication partner given by the received DNS response message. In this case, the data packet transmitted from the client node A1*g* is transmitted directly to the communication partner without intervention of the communication encryption node F1*a* so that normal communication with the communication partner is executed.

A case wherein the communication partner is an encryption communication target node will be described next. In this case, the communication method resolution unit F122*a* grasps, from the CUG setting database F125*a*, encryption communication path setting information to be used for communication with the communication partner of the client node A1*g* and transfers the encryption communication path setting information to the encryption communication path setting unit F123*a* together with the name resolution result received from the DNS query/response transmission/reception unit F121*a*.

Upon receiving the name resolution result and encryption communication path setting information, the encryption communication path setting unit F123a maps the IP address of the communication partner of the client node A1g to an intercept address that is not used in any other communication session by looking up the encryption communication path setting table F132a. The encryption communication path setting unit F123a sends the mapped intercept address to the communication method resolution unit F122a. The encryption communication path setting unit F123a also registers, in the encryption communication path setting table F132a, the correspondence between the intercept address, the name resolution result received from the communication method resolution unit F122a, and the encryption communication path setting information to be used for communication with the communication partner (step S105).

The communication method resolution unit F122a transfers the intercept address received from the encryption communication path setting unit F123a to the DNS query/response transmission/reception unit F121a.

Upon receiving the intercept address from the communication method resolution unit F122a, the DNS query/response transmission/reception unit F121a creates a DNS response message by rewriting the address of the communication partner contained in the name resolution result received from the DNS server B1a to the intercept address and transmits the DNS response message to the client node A1g. That is, the client node A1g receives the intercept address selected by the encryption communication path setting unit F123a as the name resolution result for the domain name of the communication partner (step S106).

Upon receiving the DNS response message, the client node A1g designates the intercept address contained in the name resolution result as the destination address and transmits the data packet. As a result, the data packet is intercepted by the communication encryption node F1a and encrypted.

The operation when the communication encryption node F1a receives a DNS query from the client node A1g has been described above.

The operation when the communication encryption node F1a intercepts a data packet transmitted from the client node A1g will be described next.

When the communication encryption node F1a intercepts a data packet transmitted from the client node A1g, the communication encryption unit F131a acquires the IP address of the communication partner and encryption communication path setting information to be used for communication with the communication partner of the client node A1g by looking up the encryption communication path setting table F132a on the basis of the destination address (an intercept address is designated) of the data packet. Using the acquired encryption communication path setting information, the communication encryption unit F131a causes an encryption/decryption processing unit F1311a to encrypt the intercepted data packet, causes an address conversion unit A1312a to rewrite the destination address of the data packet from the intercept address to the IP address of the communication partner, and transmits the data packet to the communication partner.

Figure 16:
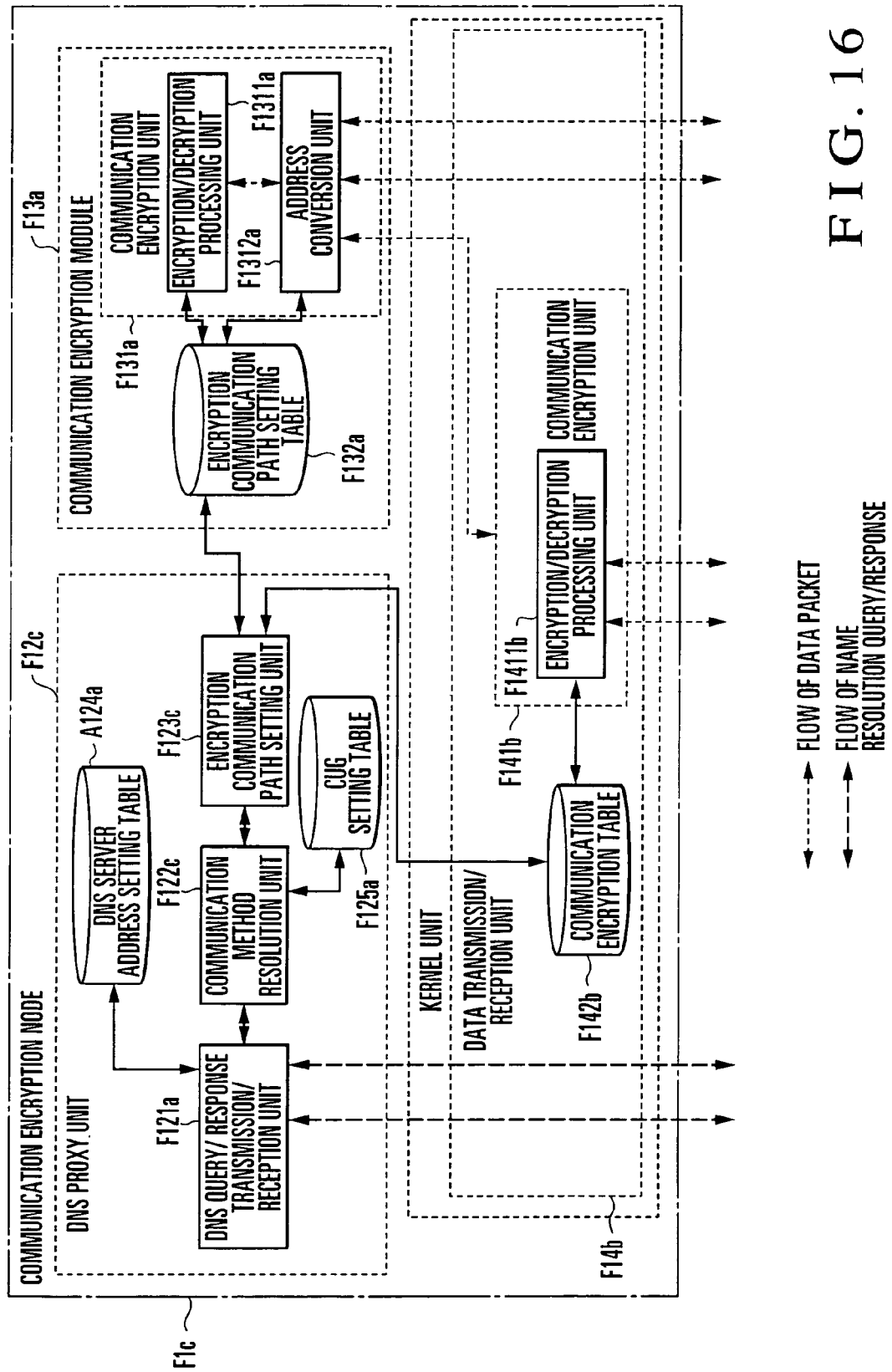
FIG. 16 is a block diagram showing the arrangement of a client node according to a modification to the fourth embodiment of the present invention.

In the above description, as the arrangement of the communication encryption node F1a, the function of encrypting a data packet transmitted from the client node A1g is provided by the communication encryption module F13a, as in the first embodiment of the present invention. In this embodiment, however, as the arrangement of the communication encryption node F1a, the data packet encryption function may be provided by both the communication encryption module F13a and a data transmission/reception unit F14b, as in the second embodiment of the present invention. FIG. 16 shows the arrangement of a communication encryption node F1b of this arrangement. In this case, an encryption communication path setting unit F123c and the data transmission/reception unit F14b have the same functions as those of the encryption communication path setting unit F123c and data transmission/reception unit F14b of the second embodiment of the present invention.

A communication encryption node F1c shown in FIG. 16 comprises the communication encryption module F13a that operates as an independent process, the data transmission/reception unit F14b provided in the kernel unit, and a name resolution proxy unit F12c which relays a name resolution query transmitted from the application to the name resolution server to resolve the IP address of another node apparatus and a name resolution response as the response to the query.

The communication encryption module F13a comprises the encryption communication path setting table F132a which holds the correspondence between a communication partner IP address, first intercept address, and encryption communication path setting information, and the communication encryption unit F131a which receives a data packet transmitted from the application and having the first intercept address set as the destination address, reads out, from the encryption communication path setting table F132a, encryption communication path setting information and a communication partner IP address corresponding to the first intercept address set as the destination address of the data packet, and encrypts the data packet having the readout communication partner IP address set as the destination address in accordance with the readout encryption communication path setting information and transmits the data packet.

The data transmission/reception unit F14b comprises an encryption communication path setting table F142b which holds the correspondence between a communication partner IP address, a second intercept address, and encryption communication path setting information, and a communication encryption unit F141b which receives a data packet transmitted from the application and having the second intercept address set as the destination address, reads out, from the encryption communication path setting table F142b, encryption communication path setting information and a communication partner IP address corresponding to the second intercept address set as the destination address of the data packet, and encrypts the data packet having the readout communication partner IP address set as the destination address in accordance with the readout encryption communication path setting information and transmits the data packet.

The name resolution proxy unit F12c comprises the CUG setting table F125a which holds the correspondence between encryption communication path setting information and a domain name condition to specify an encryption communication target node, a communication method resolution unit F122c which determines whether the domain name of the other node apparatus contained in a name resolution query or name resolution response matches any one of domain name conditions held in the CUG setting table G125a, and if the domain name matches a condition, determines which of the communication encryption module F13a and the data transmission/reception unit F14b should encrypt communication, the encryption communication path setting unit F123c which registers, in the encryption communication path setting table F132a, the correspondence between the encryption communication path setting information corresponding to the matched domain name condition, the IP address of the other node apparatus resolved by the name resolution response, and the first intercept address that is not used in any other communication session when the communication method resolution unit F122c determines to cause the communication encryption module F13a to encrypt communication, and registers, in the encryption communication path setting table F142b, the correspondence between the encryption communication path setting information corresponding to the matched domain name condition, the IP address of the other node apparatus resolved by the name resolution response, and the second intercept address that is not used in any other communication session when the communication method resolution unit F122c determines to cause the data transmission/reception unit F14b to encrypt communication, and the name resolution query/response transmission/reception unit F121a which replaces the IP address of the other node apparatus contained in the name resolution response received from the name resolution server with the first intercept address in the correspondence and transmits the name resolution response to the application when the communication method resolution unit F122c determines to cause the communication encryption module F13a to encrypt communication, and replaces the IP address of the other node apparatus contained in the name resolution response received from the name resolution server with the second intercept address in the correspondence and transmits the name resolution response to the application when the communication method resolution unit F122c determines to cause the data transmission/reception unit F14b to encrypt communication.

In the above description, the node type of the communication partner, and if the communication partner is an encryption communication target node, encryption communication path setting information to be used for communication with the communication partner are resolved in the communication encryption node F1a. This embodiment may employ an arrangement for causing the DNS server B1a to execute the resolution, as in the third embodiment of the present invention. In this case, the DNS server B1a has the same arrangement as that of the DNS server B1b shown in FIG. 11 described in the third embodiment, and the communication encryption node F1a has the arrangement shown in FIG. 17. In this case, a DNS query/response transmission/reception unit F121d has the same functions as those of the DNS query/response transmission/reception unit A121d of the third embodiment of the present invention.

Figure 17:
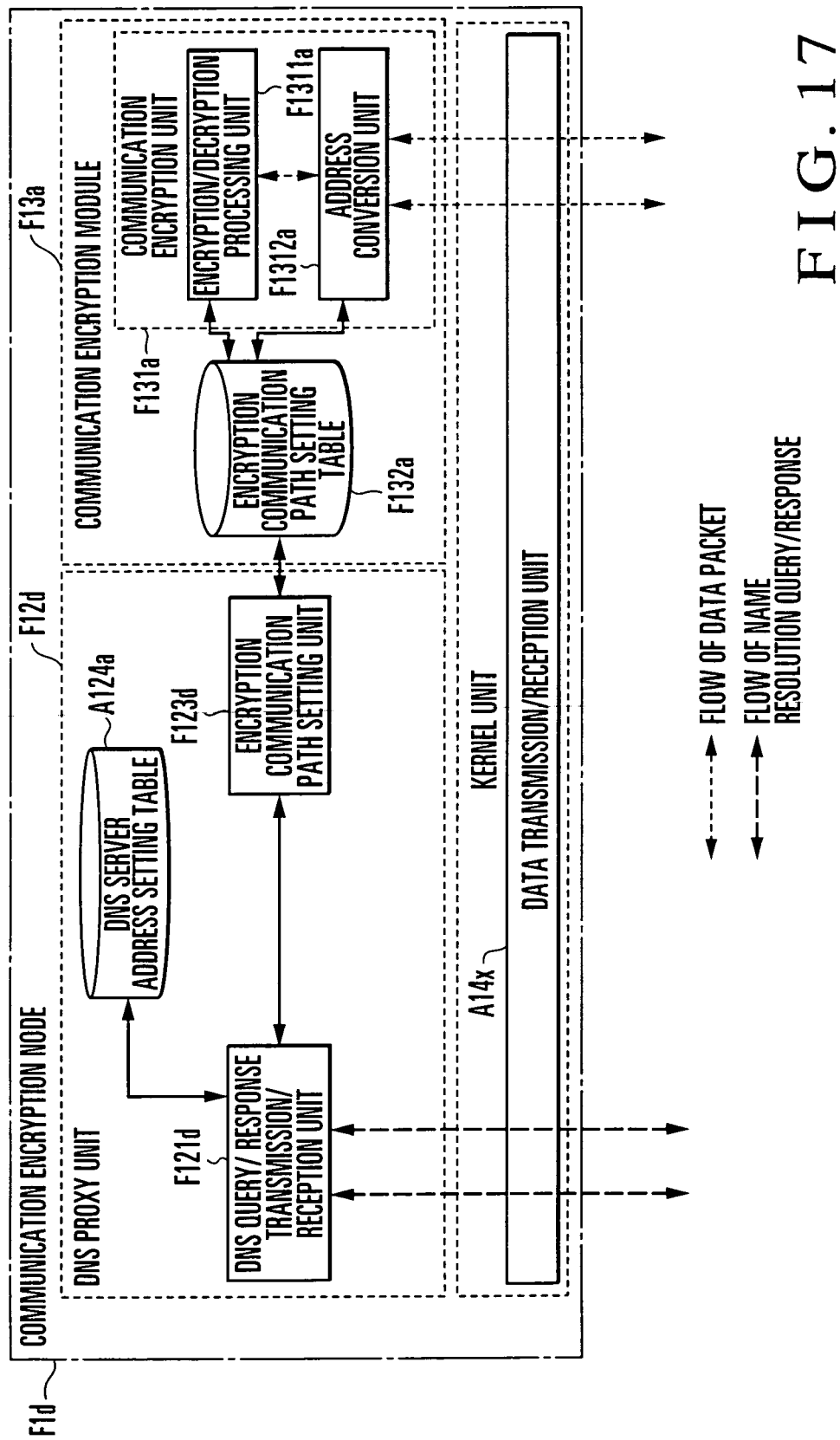
FIG. 17 is a block diagram showing the arrangement of a client node according to another modification to the fourth embodiment of the present invention.

A communication encryption node F1d shown in FIG. 17 comprises the communication encryption module F13a that operates as an independent process, and a name resolution proxy unit F12d which relays a name resolution query transmitted from the application to the name resolution server to resolve the IP address of another node apparatus and a name resolution response as the response to the query.

The communication encryption module F13a comprises the encryption communication path setting table F132a which holds the correspondence between a communication partner IP address, an intercept address, and encryption communication path setting information, and the communication encryption unit F131a which receives a data packet transmitted from the application and having the intercept address set as the destination address, reads out, from the encryption communication path setting table F132a, encryption communication path setting information and a communication partner IP address corresponding to the intercept address set as the destination address of the data packet, and encrypts the data packet having the readout communication partner IP address set as the destination address in accordance with the readout encryption communication path setting information and transmits the data packet.

The name resolution server (not shown) comprises, in addition to the functions associated with name resolution, a setting table which holds the correspondence between encryption communication path setting information and a domain name condition to specify an encryption communication target node, a communication method resolution unit which determines whether the domain name of the other node apparatus contained in a name resolution query or name resolution response matches any one of domain name conditions held in the setting table, and a name resolution response/query transmission/reception unit which adds encryption communication path setting information corresponding to the matched domain name condition to the name resolution response and transmits it. The name resolution proxy unit F12d comprises an encryption communication path setting unit F123d which, upon receiving the name resolution response with the encryption communication path setting information from the name resolution server, registers, in the encryption communication path setting table F132a, the correspondence between the encryption communication path setting information, the IP address of the other node apparatus resolved by the name resolution response, and the intercept address that is not used in any other communication session, and the DNS query/response transmission/reception unit F121d which transmits, to the application as the name resolution response, an intercept address corresponding to the IP address of the other node apparatus contained in the name resolution response received from the name resolution server.

An encryption communication system having the combination of the arrangements in FIGS. 16 and 17 can also be considered. That is, encryption is done in one of the communication encryption module and data transmission/reception unit of the communication encryption node, as in FIG. 16, and determination of an encryption target node and determination of an encryption location are executed by the name resolution server, as in FIG. 17. In this case, the communication encryption node does not have the functions of the communication method resolution unit F122c and CUG setting table F125a of the name resolution proxy unit F12c in the communication encryption node F1C in FIG. 16.

The effects of this embodiment will be described below. In this embodiment, communication partner type determination and communication encryption processing for an encryption communication target node are done not in each client node but in an external communication encryption node. Hence, the system can be used even when no communication encryption module can be installed in the client node. In addition, the load on the client node is light as compared to a case wherein communication partner type determination and communication encryption processing for an encryption communication target node are executed in the client node. Hence, the system can be used even in a node (e.g., a cellular phone and PDA) with a relatively low calculation capability.

The fifth embodiment of the present invention will be described next in detail with reference to the accompanying drawings.

Figure 18:
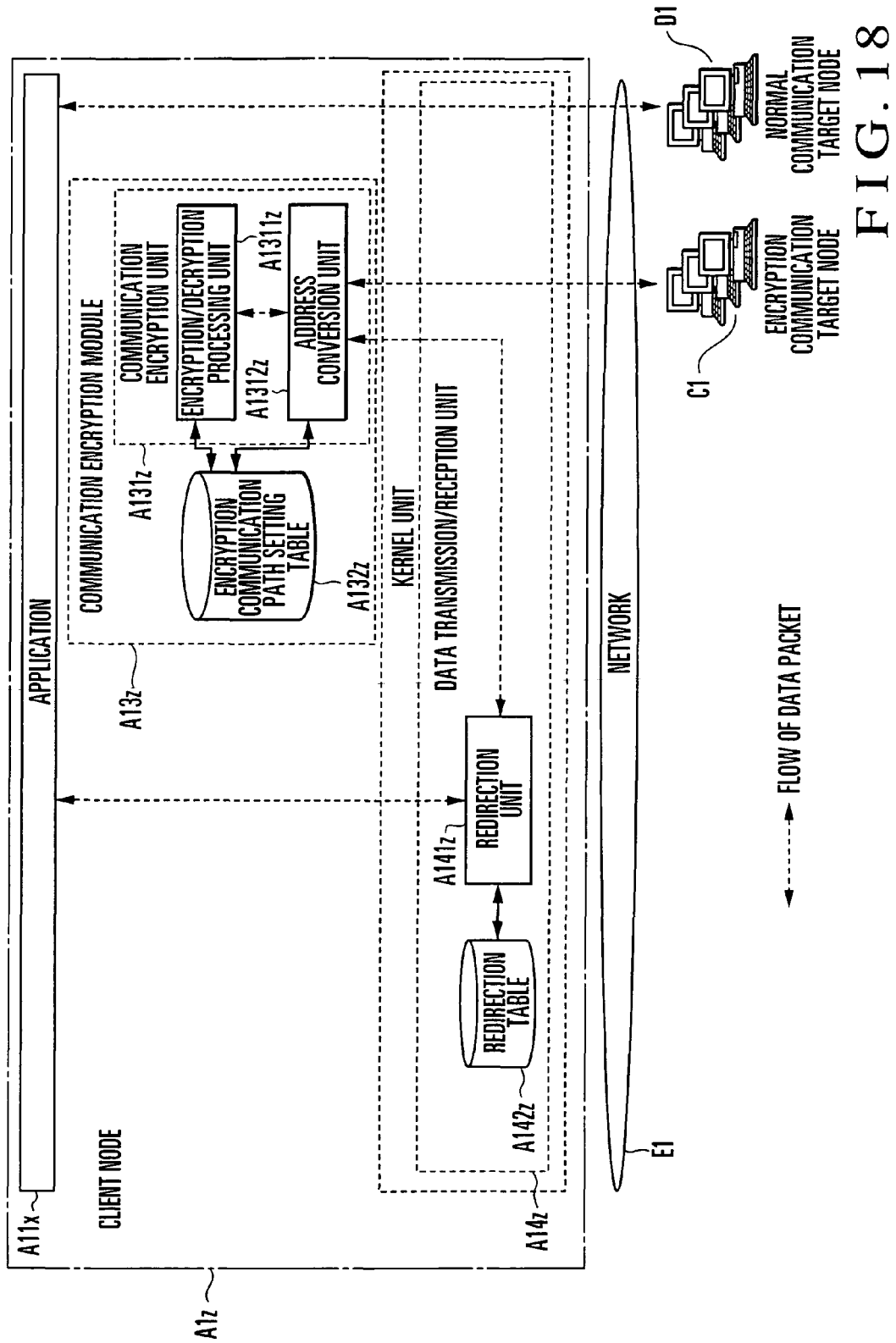
FIG. 18 is a block diagram showing the arrangement of the fifth embodiment of the present invention.

Referring to FIG. 18, the fifth embodiment of the present invention is implemented by a client node A1z, encryption communication target node C1, and normal communication target node D1. The client node A1z, encryption communication target node C1, and normal communication target node D1 are connected through a network E1.

The client node A1z includes an application A11x, communication encryption module A13z, and data transmission/reception unit A14z.

The application A11x is software such as a Web browser, e-mail software, or video conference software to implement its purpose by using a computer.

The data transmission/reception unit A14z exists in the kernel unit of the OS of the client node A1z to transmit/receive a data packet. All data packets transmitted from the application A11x are temporarily intercepted by the data transmission/reception unit A14z. A data packet addressed to an encryption communication target node is redirected to the communication encryption module A13z. A data packet addressed to a normal communication target node is transmitted directly to the normal communication target node.

The data transmission/reception unit A14z includes a redirection unit A141z and a redirection table A142z.

The redirection unit A141z will be described. The redirection unit A141z has a function of redirecting, of data packets transmitted from the application, a data packet addressed to an encryption communication target node to the communication encryption module A13z. The redirection unit A141z also has a function of relaying a data packet transmitted from the communication encryption module A13z to the application A11x. Each function will be described below in detail.

(1) Function of Redirecting a Data Packet Transmitted from the Application A11x

When the data transmission/reception unit A14z intercepts a data packet transmitted from the application A11x, the redirection unit A141z determines by looking up the redirection table A142z whether the data packet is addressed to an encryption communication target node (to be referred to as a data packet type hereinafter). An example of data packet type criterion is the destination IP address of a data packet. In this case, if the destination IP address of the data packet is registered in the redirection table A142z as the IP address of an encryption communication target node, the data packet type of the data packet is determined as "addressed to an encryption communication target node".

If it is determined that the data packet is addressed to an encryption communication target node, the redirection unit A141z redirects the data packet to the communication encryption module A13z. Since the communication encryption module A13z must identify the communication partner to transmit the redirected data packet, the redirection unit A141z rewrites information contained in the data packet such that the communication encryption module A13z can identify, on the basis of the information contained in the data packet, the communication partner to transmit the data packet. The direction and packet information rewrite will be described below in detail.

Redirection

Redirection is done by rewriting the destination IP address of a data packet to a loopback address. A loopback address is generally an IP address included in "127.0.0.0/8". A loopback address is an IP address address to execute communication closed in the self node. When the data packet is transmitted to the loopback address, the communication encryption module A13z can intercept the data packet.

Packet Information Rewrite

Information contained in a packet is rewritten in accordance with a predetermined rule. Examples of information to be rewritten (i.e., information used by the communication encryption module A13z to identify the destination communication partner of a data packet; to be referred to as communication partner identification information hereinafter) are a destination IP address and a destination port number. Examples of communication partner identification information will be described below.

Destination IP Address

As described above, a destination IP address is rewritten to a loopback address for redirection. When a destination IP address is rewritten to a loopback address that changes depending on the communication partner (the destination IP address of a data packet), the communication encryption module A13z can identify the data packet communication partner from the destination loopback address of the received data packet. As an example of the rule, a data packet addressed to "1.2.3.4" is rewritten (redirected) to a destination IP address: "127.1.1.1", and a data packet addressed to "5.6.7.8" is rewritten (redirected) to a destination IP address: "127.2.2.2".

Destination Port Number

When an intercepted destination port number is rewritten to a destination port number that changes depending on the communication partner (the destination IP address of a data packet), the communication encryption module A13z can identify the data packet communication partner from the destination port number of the received data packet. As an example of the rule, a data packet addressed to "1.2.3.4" is rewritten (redirected) to a destination IP address; "127.0.0.1" and port number: "30000", and a data packet addressed to "5.6.7.8" is rewritten (redirected) to a destination IP address: "127.0.0.1" and port number: "30100".

Other examples of communication partner identification information are a transmission source IP address and transmission source port number. An example of the header information of a packet has been described above. As another example of the rewrite rule, the redirection unit A141z may add, to the payload part, new information that can be communication partner identification information. A plurality of pieces of communication partner identification information may be combined.

(2) Function of Relaying a Data Packet Transmitted from the Communication Encryption Module A13z A data packet transmitted from the communication encryption module A13z to a loopback address is relayed to the application A11x.

The redirection table A142z will be described next. The data packet type criterion and communication partner identification information rewrite rule are registered in the redirection table A142z. FIG. 19 shows an example of the redirection table A142z. Sets of a communication partner IP addresses and loopback addresses are registered in a table 1001 shown in FIG. 19. The communication partner IP address corresponds to the data packet type criterion. The loopback address corresponds to the communication partner identification information rewrite rule. That is, whether a data packet is addressed to an encryption communication target node is determined by checking whether a communication partner IP address identical to the destination IP address of the data packet is registered in the table 1001. If the data packet is addressed to an encryption communication target node, the destination IP address is rewritten to a corresponding loopback address. For example, when the data transmission/reception unit A14z intercepts a data packet addressed to "133.11.64.24", the destination IP address is rewritten to "127.1.1.1" to redirect the data packet to the communication encryption module A13z.

The arrangement of the data transmission/reception unit A14z has been described above.

The communication encryption module A13z will be described next. The communication encryption module A13z has the communication encryption module A13z which encrypts communication between the application A11x and the encryption communication target node C1. The communication encryption module A13z includes a communication encryption unit A131z and an encryption communication path setting table A132z.

The communication encryption unit A131z will be described. The communication encryption unit A131z has a function of identifying the communication partner of the application A11x and grasping encryption communication path setting information to be used for communication by looking up the encryption communication path setting table A132z on the basis of the communication partner identification information of a data packet redirected from the redirection unit A141z, and encrypting the communication. The communication encryption unit A131z also has a function of decrypting a data packet received from an external communication partner node and transferring the data packet to the application A11x. The communication encryption unit A131z includes an encryption/decryption processing unit A1311z and an address conversion unit A1312z.

The encryption/decryption processing unit A1311z has a function of looking up the encryption communication path setting table A132z on the basis of the communication partner identification information of a data packet redirected from the redirection unit A141z and encrypting the received data packet in accordance with encryption communication path setting information registered in the table. The encryption/decryption processing unit A1311z also has a function of looking up the encryption communication path setting table A132a on the basis of the transmission source address of a data packet received from an external communication partner node and decrypting the received data packet in accordance with encryption communication path setting information registered in the table.

The address conversion unit A1312z looks up the encryption communication path setting table A132z on the basis of the communication partner identification information of a data packet redirected from the redirection unit A141z and returns the communication partner identification information to the state before the rewrite by the redirection unit A141z. For example, when communication partner identification information is a destination loopback address, the destination loopback address is converted into a corresponding communication partner IP address in the encryption communication path setting table A132z. If communication partner identification information except an IP address is used, the address conversion unit A1312z further rewrites the destination IP address of a redirected data packet from a loopback address to the IP address of the communication partner, although this operation is unnecessary when the communication partner identification information is an IP address, as in the above-described example.

The address conversion unit A1312z also has a function of looking up the encryption communication path setting table A132z on the basis of the transmission source address of a data packet received from an external communication partner node and converting the transmission source address into a loopback address that corresponds to the transmission source address in the encryption communication path setting table A132z.

The encryption communication path setting table A132z will be described next. A communication partner identification information rewrite rule and encryption communication path setting information to be used for communication with a communication partner corresponding to communication partner identification information are registered in the encryption communication path setting table A132z. The same rewrite rule as in the redirection table A142z is registered. A table 1102 shown in FIG. 20 indicates an example of the encryption communication path setting table A132z. In the table 1102, communication partner identification information is the destination IP address of a data packet. As the rewrite rule registered, a destination address is changed from a loopback address to a communication partner IP address (sets of communication partner IP addresses and loopback addresses). Detailed examples of the encryption communication path setting information registered in the encryption communication path setting table A132z are a communication protocol (e.g., IPsec, SSL (Secure Socket Layer), or TLS (Transport Layer Security)), digital certificate ID (a digital certificate is an electronic certificate to prove self presence and includes, e.g., X.509 of ITU-T (International Telecommunication Union-Telecommunication Standardization Sector) recommendation: in this description, a digital certificate ID indicates an identifier to be used to select a digital certificate to be used by the application A11x in a session), and an encryption algorithm (e.g., DES (Data Encryption Standard), 3DES (triple-DES), or AES (Advanced Encryption Standard)).

Assume a case wherein the communication encryption module A13z holds the table 1102 shown in FIG. 20 as the encryption communication path setting table A132z. An example of communication encryption processing will be described, in which the communication encryption unit A131z receives a data packet with a destination address "127.1.1.1".

Upon receiving a data packet, the address conversion unit A1321z transfers it to the encryption/decryption processing unit A1311z. The encryption/decryption processing unit A1311z looks up the encryption communication path setting table A132z and grasps an entry corresponding to the destination address "127.1.1.1". In this case, the second entry of the table 101 corresponds to "127.1.1.1". As a result, "communication protocol: SSL, digital certificate ID: 10, encryption algorithm: 3DES" is acquired as encryption communication path setting information to be used for communication. The encryption/decryption processing unit A1311z encrypts the data packet received from the application A11x by the 3DES algorithm in accordance with procedures defined by the SSL protocol on the basis of the encryption communication path setting information and transfers the data packet to the address conversion unit A1312z. The address conversion unit A1312z also looks up the encryption communication path setting table A132z to check an entry corresponding to the destination address "127.1.1.1" and grasps the IP address of the communication partner. In this case, "133.11.64.24" is grasped as the IP address of the communication partner. The address conversion unit A1312z rewrites the destination address from "127.1.1.1" to "133.11.64.24" and transmits the data packet.

When a data packet encrypted by the 3DES algorithm is received by the SSL protocol from an external node with an IP address "133.11.64.24", the communication encryption unit A131z looks up the encryption communication path setting table A132z, as in encryption processing. The encryption/decryption processing unit A1311z decrypts the data packet. Then, the address conversion unit A1312z rewrites the destination address from "133.11.64.24" to "127.1.1.1" and transmits the data packet to the application A11x.

In the above-described example, address conversion is done after encryption/decryption processing. Conversely, encryption/decryption processing may be done after address conversion. Address conversion and encryption/decryption processing may be executed simultaneously in parallel.

The operation of the client node A1z when the application A11x communicates with an external communication partner node in this embodiment will be described next in detail with reference to FIG. 21.

When the application A11x transmits a data packet to a communication partner node, the data packet is intercepted by the data transmission/reception unit A14z (step S1001). The redirection unit A141z determines whether the destination IP address indicates an encryption communication target node or normal communication target node by looking up the redirection table A142z on the basis of the destination IP address of the intercepted data packet (step S1002). If the data packet is addressed to a normal communication target node, the data packet is transmitted directly to the normal communication target node (step S1006). If the data packet is addressed to an encryption communication target node, the communication partner identification information is rewritten on the basis of the communication partner identification information rewrite rule registered in the redirection table A142z. After the rewrite, the destination IP address is designated to the loopback address to redirect the data packet to the communication encryption module (step S1003).

When the communication encryption unit A131z receives the redirected data packet, the encryption/decryption processing unit A1311z grasps encryption communication path setting information corresponding to the communication partner identification information by looking up the encryption communication path setting table A132z on the basis of the communication partner identification information of the data packet and encrypts the data packet in accordance with the setting information (step S1004). Then, the address conversion unit A1312z looks up the encryption communication path setting table A132z on the basis of the communication partner identification information of the data packet and rewrites, in accordance with the registered rewrite rule, the communication partner identification information to the state when the application A11x transmitted the data packet. The address conversion unit A1312z also changes the destination IP address of the received data packet from the loopback address to the IP address of the communication partner (step S1005). After that, the address conversion unit A1312z transmits the data packet to the communication partner (step S1006).

In the above description, communication encryption is executed only in the communication encryption module. In this embodiment, however, both the communication encryption function provided by the communication encryption module and the communication encryption function provided by the data transmission/reception unit in the kernel unit of the OS may be used, as in the second embodiment of the present invention.

The effects of this embodiment will be described next. In this embodiment, when the redirection unit A141z redirects a data packet intercepted by the data transmission/reception unit A14z to the communication encryption module, the communication partner identification information of the data packet is rewritten in accordance with the destination IP address of the data packet (i.e., the IP address of the communication partner of the application A11x). For this reason, the communication encryption module that has received the redirected data packet can identify, on the basis of the communication partner identification information of the received data packet, the communication partner to transmit the data packet and the encryption communication path to be used for communication with the communication partner. Hence, the client node A1 can simultaneously execute encryption communication directly with a plurality of communication partners.

The application A11x can transmit a data packet not to a loopback address but to the IP address of a communication partner. If a communication log should be kept in the application, in the first embodiment, a loopback address that is different from the IP address of the actual partner is recorded. In the fifth embodiment, however, the IP address of the actual partner is recorded. Hence, any inconsistency in log level can be prevented.

The sixth embodiment of the present invention will be described next in detail with reference to the accompanying drawings.

Figure 22:
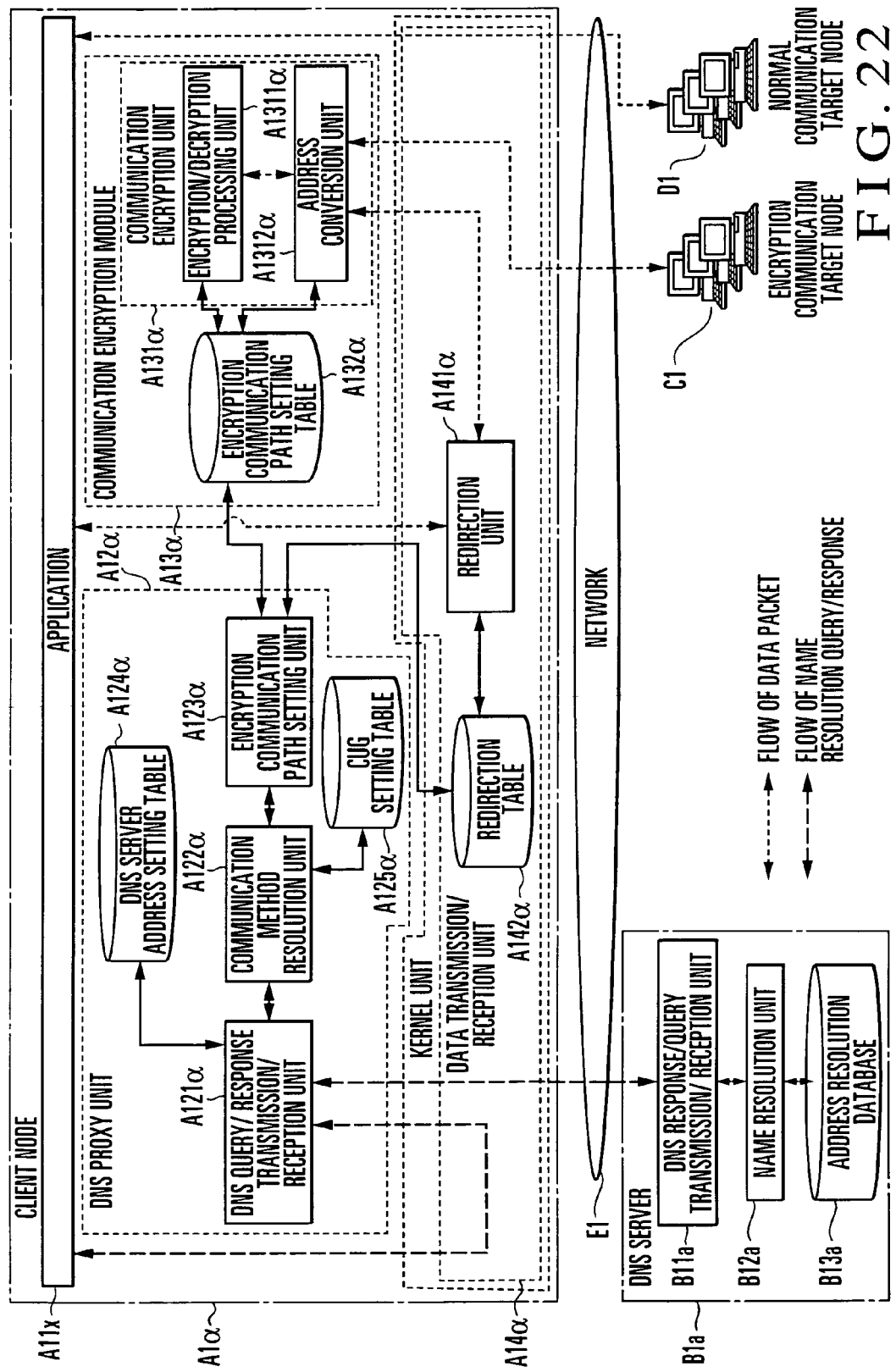
FIG. 22 is a block diagram showing the arrangement of the sixth embodiment of the present invention.

Referring to FIG. 22, the sixth embodiment of the present invention is implemented by a client node A1 α, DNS server B1a, encryption communication target node C1, and normal communication target node D1. The client node A1α, encryption communication target node C1, and normal communication target node D1 are connected through a network E1. The client node A1α includes an application A11x, DNS Proxy unit A12α, communication encryption module A13α, and data transmission/reception unit A14α. That is, this embodiment has an arrangement obtained by adding the DNS server B1a and DNS Proxy unit A12α to the arrangement of the fifth embodiment of the present invention.

The application A11x is software such as a Web browser, e-mail software, or video conference software to implement its purpose by using a computer.

The data transmission/reception unit A14α exists in the kernel unit of the OS of the client node A1α to transmit/receive a data packet. All data packets transmitted from the application A11x are temporarily intercepted by the data transmission/reception unit A14α. A data packet addressed to an encryption communication target node is redirected to the communication encryption module A13α. A data packet addressed to a normal communication target node is transmitted directly to the normal communication target node. The data transmission/reception unit A14α includes a redirection unit A141α and a redirection table A142α. The redirection unit A141α has the same functions as those of the redirection unit A141z of the fifth embodiment. The redirection table A142α has the same arrangement as that of the redirection table A142z of the fifth embodiment and, for example, the arrangement of the table 1101 shown in FIG. 19.

The communication encryption module A13α has a function of encrypting communication between the application A11x and the encryption communication target node C1. The communication encryption module A13α includes a communication encryption unit A131α and an encryption communication path setting table A132α. The communication encryption unit A131α includes an encryption/decryption processing unit A1311α and an address conversion unit A1312α. The communication encryption unit A131α has the same functions as those of the communication encryption unit A131z of the fifth embodiment. The encryption communication path setting table A132α has the same arrangement as that of the encryption communication path setting table A132z of the fifth embodiment and, for example, the arrangement of the table 1102 shown in FIG. 20.

The DNS Proxy unit A12α includes a DNS query/response transmission/reception unit A121α, communication method resolution unit A122α, name resolution unit A123α, DNS server address setting table A124α, and CUG setting table A125α. The DNS Proxy unit A12α resolves the IP address of the communication partner of the application A11x upon receiving a name resolution request from the application A11x. The DNS Proxy unit A12α also determines the node type of the communication partner, and if the communication partner is an encryption communication target node, maps the IP address of the communication partner to a loopback address and registers the mapping relationship in the encryption communication path setting table A132α and redirection table A142α. Unlike the first embodiment of the present invention, not the mapped loopback address but the IP address of the communication partner is directly returned to the application A11x as a name resolution result.

The arrangement of the DNS Proxy unit A12α will be described below.

The DNS query/response transmission/reception unit A121α will be described first. Upon receiving a DNS query message from the application A11x, the DNS query/response transmission/reception unit A121α transmits the DNS query message to the external DNS server B1a registered in the DNS server address setting table A124α. Upon receiving a DNS response message from the external DNS server B1a as the response to the DNS query message, the DNS query/response transmission/reception unit A121α transfers a name resolution result contained in the DNS response message to the communication method resolution unit A122α. The above-described functions are the same as those of the DNS query/response transmission/reception unit A121a of the first embodiment of the present invention. However, the function of returning a name resolution result to the application A11x is different from that of the DNS query/response transmission/reception unit A121a of the first embodiment of the present invention. That is, the DNS query/response transmission/reception unit A121α of this embodiment directly returns the communication partner IP address resolved by the external DNS server B1a to the application A11x as a name resolution result independently of the type of the communication partner.

The communication method resolution unit A122 α has the same functions as those of the communication method resolution unit A122a of the first embodiment of the present invention.

The encryption communication path setting unit A123α will be described next. The encryption communication path setting unit A123α has a function of mapping the IP address of the communication partner of the application A11x, which is contained in the name resolution result received from the communication method resolution unit A122α, to the loopback address. Unlike the encryption communication path setting unit A123a of the first embodiment of the present invention, the encryption communication path setting unit A123α does not notify the DNS query/response transmission/reception unit A121α of the mapped loopback address. As the loopback address to be mapped, an address which is not used in any other communication session is selected by looking up the encryption communication path setting table A132α. The correspondence between the selected loopback address and the name resolution result received from the communication method resolution unit A122α is registered in the encryption communication path setting table A132α. Encryption communication path setting information received from the communication method resolution unit A122α is also registered in the encryption communication path setting table A132α.

In the DNS server address setting table A124α and CUG setting table A125α, the same pieces of information as in corresponding modules of the first embodiment of the present invention are registered. The tables are looked up in the same form as that of corresponding modules of the first embodiment of the present invention.

The arrangement of the DNS Proxy unit A12α has been described above.

The operation of the client node A1α when the application A11x communicates with an external communication partner node in this embodiment will be described next.

Operations of the client node A1α are roughly classified into an operation executed when the application A11x issues a name resolution request for the domain name of a communication partner and an operation executed when a data packet is transmitted to the communication partner.

The operation of the client node A1α when the application A11x issues a name resolution request will be described first.

The application A11x requests name resolution of a communication partner by transmitting a DNS query message to a loopback address (e.g., "127.1.1.1"). The DNS query message transmitted from the application A11x is received by the DNS Proxy unit A12α (more specifically, the DNS query/response transmission/reception unit A121α in the DNS Proxy unit A12α). Subsequent processing is executed in the DNS Proxy unit A12α.

Figure 23:
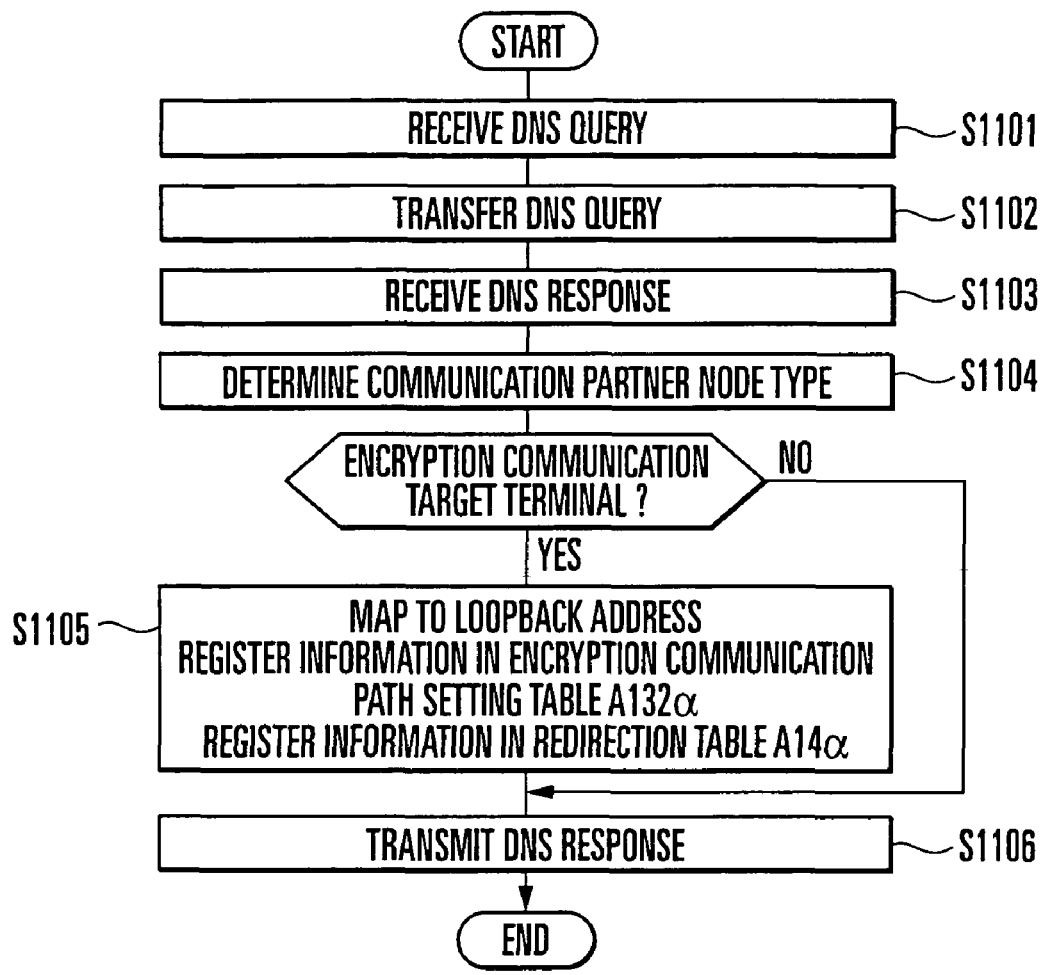
FIG. 23 is a flowchart showing the operation of a DNS Proxy unit according to the sixth embodiment of the present invention upon receiving a name resolution request.

The operation of the DNS Proxy unit A12α upon receiving a DNS query message from the application A11x will be described with reference to FIG. 23.

Upon receiving a DNS query message from the application A11x (step S1101), the DNS query/response transmission/reception unit A121α transfers the received DNS query message to the external DNS server B1a registered in the DNS server address setting table A124α (step S1102) and receives a DNS response message from the DNS server B1a as a response (step S1103).

The DNS query/response transmission/reception unit A121α extracts a name resolution result from the received DNS response message and transfers the name resolution result to the communication method resolution unit A122α.

The communication method resolution unit A122 a determines the type (encryption communication target node or normal communication target node) of the communication partner by looking up the CUG setting table A125α on the basis of the received name resolution result (step S1104). If the communication partner is an encryption communication target node, the communication method resolution unit A122α grasps encryption communication path setting information registered in the CUG setting table A125α.

A case wherein the communication partner is a normal communication target node will be described first. In this case, the communication method resolution unit A122α sends the determination result to the DNS query/response transmission/reception unit A121 α. The DNS query/response transmission/reception unit A121α transfers the DNS response message received from the DNS server B1a to the application A11x (step S1106).

Upon receiving the DNS response message, the application A11x transmits the data packet directly to the IP address of the communication partner given by the DNS response message. The data packet is intercepted by the redirection unit A141α in the kernel unit and determined as "addressed to a normal communication target node" on the basis of the registered information in the redirection table. As a result, the data packet transmitted from the application A11x is transmitted directly to the communication partner without intervention of the communication encryption module so that normal communication with the communication partner is executed.

A case wherein the communication partner is an encryption communication target node will be described next. In this case, the communication method resolution unit A122α transfers, to the encryption communication path setting unit A123α, the name resolution result received from the DNS query/response transmission/reception unit A121α and the above-described grasped encryption communication path setting information. Upon receiving the name resolution result, the encryption communication path setting unit A123α maps the IP address of the communication partner of the application A11x to a loopback address that is not used in any other communication session by looking up the encryption communication path setting table A132 α. The encryption communication path setting unit A123 α registers, in the redirection table A142α and encryption communication path setting table A132α, the correspondence between the loopback address and the name resolution result received from the communication method resolution unit A122α. The encryption communication path setting unit A123α also registers the encryption communication path setting information in the encryption communication path setting table (step S1105).

In this embodiment, the DNS query/response transmission/reception unit A121α directly returns the communication partner IP address resolved by the DNS server B1*a* to the application A11*x* as a name resolution result independently of the type of the communication partner, unlike the first embodiment of the present invention (step S1106).

Upon receiving the DNS response message, the application A11*x* transmits the data packet directly to the IP address of the communication partner. The data packet is intercepted by the redirection unit A141α in the kernel unit, determined as "addressed to an encryption communication target node" on the basis of the registered information in the redirection table, and transferred via the communication encryption module.

The operation of the client node A1α when the application A11*x* issues a name resolution request has been described above.

The operation when the application A11*x* transmits a data packet to a communication partner is the same as in the fifth embodiment, and the operation shown in FIG. 21 is executed.

In the above description, communication encryption is executed only in the communication encryption module. In this embodiment, however, both the communication encryption function provided by the communication encryption module and the communication encryption function provided by the data transmission/reception unit in the kernel unit of the OS may be used, as in the second embodiment of the present invention.

In the above description, the node type of the communication partner, and if the communication partner is an encryption communication target node, encryption communication path setting information to be used for communication with the communication partner are resolved in the client node A1*a*. This embodiment may employ an arrangement for causing the DNS server B1*a* to execute the resolution, as in the third embodiment of the present invention. In this case, the DNS server B1*a* has the same arrangement as that of the DNS server B1*b* shown in FIG. 11 described in the third embodiment. The DNS Proxy unit A12α in a client node F1α includes a DNS query/response transmission/reception unit, encryption communication path setting unit, and DNS server address setting table, like the DNS Proxy unit F12*d* shown in FIG. 17. The DNS query/response transmission/reception unit transmits, to the name resolution server, a name resolution query transmitted from the application to resolve the IP address of another node apparatus, receives, from the name resolution server, a name resolution response containing a determination result indicating whether the other node apparatus is an encryption communication target node, encryption communication path setting information, and the IP address of the other node apparatus, and transmits the IP address of the other node apparatus contained in the name resolution response to the application as a name resolution response. When the other node apparatus is an encryption communication target node, the encryption communication path setting unit registers, in the encryption communication path setting table, the correspondence between the IP address of the other node apparatus, communication partner identification information that is not used in any other communication session, and the encryption communication path setting information. The encryption communication path setting unit also registers, in the redirection table, the correspondence between the IP address of the encryption communication target node and the rewrite rule of communication partner identification information that is not used in any other communication session.

In the above description, (1) resolution of the node type of the communication partner, and if the communication partner is an encryption communication target node, resolution of encryption communication path setting information to be used for communication with the communication partner, and (2) communication encryption/decryption processing in communicating with the encryption communication target node are executed in the client node. In this embodiment, the above-described processing operations may be executed by a communication encryption node outside the client node, as in the fourth embodiment of the present invention. In this case, the client node has the same arrangement as that of the client node A1*g* of the fourth embodiment of the present invention. The communication encryption node has the arrangement of a communication encryption node F1α shown in FIG. 24.

Figure 24:
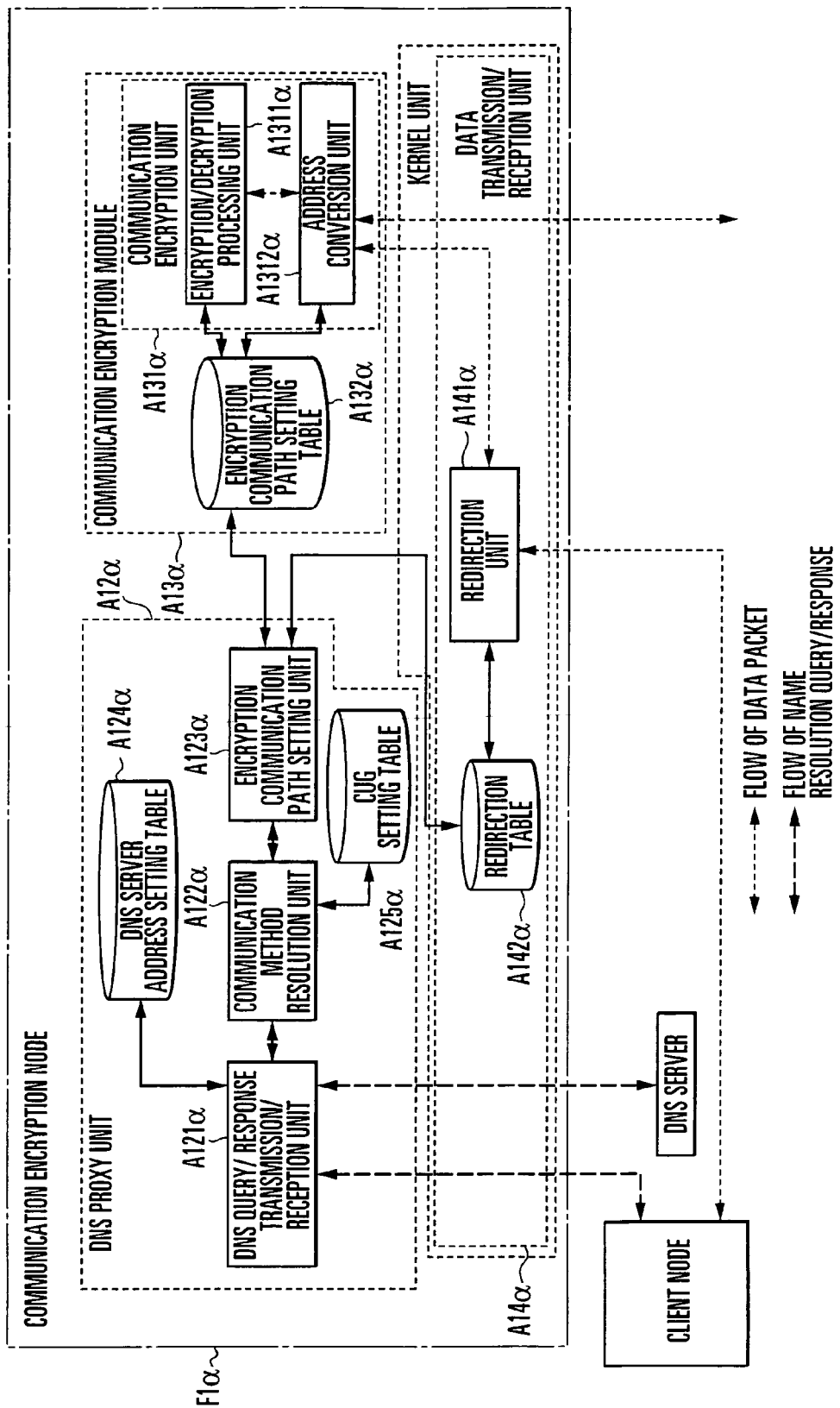
FIG. 24 is a block diagram showing the arrangement of a communication encryption node according to a modification to the sixth embodiment of the present invention.
Figure 25:
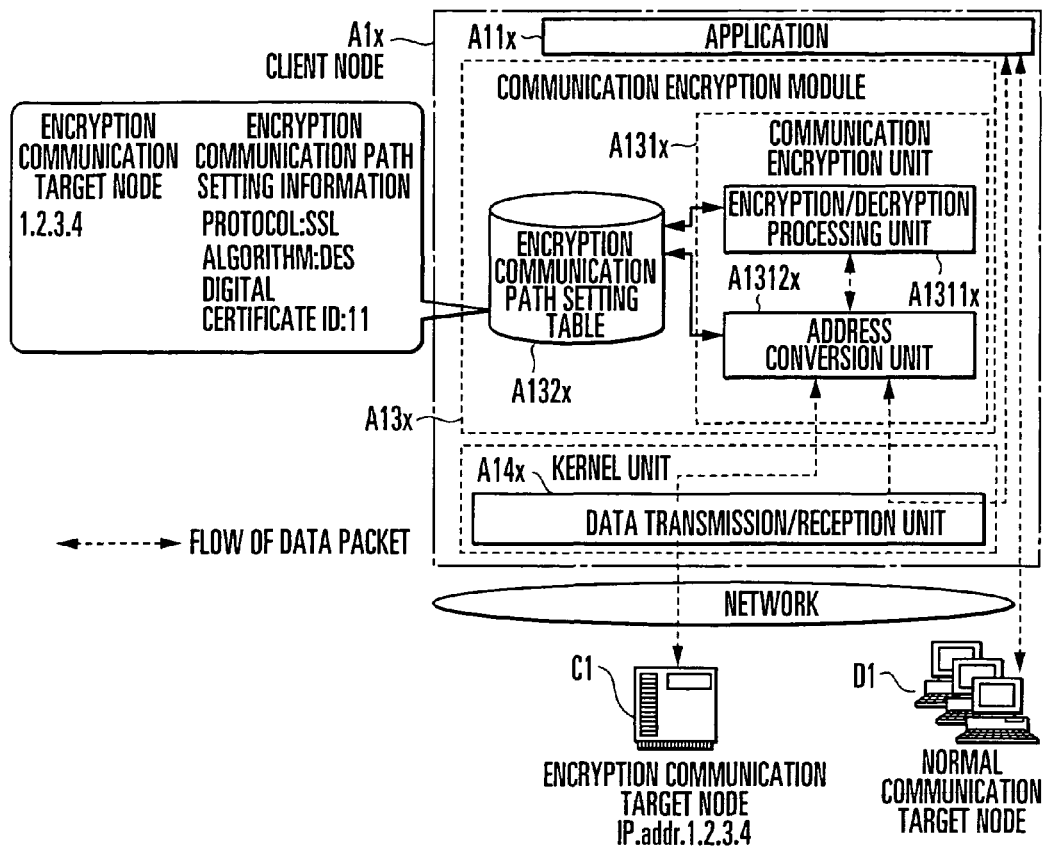
FIG. 25 is a view showing the arrangement of a conventional encryption communication system using a communication encryption module.
Figure 26:
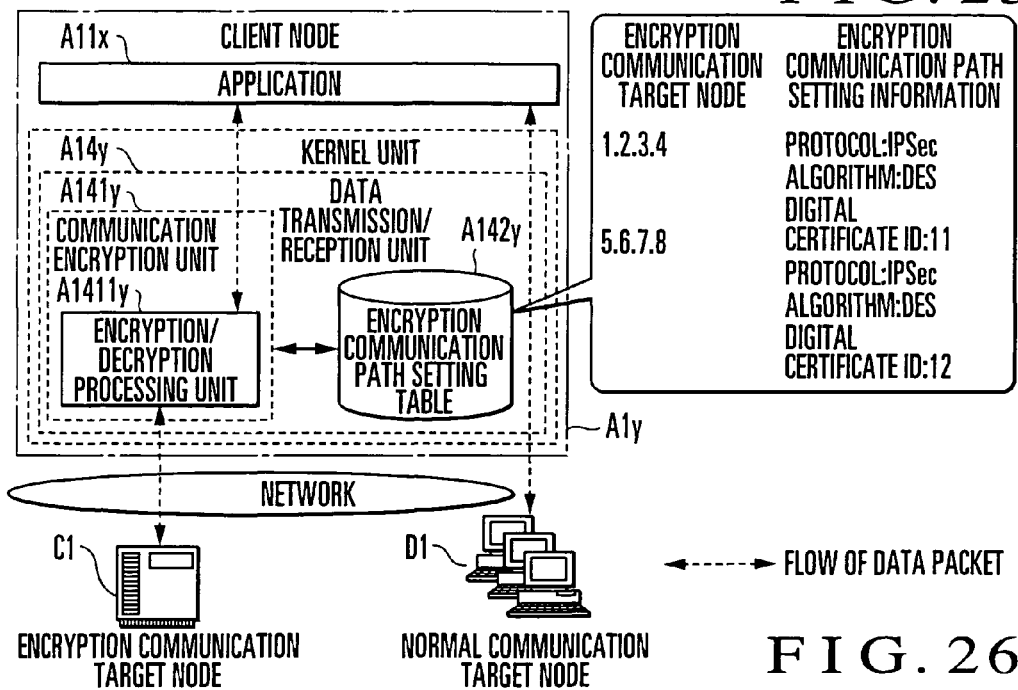
FIG. 26 is a view showing the arrangement of a conventional encryption communication system using the communication encryption function of the kernel unit of an OS.

The communication encryption node F1α shown in FIG. 24 comprises the communication encryption module A13α that operates as an independent process, the data transmission/reception unit A14α provided in the kernel unit, and the name resolution proxy unit A12α which relays a name resolution query transmitted from the application of the client node to the name resolution server to resolve the IP address of another node apparatus and a name resolution response as the response to the query.

The data transmission/reception unit A14α comprises the redirection table A142α which holds the correspondence between an intercept address and a loopback address, and the redirection unit A141α which receives a data packet transmitted from the application of the client node and having an intercept address set as the destination address, reads out, from the redirection table A142α a loopback address corresponding to the intercept address set as the destination address of the data packet, and rewrites the destination address of the data packet to the readout loopback address, thereby redirecting the data packet to the communication encryption module A13α.

The communication encryption module A13α comprises the encryption communication path setting table A132α which holds the correspondence between a communication partner IP address, loopback address, and encryption communication path setting information, and the communication encryption unit A131α which reads out, from the encryption communication path setting table A132α, encryption communication path setting information and a communication partner IP address corresponding to the loopback address set as the destination address of the data packet redirected from the data transmission/reception unit A14α, and encrypts, in accordance with the readout encryption communication path setting information, the data packet having the readout communication partner IP address set as the destination address and transmits the data packet.

The name resolution proxy unit A12α comprises the CUG setting table A125α which holds the correspondence between encryption communication path setting information and a domain name condition to specify an encryption communication target node, the communication method resolution unit A122α which determines whether the domain name of the other node apparatus contained in a name resolution query or name resolution response matches any one of domain name conditions held in the CUG setting table A125α, the encryption communication path setting unit A123α which registers, in the encryption communication path setting table A132α, the correspondence between the encryption communication path setting information corresponding to the matched domain name condition, the IP address of the other node apparatus resolved by the name resolution response, and the loopback address that is not used in any other communication session, and registers, in the encryption communication path setting table A142α, the correspondence between the loopback address in the correspondence and an intercept address that is not used in any other communication session, and the name resolution query/response transmission/reception unit A121α which replaces the IP address of the other node apparatus contained in the name resolution response received from the name resolution server with the intercept address in the correspondence and transmits the name resolution response to the application.

Even when the encryption communication node has the arrangement of the communication encryption node F1α shown in FIG. 24, the resolution (1) can be executed by the DNS server B1b, as in the third embodiment of the present invention. In this case, the DNS server has the same arrangement as that of the DNS server B1b shown in FIG. 11 described in the third embodiment of the present invention. The DNS Proxy unit A12α in the communication encryption node F1α includes a DNS query/response transmission/reception unit, encryption communication path setting unit, and DNS server address setting table, like the DNS Proxy unit F12d shown in FIG. 17. The DNS query/response transmission/reception unit transmits, to the name resolution server, a name resolution query transmitted from the application to resolve the IP address of another node apparatus, receives, from the name resolution server, a name resolution response containing a determination result indicating whether the other node apparatus is an encryption communication target node, encryption communication path setting information, and the IP address of the other node apparatus, and if the other node apparatus is an encryption communication target node, replaces the IP address of the other node apparatus contained in the name resolution response with an intercept address in the correspondence between the encryption communication path setting information, the IP address of the other node apparatus resolved by the name resolution response, and an intercept address that is not used in any other communication session and transmits the name resolution response to the client node apparatus. The encryption communication path setting unit registers, in the encryption communication path setting table, the correspondence between the encryption communication path setting information, the IP address of the other node apparatus resolved by the name resolution response, and communication partner identification information that is not used in any other communication session when the other node apparatus is an encryption communication target node, and registers, in the redirection table, the correspondence between the rewrite rule of communication partner identification information that is not used in any other communication session and an intercept address that is not used in any other communication session.

The effects of this embodiment will be described next. In this embodiment, the same effects as in the sixth embodiment can be obtained. In addition, since the type of the communication partner is determined by intercepting a DNS message, the type of the communication partner can be determined on the basis of the domain name. Hence, the identification information of an encryption communication target node can be designated by a domain name.

The embodiments of the present invention have been described above. The present invention is not limited to the above-described embodiments, and various changes and modifications can be made. The functions of the client node apparatus, communication encryption node apparatus, and name resolution server of the present invention can be implemented by hardware or by a computer and program. The program is recorded on a computer-readable recording medium such as a magnetic disk and semiconductor memory and read out by a computer in activating it. The computer is caused to function as the client node apparatus, communication encryption node apparatus, and name resolution server of the above-described embodiments by controlling the operation of the computer.

The invention claimed is:

1. An encryption communication method in which an application in a node apparatus communicates with another node apparatus in a network, the method comprising:

determining, by a processor, on a basis of a domain name contained in one of a name resolution query transmitted from the application to resolve an IP address of said other node apparatus and a name resolution response as a response to the name resolution query, whether said other node apparatus is an encryption communication target node;

registering, in a first encryption communication path setting table, a correspondence between the IP address of said other node apparatus and a loopback address that is not used in any other communication session when said other node apparatus is the encryption communication target node;

replacing the IP address of said other node apparatus contained in the name resolution response with the loopback address in the correspondence and transmit the name resolution response to the application;

transmitting by the application a data packet in which the loopback address serving as an IP address for closed communication in a self node is set as a destination address; and;

receiving, by a communication encryption module operating as an independent process, the data packet having the loopback address set as the destination address and transmitted from the application, read out a communication partner IP address corresponding to the loopback address set as the destination address of the data packet from the first encryption communication path setting table that holds a plurality of correspondences between the communication partner IP address and the loopback address, rewrite the destination address of the data packet to the readout communication partner IP address, and encrypt and transmit the data packet.

2. An encryption communication method according to claim 1, further comprising:

determining on a basis of the IP address of said other node apparatus whether said other node apparatus is an encryption communication target node.

3. An encryption communication method according to claim 1, further comprising:

transmitting, by the application, a data packet in which the IP address of said other node apparatus is set as the destination address; and receiving, by a data transmission/reception unit provided in a kernel unit, the data packet having the IP address of said other node apparatus set as the destination address and transmitted from the application and, if the communication partner IP address set as the destination address of the data packet is registered in a second encryption communication path setting table that holds a communication partner IP address, encrypt and transmit the data packet.

4. An encryption communication method according to claim 3, further comprising:
- if said other node apparatus is the encryption communication target node, determining which of the communication encryption module and the data transmission/reception unit should encrypt communication;
- registering, in the first encryption communication path setting table, the correspondence between the IP address of said other node apparatus and the loopback address that is not used in any other communication session if it is determined that the communication encryption module should encrypt communication, and
- registering, in the second encryption communication path setting table, the IP address of said other node apparatus contained in the name resolution response if it is determined that the data transmission/reception unit should encrypt communication; and
- replacing the IP address of said other node apparatus contained in the name resolution response with the loopback address in the correspondence and transmit the name resolution response to the application if it is determined that the communication encryption module should encrypt communication, and
- transmitting the name resolution response containing the IP address of said other node apparatus to the application, if it is determined that the data transmission/reception unit should encrypt communication.

5. An encryption communication method characterized by comprising:
- determining, by a processor, on a basis of a domain name contained in one of a name resolution query transmitted from an application on a client node apparatus to resolve an IP address of another node apparatus and a name resolution response as a response to the name resolution query whether said other node apparatus is an encryption communication target node;
- registering, in the first encryption communication path setting table, a correspondence between the IP address of said other node apparatus and a first intercept address that is not used in any other communication session when said other node apparatus is the encryption communication target node;
- transmitting, to the application as the name resolution response, the first intercept address corresponding to the IP address of said other node apparatus contained in the name resolution response;
- transmitting, by the application on the client node apparatus, a data packet in which the first intercept address is set as a destination address, the application executing encryption communication with said other node apparatus connected to a network; and
- receiving, by a communication encryption module provided in a communication encryption node and operating as an independent process, the data packet having the first intercept address set as the destination address and transmitted from the application, reading out a communication partner IP address corresponding to the first intercept address set as the destination address of the data packet from the first encryption communication path setting table that holds a plurality of correspondences between the communication partner IP address and the first intercept address, and encrypting and transmitting the data packet in which the readout communication partner IP address is set as the destination address of the data packet.

6. An encryption communication method according to claim 5, further comprising:
- determining on a basis of an IP address of said other node apparatus whether said other node apparatus is the encryption communication target node.

7. An encryption communication method according to claim 5, further comprising:
- transmitting, by the application, a data packet in which a second intercept address is set as the destination address; and
- receiving, by a data transmission/reception unit provided in a kernel unit of the communication encryption node, the data packet having the second intercept address set as the destination address and transmitted from the application and, read out the communication partner IP address corresponding to the second intercept address set as the destination address of the data packet from a second encryption communication path setting table that holds a plurality of correspondences between the communication partner IP address and the second intercept address, and encrypt and transmit the data packet in which the readout communication partner IP address is set as the destination address of the data packet.

8. An encryption communication method according to claim 7, further comprising:
- if the another node apparatus is the encryption communication target node, determining which of the communication encryption module and the data transmission/reception unit should encrypt communication;
- registering, in the first encryption communication path setting table, the correspondence between the IP address of said other node apparatus and the first intercept address that is not used in any other communication session if it is determined that communication encryption module should encrypt communication, and
- registering, in the second encryption communication path setting table, the correspondence between the IP address of said other node apparatus and the second intercept address that is not used in any other communication session if it is determined that the data transmission/reception unit should encrypt communication; and
- replacing the IP address of said other node apparatus contained in the name resolution response with the first intercept address in the correspondence and transmit the name resolution response to the application if it is determined that the communication encryption module should encrypt communication, and
- replacing the IP address of said other node apparatus contained in the name resolution response with the second intercept address in the correspondence, and transmit the name resolution response to the application if it is determined that the data transmission/reception unit should encrypt communication.

9. An encryption communication method comprising:
- determining, by a processor, on a basis of a domain name contained in one of a name resolution query transmitted from an application on a client node apparatus to resolve an IP address of another node apparatus and a name resolution response as a response to the name resolution query whether said other node apparatus is an encryption communication target node;
- registering, in a redirection table, a criterion to determine a data packet to be encrypted and a rewrite rule of a communication partner identification information and registering, in an encryption communication path setting table, a correspondence between the rewrite rule of the communication partner identification information of the data packet and the IP address of said other node apparatus of the application when said other node apparatus is the encryption communication target node;

transmitting, by the application a data packet in which the IP address of said other node apparatus is set as a destination address, the application executing encryption communication with said other node apparatus connected to a network;

intercepting, by a redirection unit provided in a data transmission/reception unit of a kernel unit, the data packet transmitted from the application to said other node apparatus, looking up the redirection table that holds the criterion to determine a data packet to be encrypted and the rewrite rule of communication partner identification information, determining on a basis of the criterion held in the redirection table whether the data packet is the data packet to be encrypted, and if the data packet is the data packet to be encrypted, rewriting predetermined information of the data packet in accordance with the rewrite rule and redirecting the data packet to a communication encryption module; and rewriting the communication partner identification information of the data packet redirected from the data transmission/reception unit by looking up the encryption communication path setting table that stores the correspondence between the rewrite rule of the communication partner identification information of the data packet redirected from the data transmission/reception unit and the IP address of said other node apparatus of the application, encrypting the data packet in which the destination IP address of said other node apparatus is set, and transmitting the data packet to said other node apparatus.

10. An encryption communication method according to claim 9, further comprising:

determining on a basis of the IP address of said other node apparatus whether said other node apparatus is an encryption communication target node.

11. An encryption communication method characterized by comprising:

determining, on a basis of a domain name contained in one of a name resolution query transmitted from an application on a client node apparatus to resolve an IP address of another node apparatus and a name resolution response as a response to the name resolution query whether said other node apparatus is an encryption communication target node; and registering, in the redirection table, a criterion to determine a data packet to be encrypted and a rewrite rule of a communication partner identification information, and registering, in an encryption communication path setting table, a correspondence between the rewrite rule of the communication partner identification information of the data packet and the IP address of said other node apparatus of the application when said other node apparatus is the encryption communication target node;

transmitting, by the application, the data packet in which an intercept address corresponding to an IP address of said other node apparatus is set as a destination address, the application executing encryption communication with said other node apparatus connected to a network;

intercepting, by a redirection unit provided in a data transmission/reception unit of a kernel unit in a communication encryption node, the data packet transmitted from the application, looking up a redirection table that holds the criterion to determine a data packet to be encrypted and the rewrite rule of communication partner identification information, determining on the basis of the criterion held in the redirection table whether the data packet is the data packet to be encrypted, and if the data packet is the data packet to be encrypted, rewriting predetermined information of the data packet in accordance with the rewrite rule and redirecting the data packet to a communication encryption module provided in the communication encryption node; and rewriting the communication partner identification information of the data packet redirected from the data transmission/reception unit by looking up the encryption communication path setting table that stores the correspondence between the rewrite rule of the communication partner identification information of the data packet redirected from the data transmission/reception unit and the IP address of said other node apparatus of the application, encrypting the data packet in which the destination IP address of said other node apparatus is set, and transmitting the data packet to said other node apparatus.

12. An encryption communication method according to claim 11, further comprising:

determining on a basis of the IP address of said other node apparatus whether said other node apparatus is an encryption communication target node.

13. A node apparatus characterized by comprising:

an application that communicates with another node apparatus connected to a network; and a communication encryption module which operates as an independent process, said communication encryption module comprising a first encryption communication path setting table which holds a correspondence between a communication partner IP address and a loopback address serving as an IP address for closed communication in a self node, a first communication encryption unit which receives the data packet having the loopback address set as the destination address and transmitted from said application, reads out a communication partner IP address corresponding to the loopback address set as the destination address of the data packet from said first encryption communication path setting table, rewrites the destination address of the data packet to the readout communication partner IP address, and encrypts and transmits the data packet;

a communication method resolution unit which determines on the basis of a domain name contained in one of a name resolution query transmitted from said application to resolve an IP address of said other node apparatus and a name resolution response as a response to the name resolution query whether said other node apparatus is an encryption communication target node;

an encryption communication path setting unit which registers, in said first encryption communication path setting table, a correspondence between the IP address of said other node apparatus and a loopback address that is not used in any other communication session when said other node apparatus is the encryption communication target node; and a name resolution query/response transmission/reception unit which replaces the IP address of said other node apparatus contained in the name resolution response with the loopback address in the correspondence and transmits the name resolution response to said application.

14. A node apparatus according to claim 13, wherein said first encryption communication path setting table holds a plurality of correspondences between the communication partner IP address and the loopback address.

15. A node apparatus according to claim 14, wherein
the communication method resolution unit determines on a basis of the IP address of said other node apparatus whether said other node apparatus is an encryption communication target node.

16. A node apparatus according to claim 13, comprising:
a name resolution proxy unit which relays the name resolution query transmitted from said application to a name resolution server to resolve the IP address of said other node apparatus and the name resolution response as the response to the name resolution query,
wherein said first encryption communication path setting table holds encryption communication path setting information to be used for communication with a communication partner in correspondence with the communication partner IP address and the loopback address,
said first communication encryption unit reads out, from said first encryption communication path setting table, encryption communication path setting information corresponding to the loopback address set as the destination address of the received data packet, encrypts the data packet in accordance with the readout encryption communication path setting information, and transmits the data packet, and
said name resolution proxy unit comprises
a setting table which holds a correspondence between a domain name condition to specify an encryption communication target node and encryption communication path setting information,
the communication method resolution unit which determines whether a domain name of said other node apparatus contained in one of the name resolution query and the name resolution response matches any one of domain name conditions held in said setting table,
the encryption communication path setting unit which registers, in said first encryption communication path setting table, a correspondence between encryption communication path setting information corresponding to the matched domain name condition, the IP address of said other node apparatus resolved by the name resolution response, and a loopback address that is not used in any other communication session, and
the name resolution query/response transmission/reception unit which replaces the IP address of said other node apparatus contained in the name resolution response received from the name resolution server with the loopback address in the correspondence and transmits the name resolution response to said application.

17. A node apparatus according to claim 13, further comprising:
a name resolution proxy unit which relays the name resolution query transmitted from said application to a name resolution server to resolve the IP address of said other node apparatus and the name resolution response as the response to the name resolution query,
wherein said first encryption communication path setting table holds encryption communication path setting information to be used for communication with a communication partner in correspondence with the communication partner IP address and the loopback address,
said first communication encryption unit reads out, from said first encryption communication path setting table, encryption communication path setting information corresponding to the loopback address set as the destination address of the received data packet, encrypts the data packet in accordance with the readout encryption communication path setting information, and transmits the data packet, and
said name resolution proxy unit comprises
a setting table which holds a correspondence between an IP address condition to specify an encryption communication target node and encryption communication path setting information,
the communication method resolution unit which determines whether the IP address of said other node apparatus contained in the name resolution response matches any one of IP address conditions held in said setting table,
the encryption communication path setting unit which registers, in said first encryption communication path setting table, a correspondence between encryption communication path setting information corresponding to the matched IP address condition, the IP address of said other node apparatus resolved by the name resolution response, and a loopback address that is not used in any other communication session, and
the name resolution query/response transmission/reception unit which replaces the IP address of said other node apparatus contained in the name resolution response received from the name resolution server with the loopback address in the correspondence and transmits the name resolution response to said application.

18. A node apparatus according to claim 13, further comprising a data transmission/reception unit provided in a kernel unit,
said data transmission/reception unit comprising:
a second encryption communication path setting table which holds a communication partner IP address, and
a second communication encryption unit which receives the data packet transmitted from said application and encrypts and transmits the data packet when a communication partner IP address set as the destination address of the data packet is registered in said second encryption communication path setting table.

19. A node apparatus according to claim 13, further comprising:
a name resolution proxy unit which relays the name resolution query transmitted from said application to a name resolution server to resolve the IP address of said other node apparatus and the name resolution response as the response to the name resolution query,
wherein said first encryption communication path setting table holds encryption communication path setting information to be used for communication with a communication partner in correspondence with the communication partner IP address and the loopback address,
said first communication encryption unit reads out, from said first encryption communication path setting table, encryption communication path setting information corresponding to the loopback address set as the destination address of the received data packet, encrypts the data packet in accordance with the readout encryption communication path setting information, and transmits the data packet, and
said name resolution proxy unit comprises
the name resolution query/response transmission/reception unit which transmits, to the name resolution server, the name resolution query transmitted from said application to resolve the IP address of said other node apparatus, receives, from the name resolution server, the name resolution response containing a determination result indicating whether said other node apparatus is an encryption communication target node, encryption communication path setting information, and the IP address of said other node apparatus, replaces the IP address of said other node apparatus contained in the name resolution response with the loopback address in the correspondence between the IP address of said other node apparatus and a loopback address that is not used in any other communication session, and transmits the name resolution response to said application if it is determined that said other node apparatus is the encryption communication target node, and the encryption communication path setting unit which registers, in said first encryption communication path setting table, the correspondence between the IP address of said other node apparatus, the encryption communication path setting information, and the loopback address that is not used in any other communication session if it is determined that said other node apparatus is the encryption communication target node.

20. A node apparatus according to claim 14, further comprising:

a data transmission/reception unit provided in a kernel unit; and a name resolution proxy unit which relays the name resolution query transmitted from said application to a name resolution server to resolve the IP address of said other node apparatus and the name resolution response as the response to the name resolution query, said data transmission/reception unit comprising a second encryption communication path setting table which holds a communication partner IP address, and a communication encryption unit which receives the data packet transmitted from said application and encrypts and transmits the data packet when a communication partner IP address set as the destination address of the data packet is registered in said second encryption communication path setting table, and said name resolution proxy unit comprising a name resolution query/response transmission/reception unit which transmits, to the name resolution server, the name resolution query transmitted from said application to resolve the IP address of said other node apparatus, receives, from the name resolution server, the name resolution response containing the IP address of said other node apparatus and a determination result indicating whether said other node apparatus is an encryption communication target node, and if said other node apparatus is the encryption communication target node, which of said communication encryption module and said data transmission/reception unit should encrypt communication, replaces the IP address of said other node apparatus contained in the name resolution response with the loopback address in the correspondence between the IP address of said other node apparatus and a loopback address that is not used in any other communication session, and transmits the name resolution response to said application if it is determined that said other node apparatus is the encryption communication target node, and said communication encryption module should encrypt communication, and an encryption communication path setting unit which registers, in said first encryption communication path setting table, the correspondence between the IP address of said other node apparatus and the loopback address that is not used in any other communication session if it is determined that said other node apparatus is the encryption communication target node, and said communication encryption module should encrypt communication, and registers, in said second encryption communication path setting table, the IP address of said other node apparatus contained in the name resolution response if it is determined that said other node apparatus is the encryption communication target node, and said data transmission/reception unit should encrypt communication.

21. A node apparatus according to claim 13, further comprising:

a data transmission/reception unit provided in a kernel unit; and a name resolution proxy unit which relays the name resolution query transmitted from said application to a name resolution server to resolve the IP address of said other node apparatus and the name resolution response as the response to the name resolution query, wherein said first encryption communication path setting table holds encryption communication path setting information to be used for communication with a communication partner in correspondence with the communication partner IP address and the loopback address, said first communication encryption unit reads out, from said first encryption communication path setting table, encryption communication path setting information corresponding to the loopback address set as the destination address of the received data packet, encrypts the data packet in accordance with the readout encryption communication path setting information, and transmits the data packet, said data transmission/reception unit comprises a second encryption communication path setting table which holds a correspondence between a communication partner IP address and encryption communication path setting information, and a second communication encryption unit which receives the data packet transmitted from said application, when a communication partner IP address set as the destination address of the data packet is registered in said second encryption communication path setting table, reads out corresponding encryption communication path setting information from said second encryption communication path setting table, encrypts the data packet in accordance with the readout encryption communication path setting information, and transmits the data packet, and said name resolution proxy unit comprises the name resolution query/response transmission/reception unit which transmits, to the name resolution server, the name resolution query transmitted from said application to resolve the IP address of said other node apparatus, receives, from the name resolution server, the name resolution response containing encryption communication path setting information, the IP address of said other node apparatus, and a determination result indicating whether said other node apparatus is an encryption communication target node, and if said other node apparatus is the encryption communication target node, which of said communication encryption module and said data transmission/reception unit should encrypt communication, replaces the IP address of said other node apparatus contained in the name resolution response with the loopback address in the correspondence between the IP address of said other node apparatus and a loopback address that is not used in any other communication session, and transmits the name resolution response to said application if it is determined that said other node apparatus is the encryption communication target node, and said communication encryption module should encrypt communication, and an encryption communication path setting unit which registers, in said first encryption communication path setting table, the correspondence between the IP address of said other node apparatus, the loopback address that is not used in any other communication session, and the encryption communication path setting information if it is determined that said other node apparatus is the encryption communication target node, and said communication encryption module should encrypt communication, and registers, in said second encryption communication path setting table, the correspondence between the IP address of said other node apparatus contained in the name resolution response and the encryption communication path setting information if it is determined that said other node apparatus is the encryption communication target node, and said data transmission/reception unit should encrypt communication.

22. A node apparatus comprising:

an application that communicates with another node apparatus connected to a network;

a communication encryption module which operates as an independent process; and a data transmission/reception unit provided in a kernel unit, said data transmission/reception unit comprising a redirection table which holds a criterion to determine a data packet to be encrypted and a rewrite rule of communication partner identification information, and a redirection unit which intercepts a data packet transmitted from said application to said other node apparatus, determines on the basis of the criterion held in the redirection table whether the data packet is the data packet to be encrypted, and if the data packet is the data packet to be encrypted, rewrites predetermined information of the data packet in accordance with the rewrite rule and redirects the data packet to said communication encryption module, and said communication encryption module comprising an encryption communication path setting table which holds a correspondence between the rewrite rule of the communication partner identification information of the data packet redirected from said data transmission/reception unit and an IP address of said other node apparatus of said application;

a communication encryption unit which rewrites the communication partner identification information of the data packet redirected from said data transmission/reception unit by looking up the encryption communication path setting table, encrypts the data packet in which a destination IP address of said other node apparatus is set, and transmits the data packet to said other node apparatus;

a communication method resolution unit which determines on the basis of a domain name contained in one of a name resolution query transmitted from said application to resolve an IP address of said other node apparatus and a name resolution response as a response to the name resolution query whether said other node apparatus is an encryption communication target node; and an encryption communication path setting unit which registers, in said redirection table, the criterion to determine the data packet to be encrypted and the rewrite rule of the communication partner identification information, and registers, in said encryption communication path setting table, a correspondence between the rewrite rule of the communication partner identification information of the data packet and the IP address of said other node apparatus of said application when said other node apparatus is the encryption communication target node.

23. A node apparatus according to claim 22, wherein said redirection table holds a correspondence between an IP address of an encryption communication target node and a loopback address serving as an IP address for closed communication in a self node, said redirection unit redirects the data packet to said communication encryption module when a loopback address corresponding to an IP address set as a destination address of the intercepted data packet is held in said redirection table by rewriting the destination address of the data packet to the corresponding loopback address, said encryption communication path setting table holds a correspondence between a communication partner IP address, a loopback address, and encryption communication path setting information to be used for communication with a communication partner, and said communication encryption unit reads out, from said encryption communication path setting table, encryption communication path setting information and a communication partner IP address corresponding to the loopback address set as the destination address of the data packet redirected from said data transmission/reception unit, rewrites the destination address of the data packet to the readout communication partner IP address, encrypts the data packet in accordance with the readout encryption communication path setting information, and transmits the data packet.

24. A node apparatus according to claim 22, further comprising a name resolution proxy unit which relays the name resolution query transmitted from said application to a name resolution server to resolve the IP address of said other node apparatus and the name resolution response as the response to the name resolution query, wherein said redirection table holds a correspondence between an IP address of an encryption communication target node and the rewrite rule of the communication partner identification information, said redirection unit determines whether the data packet is an encryption target by comparing a destination IP address of the intercepted data packet with the IP address of the encryption communication target node held in said redirection table, and if the data packet is the encryption target, redirects the data packet to said communication encryption module by rewriting the communication partner identification information of the data packet in accordance with the rewrite rule of corresponding communication partner identification information on said redirection table and rewriting the destination address of the data packet to a loopback address serving as an IP address for closed communication in a self node, said encryption communication path setting table holds a correspondence between a communication partner IP address, communication partner identification information, and encryption communication path setting information to be used for communication with a communication partner, and said communication encryption unit reads out, from said encryption communication path setting table, encryption communication path setting information and a communication partner IP address corresponding to the communication partner identification information of the data packet redirected from said data transmission/reception unit, rewrites the destination address of the data packet to the readout communication partner IP address, encrypts the data packet in accordance with the readout encryption communication path setting information, and transmits the data packet, and said name resolution proxy unit comprises a name resolution query/response transmission/reception unit which transmits, to the name resolution server, the name resolution query transmitted from said application to resolve the IP address of said other node apparatus, receives, from the name resolution server, the name resolution response containing a determination result indicating whether said other node apparatus is an encryption communication target node, encryption communication path setting information, and the IP address of said other node apparatus, and transmits the IP address of said other node apparatus contained in the name resolution response to said application as the name resolution response, and the encryption communication path setting unit which registers, in said encryption communication path setting table, the correspondence between the IP address of said other node apparatus, the communication partner identification information that is not used in any other communication session, and the encryption communication path setting information, and registers, in said redirection table, the correspondence between an IP address of an encryption communication target node and a rewrite rule of communication partner identification information that is not used in any other communication session when said other node apparatus is the encryption communication target node.

25. A communication encryption node apparatus connected, through a network, to a client node apparatus in which an application that communicates with another node apparatus connected to the network operates, comprising:

a communication encryption module which operates as an independent process, said communication encryption module comprising a first encryption communication path setting table which holds a correspondence between a communication partner IP address and a first intercept address, and a first communication encryption unit which receives a data packet having the first intercept address set as a destination address and transmitted from the application, reads out, from said first encryption communication path setting table, a communication partner IP address corresponding to the first intercept address set as the destination address of the data packet, and encrypts and transmits the data packet in which the readout communication partner IP address is set as the destination address of the data packet;

a communication method resolution unit which determines on the basis of a domain name contained in a name resolution query transmitted from the application to resolve an IP address of said other node apparatus and a name resolution response as a response to the name resolution query whether said other node apparatus is an encryption communication target node;

an encryption communication path setting unit which registers, in said first encryption communication path setting table, a correspondence between the IP address of said other node apparatus and a first intercept address that is not used in any other communication session when said other node apparatus is the encryption communication target node; and a name resolution query/response transmission/reception unit which transmits, to the application as the name resolution response, the first intercept address corresponding to the IP address of said other node apparatus contained in the name resolution response.

26. A communication encryption node apparatus according to claim 25, wherein said first encryption communication path setting table holds a plurality of correspondences between the communication partner IP address and the first intercept address.

27. A communication encryption node apparatus according to claim 26, wherein:

the communication method resolution unit further determines on the basis of an IP address of said other node apparatus whether said other node apparatus is an encryption communication target node.

28. A communication encryption node apparatus according to claim 25, further comprising a name resolution proxy unit which relays the name resolution query transmitted from the application to a name resolution server to resolve the IP address of said other node apparatus and the name resolution response as the response to the name resolution query, wherein said first encryption communication path setting table holds encryption communication path setting information to be used for communication with a communication partner in correspondence with the communication partner IP address and the first intercept address, said first communication encryption unit reads out, from said first encryption communication path setting table, encryption communication path setting information corresponding to the first intercept address set as the destination address of the received data packet, encrypts the data packet in accordance with the readout encryption communication path setting information, and transmits the data packet, and said name resolution proxy unit comprises a setting table which holds a correspondence between a domain name condition to specify an encryption communication target node and encryption communication path setting information, the communication method resolution unit which further determines whether a domain name of said other node apparatus contained in one of the name resolution query and the name resolution response matches any one of domain name conditions held in said setting table, the encryption communication path setting unit which further registers, in said first encryption communication path setting table, a correspondence between encryption communication path setting information corresponding to the matched domain name condition, the IP address of said other node apparatus resolved by the name resolution response, and a first intercept address that is not used in any other communication session, and the name resolution query/response transmission/reception unit which further transmits, to the application as the name resolution response, a first intercept address corresponding to the IP address of said other node apparatus contained in the name resolution response received from the name resolution server.

29. A communication encryption node apparatus according to claim 25, further comprising:

a name resolution proxy unit which relays the name resolution query transmitted from the application to a name resolution server to resolve the IP address of said other node apparatus and the name resolution response as the response to the name resolution query, wherein said first encryption communication path setting table holds encryption communication path setting information to be used for communication with a communication partner in correspondence with the communication partner IP address and the first intercept address, said first communication encryption unit reads out, from said first encryption communication path setting table, encryption communication path setting information corresponding to the first intercept address set as the destination address of the received data packet, encrypts the data packet in accordance with the readout encryption communication path setting information, and transmits the data packet, and said name resolution proxy unit comprises a setting table which holds a correspondence between an IP address condition to specify an encryption communication target node and encryption communication path setting information, the communication method resolution unit which further determines whether an IP address of said other node apparatus contained in the name resolution response matches any one of IP address conditions held in said setting table, the encryption communication path setting unit which further registers, in said first encryption communication path setting table, a correspondence between encryption communication path setting information corresponding to the matched IP address condition, the IP address of said other node apparatus resolved by the name resolution response, and a first intercept address that is not used in any other communication session, and the name resolution query/response transmission/reception unit which further transmits, to the application as the name resolution response, a first intercept address corresponding to the IP address of said other node apparatus contained in the name resolution response received from the name resolution server.

30. A communication encryption node apparatus according to claim 25, further comprising:

a data transmission/reception unit provided in a kernel unit, said data transmission/reception unit comprising:

a second encryption communication path setting table which holds a correspondence between a communication partner IP address and a second intercept address, and a communication encryption unit which receives the data packet having a second intercept address set as a destination address and transmitted from the application, reads out, from said second encryption communication path setting table, a communication partner IP address corresponding to the second intercept address set as the destination address of the data packet, and encrypts and transmits the data packet in which the readout communication partner IP address is set as the destination address of the data packet.

31. A communication encryption node apparatus connected, through a network, to a client node apparatus in which an application that communicates with another node apparatus connected to the network operates, comprising:

a communication encryption module which operates as an independent process;

a data transmission/reception unit provided in a kernel unit; and a name resolution proxy unit which relays a name resolution query transmitted from the application to a name resolution server to resolve an IP address of said other node apparatus and a name resolution response as a response to the name resolution query, said data transmission/reception unit comprising a redirection table which holds a correspondence between an intercept address and a loopback address serving as an IP address for closed communication in a self node, and a redirection unit which receives a data packet having the intercept address set as a destination address and transmitted from the application, reads out, from said redirection table, a loopback address corresponding to the intercept address set as the destination address of the data packet, and redirects the data packet to said communication encryption module by rewriting the destination address of the data packet to the readout loopback address, said communication encryption module comprising an encryption communication path setting table which holds a correspondence between a communication partner IP address, a loopback address, and encryption communication path setting information to be used for communication with a communication partner, and a communication encryption unit which reads out, from said encryption communication path setting table, encryption communication path setting information and a communication partner IP address corresponding to the loopback address set as the destination address of the data packet redirected from said data transmission/reception unit, encrypts the data packet in which the readout communication partner IP address is set as the destination address of the data packet in accordance with the readout encryption communication path setting information, and transmits the data packet, and said name resolution proxy unit comprising a setting table which holds a correspondence between a specifying condition to specify an encryption communication target node and encryption communication path setting information, a communication method resolution unit which determines whether information of said other node apparatus contained in one of the name resolution query and the name resolution response matches any one of specifying conditions held in said setting table, an encryption communication path setting unit which registers, in said encryption communication path setting table, a correspondence between encryption communication path setting information corresponding to the matched specifying condition, the IP address of said other node apparatus resolved by the name resolution response, and a loopback address that is not used in any other communication session, and registers, in said redirection table, a correspondence between the loopback address in the correspondence and an intercept address that is not used in any other communication session, and a name resolution query/response transmission/reception unit which transmits, to the application as the name resolution response, an intercept address corresponding to the IP address of said other node apparatus contained in the name resolution response received from the name resolution server.

32. A communication encryption node apparatus according to claim 31, wherein said setting table holds a domain name condition as the specifying condition, said communication method resolution unit determines whether a domain name of said other node apparatus contained in one of the name resolution query and the name resolution response matches any one of domain name conditions held in said setting table, and said encryption communication path setting unit registers, in said encryption communication path setting table, a correspondence between encryption communication path setting information corresponding to the matched domain name condition, the IP address of said other node apparatus resolved by the name resolution response, and a loopback address that is not used in any other communication session.

33. A communication encryption node apparatus according to claim 31, wherein said setting table holds an IP address condition as the specifying condition, said communication method resolution unit determines whether an IP address of said other node apparatus contained in the name resolution response matches any one of IP address conditions held in said setting table, and said encryption communication path setting unit registers, in said encryption communication path setting table, a correspondence between encryption communication path setting information corresponding to the matched IP address condition, the IP address of said other node apparatus resolved by the name resolution response, and a loopback address that is not used in any other communication session.

34. A communication encryption node apparatus connected, through a network, to a client node apparatus in which an application that communicates with another node apparatus connected to the network operates, comprising:

a communication encryption module which operates as an independent process;

a data transmission/reception unit provided in a kernel unit; and a name resolution proxy unit which relays a name resolution query transmitted from the client node to a name resolution server to resolve an IP address of said other node apparatus and a name resolution response as a response to the name resolution query, said data transmission/reception unit comprising a redirection table which holds a correspondence between an intercept address and a rewrite rule of communication partner identification information, and a redirection unit which intercepts a data packet transmitted from the client node apparatus to said other node apparatus, and redirects the data packet to said communication encryption module by rewriting the communication partner identification information of the data packet in accordance with the rewrite rule of the communication partner identification information corresponding to an intercept address designated as a destination address of the data packet upon looking up said redirection table and by rewriting the destination address of the data packet to a loopback address serving as an IP address for closed communication in a self node, said communication encryption module comprising an encryption communication path setting table which holds a correspondence between a communication partner IP address, communication partner identification information, and encryption communication path setting information to be used for communication with a communication partner, and a communication encryption unit which reads out, from said encryption communication path setting table, encryption communication path setting information and a communication partner IP address corresponding to the communication partner identification information of the data packet redirected from said data transmission/reception unit, rewrites the destination address of the other node apparatus to the readout communication partner IP address, encrypts the data packet in accordance with the readout encryption communication path setting information, and transmits the data packet, and said name resolution proxy unit comprising a name resolution query/response transmission/reception unit which transmits, to the name resolution server, the name resolution query transmitted from the application to resolve the IP address of said other node apparatus, receives, from the name resolution server, the name resolution response containing a determination result indicating whether said other node apparatus is an encryption communication target node, encryption communication path setting information, and the IP address of said other node apparatus, replaces the IP address of said other node apparatus contained in the name resolution response with the intercept address in the correspondence between the encryption communication path setting information, the IP address of said other node apparatus resolved by the name resolution response, and an intercept address that is not used in any other communication session, and transmits the name resolution response to the client node apparatus if said other node apparatus is an encryption communication target node, and an encryption communication path setting unit which registers, in said encryption communication path setting table, a correspondence between the encryption communication path setting information, the IP address of said other node apparatus resolved by the name resolution response, and communication partner identification information that is not used in any other communication session, and registers, in said redirection table, a correspondence between a rewrite rule to the communication partner identification information that is not used in any other communication session and the intercept address that is not used in any other communication session if said other node apparatus is the encryption communication target node.

35. A name resolution server, for a name resolution query to resolve an IP address corresponding to a domain name, whether communication to be executed in a query source of the name resolution query by using a response result to the name resolution query is a target to be encrypted is identified on a basis of the domain name, and if it is determined that the communication is an encryption communication target, a name resolution response containing information necessary for the encryption communication in addition to the IP address corresponding to the domain name is returned, wherein the name resolution server comprises:

a name resolution query/response transmission/reception unit which transmits/receives the name resolution query and the name resolution response as a response to the name resolution query, and a communication method resolution unit which identifies for the name resolution query on the basis of the domain name whether the communication to be executed in the query source of the name resolution query by using the response result to the name resolution query is the target to be encrypted, wherein for the name resolution query received by said name resolution query/response transmission/reception unit, said communication method resolution unit identifies on the basis of information contained in one of the name resolution query and the response to the name resolution query whether the communication to be executed in the query source of the name resolution query by using the response result to the name resolution query is the encryption communication target, and if it is determined that the communication is the encryption communication target, said name resolution query/response transmission/reception unit returns the name resolution response containing information necessary for the encryption communication in addition to the IP address corresponding to the domain name.

36. An encryption communication system comprising:

a node apparatus in which an application that communicates with another node apparatus connected to a network operates; and a name resolution server to cause the application to resolve an IP address of said other node apparatus, said node apparatus comprising a communication encryption module which operates as an independent process, and said communication encryption module comprising a first encryption communication path setting table which holds a correspondence between a communication partner IP address and a loopback address serving as an IP address for closed communication in a self node, and a first communication encryption unit which receives a data packet having the loopback address set as a destination address and transmitted from the application, reads out, from said first encryption communication path setting table, a communication partner IP address corresponding to the loopback address set as the destination address of the data packet, rewrites the destination address of the data packet to the readout communication partner IP address, and encrypts and transmits the data packet, wherein said name resolution server comprises a communication method resolution unit which determines on the basis of a domain name contained in one of a name resolution query transmitted from the application to resolve an IP address of said other node apparatus and a name resolution response as a response to the name resolution query whether said other node apparatus is an encryption communication target node, and said node apparatus further comprises an encryption communication path setting unit which registers, in said first encryption communication path setting table, a correspondence between the IP address of said another other node apparatus and a loopback address that is not used in any other communication session if it is determined that said other node apparatus is the encryption communication target node, and a name resolution query/response transmission/reception unit which replaces the IP address of said other node apparatus contained in the name resolution response with the loopback address in the correspondence and transmits the name resolution response to the application.

37. An encryption communication system according to claim 36, wherein said name resolution server comprises a communication method resolution unit which determines on the basis of an IP address of said other node apparatus whether said other node apparatus is an encryption communication target node.

38. An encryption communication system characterized by comprising:

a client node apparatus in which an application that communicates with another node apparatus connected to a network operates;

a communication encryption node apparatus connected to said client node apparatus through the network; and a name resolution server to cause the application to resolve an IP address of said other node apparatus, said communication encryption node apparatus comprising a communication encryption module which operates as an independent process, and a name resolution proxy unit which relays the name resolution query transmitted from the application to said name resolution server to resolve the IP address of said other node apparatus and the name resolution response as the response to the name resolution query, and said communication encryption module comprising a first encryption communication path setting table which holds a correspondence between a communication partner IP address and a first intercept address, and a first communication encryption unit which receives a data packet having the first intercept address set as a destination address and transmitted from the application, reads out, from said first encryption communication path setting table, a communication partner IP address corresponding to the first intercept address set as the destination address of the data packet, and encrypts and transmits the data packet in which the readout communication partner IP address is set as the destination address of the data packet, wherein said name resolution server comprises a communication method resolution unit which determines on the basis of an IP address of said other node apparatus whether said other node apparatus is an encryption communication target node, and said name resolution proxy unit of said communication encryption node apparatus comprises an encryption communication path setting unit which registers, in said first encryption communication path setting table, a correspondence between the IP address of said other node apparatus and a first intercept address that is not used in any other communication session when said other node apparatus is the encryption communication target node; and a name resolution query/response transmission/reception unit which transmits, to the application as the name resolution response, the first intercept address corresponding to the IP address of said other node apparatus contained in the name resolution response.

39. An encryption communication system comprising:

a node apparatus in which an application that communicates with another node apparatus connected to a network operates; and a name resolution server to cause the application to resolve an IP address of said other node apparatus, said node apparatus comprising a communication encryption module which operates as an independent process, a data transmission/reception unit provided in a kernel unit, and a name resolution proxy unit which relays a name resolution query transmitted from the application to said name resolution server to resolve an IP address of said other node apparatus and a name resolution response as a response to the name resolution query, said data transmission/reception unit comprising a redirection table which holds a correspondence between an IP address of an encryption communication target node and a rewrite rule of communication partner identification information, and a redirection unit which intercepts a data packet transmitted from the application to said other node apparatus, determines whether the data packet is an encryption target by comparing a destination IP address of the data packet with the IP address of the encryption communication target node registered in said redirection table, and if the data packet is the encryption target, redirects the data packet to said communication encryption module by rewriting the communication partner identification information of the data packet in accordance with the rewrite rule of the corresponding communication partner identification information on the redirection table and rewriting the destination address of the data packet to a loopback address serving as an IP address for closed communication in a self node, said communication encryption module comprising an encryption communication path setting table which holds a correspondence between a communication partner IP address, communication partner identification information, and encryption communication path setting information to be used for communication with a communication partner, and a communication encryption unit which reads out, from said encryption communication path setting table, encryption communication path setting information and a communication partner IP address corresponding to the communication partner identification information of the data packet redirected from said data transmission/reception unit, rewrites the destination address of the other node apparatus to the readout communication partner IP address, encrypts the data packet in accordance with the readout encryption communication path setting information, and transmits the data packet, and said name resolution server comprising, in addition to a function related to name resolution, a setting table which holds a correspondence between a specifying condition to specify an encryption communication target node and encryption communication path setting information, a communication method resolution unit which determines whether information of said other node apparatus contained in one of the name resolution query and the name resolution response matches any one of specifying conditions held in said setting table, and a name resolution response/query transmission/reception unit which adds encryption communication path setting information corresponding to the matched specifying condition to the name resolution response and transmits the name resolution response, and said name resolution proxy unit comprising an encryption communication path setting unit which registers, in said encryption communication path setting table, a correspondence between the encryption communication path setting information, the IP address of said other node apparatus resolved by the name resolution response, and communication partner identification information that is not used in any other communication session, and registers, in said redirection table, a correspondence between IP address of the encryption communication target node and a rewrite rule of communication partner identification information that is not used in any other communication session upon receiving the name resolution response added the encryption communication path setting information from said name resolution server, and a name resolution query/response transmission/reception unit which transmits, to the application as the name resolution response, the IP address of said other node apparatus contained in the name resolution response received from said name resolution server.

40. An encryption communication system comprising:

a client node apparatus in which an application that communicates with another node apparatus connected to a network operates;

a communication encryption node apparatus connected to said client node apparatus through the network; and a name resolution server to cause the application to resolve an IP address of said other node apparatus, said communication encryption node apparatus comprising a communication encryption module which operates as an independent process, a data transmission/reception unit provided in a kernel unit, and a name resolution proxy unit which relays a name resolution query transmitted from the client node to a name resolution server to resolve an IP address of said other node apparatus and a name resolution response as a response to the name resolution query, said data transmission/reception unit comprising a redirection table which holds a correspondence between an intercept address and a rewrite rule of communication partner identification information, and a redirection unit which intercepts a data packet transmitted from the client node apparatus to said other node apparatus, and redirects the data packet to said communication encryption module by rewriting the communication partner identification information of the data packet in accordance with the rewrite rule of the communication partner identification information corresponding to an intercept address designated as a destination address of the data packet upon looking up said redirection table and by rewriting the destination address of the data packet to a loopback address serving as an IP address for closed communication in a self node, said communication encryption module comprising an encryption communication path setting table which holds a correspondence between a communication partner IP address, communication partner identification information, and encryption communication path setting information to be used for communication with a communication partner, and a communication encryption unit which reads out, from said encryption communication path setting table, encryption communication path setting information and a communication partner IP address corresponding to the communication partner identification information of the data packet redirected from said data transmission/reception unit, rewrites the destination address of the other node apparatus to the readout communication partner IP address, encrypts the data packet in accordance with the readout encryption communication path setting information, and transmits the data packet, said name resolution server comprising, in addition to a function related to name resolution, a setting table which holds a correspondence between a specifying condition to specify an encryption communication target node and encryption communication path setting information, a communication method resolution unit which determines whether information of said other node apparatus contained in one of the name resolution query and the name resolution response matches any one of specifying conditions held in said setting table, and a name resolution response/query transmission/reception unit which adds encryption communication path setting information corresponding to the matched specifying condition to the name resolution response and transmits the name resolution response, and said name resolution proxy unit comprising an encryption communication path setting unit which registers, in said encryption communication path setting table, a correspondence between the encryption communication path setting information, the IP address of said other node apparatus resolved by the name resolution response, and communication partner identification information that is not used in any other communication session, and registers, in said redirection table, a correspondence between a rewrite rule of communication partner identification information that is not used in any other communication session and an intercept address that is not used in any other communication session upon receiving the name resolution response added the encryption communication path setting information from said name resolution server, and a name resolution query/response transmission/reception unit which replaces the IP address of said other node apparatus contained in the name resolution response received from said name resolution server with the intercept address in the correspondence and transmits the name resolution response to said client node apparatus.

41. A non-transitory computer readable storage medium which stores a program, which causes a computer included in a node apparatus in which an application that communicates with another node apparatus connected to a network operates, to function as communication encryption means provided in a communication encryption module which operates as an independent process, and name resolution proxy means for relaying a name resolution query transmitted from the application to a name resolution server to resolve an IP address of said other node apparatus and a name resolution response as a response to the name resolution query, wherein said communication encryption means receives a data packet transmitted from the application, in which a loopback address serving as an IP address for closed communication in a self node is set as a destination address, reads out a communication partner IP address corresponding to the loopback address set as the destination address of the data packet from a first encryption communication path setting table that holds a plurality of correspondences between the communication partner IP address and the loopback address, rewrites the destination address of the data packet to the readout communication partner IP address, and encrypts and transmits the data packet wherein said name resolution proxy means comprises:

communication method resolution means for determining on the basis of a domain name contained in one of the name resolution query transmitted from the application to resolve the IP address of said other node apparatus and the name resolution response as the response to the name resolution query whether said other node apparatus is an encryption communication target node, encryption communication path setting means for registering, in the first encryption communication path setting table, a correspondence between the IP address of said other node apparatus and a loopback address that is not used in any other communication session when said other node apparatus is the encryption communication target node, and name resolution query/response transmission/reception means for replacing the IP address of said other node apparatus contained in the name resolution response with the loopback address in the correspondence and transmitting the name resolution response to the application.

42. The computer readable storage medium according to claim 41, wherein the communication method resolution means further determining on the basis of the IP address of said other node apparatus whether said other node apparatus is an encryption communication target node.

43. The computer readable storage medium according to claim 41, wherein said name resolution proxy means comprises name resolution query/response transmission/reception means for transmitting, to the name resolution server, the name resolution query transmitted from the application to resolve the IP address of said other node apparatus, receiving, from the name resolution server, the name resolution response containing a determination result indicating whether said other node apparatus is an encryption communication target node and the IP address of said other node apparatus, replacing the IP address of said other node apparatus contained in the name resolution response with the loopback address in the correspondence between the IP address of said other node apparatus and a loopback address that is not used in any other communication session, and transmitting the name resolution response to the application if it is determined that said other node apparatus is the encryption communication target node, and encryption communication path setting means for registering, in the first encryption communication path setting table, the correspondence between the IP address of said other node apparatus and the loopback address that is not used in any other communication session if it is determined that said other node apparatus is the encryption communication target node.

44. A non-transitory computer-readable storage medium which stores a program, which causes a computer included in a communication encryption node apparatus connected, through a network, to a client node apparatus in which an application that communicates with another node apparatus connected to the network operates, to function as communication encryption means provided in a communication encryption module which operates as an independent process, and name resolution proxy means for relaying a name resolution query transmitted from the application to a name resolution server to resolve an IP address of said other node apparatus and a name resolution response as a response to the name resolution query, wherein said communication encryption means receives a data packet having a first intercept address set as a destination address and transmitted from the application, reads out a communication partner IP address corresponding to the first intercept address set as the destination address of the data packet from a first encryption communication path setting table that holds a plurality of correspondences between the communication partner IP address and the first intercept address, and encrypts and transmits the data packet in which the readout communication partner IP address is set as the destination address of the data packet, wherein said name resolution proxy means comprises:

communication method resolution means for determining on the basis of a domain name contained in the name resolution query transmitted from the application to resolve the IP address of said other node apparatus and the name resolution response as the response to the name resolution query whether said other node apparatus is an encryption communication target node, encryption communication path setting means for registering, in the first encryption communication path setting table, a correspondence between the IP address of said other node apparatus and a first intercept address that is not used in any other communication session when said other node apparatus is the encryption communication target node, and name resolution query/response transmission/reception means for replacing the IP address of said other node apparatus contained in the name resolution response with the first intercept address in the correspondence and transmitting the name resolution response to the application.

45. The computer readable storage medium according to claim 44, wherein said name resolution proxy means comprises:

communication method resolution means for determining on the basis of the IP address of said other node apparatus whether said other node apparatus is an encryption communication target node.

46. The computer readable storage medium according to claim 44, wherein said name resolution proxy means comprises:

the name resolution query/response transmission/reception means further transmitting, to the name resolution server, the name resolution query transmitted from the application to resolve the IP address of said other node apparatus, receiving, from the name resolution server, the name resolution response containing a determination result indicating whether said other node apparatus is an encryption communication target node and the IP address of said other node apparatus, replacing the IP address of said other node apparatus contained in the name resolution response with the first intercept address in the correspondence between the IP address of said other node apparatus and a first intercept address that is not used in any other communication session, and transmitting the name resolution response to the application if it is determined that said other node apparatus is the encryption communication target node, and the encryption communication path setting means for further registering, in the first encryption communication path setting table, the correspondence between the IP address of said other node apparatus and the first intercept address that is not used in any other communication session if it is determined that said other node apparatus is the encryption communication target node.

47. The computer readable storage medium according to claim 44, wherein said communication encryption means receives the data packet having the first intercept address set as the destination address and transmitted from the application, reads out encryption communication path setting information and a communication partner IP address corresponding to the first intercept address set as the destination address of the data packet from the first encryption communication path setting table that holds the correspondence between a communication partner IP address, a first intercept address, and encryption communication path setting information, encrypts the data packet in which the readout communication partner IP address is set as the destination address of the data packet in accordance with the readout encryption communication path setting information, and transmits the data packet, and said name resolution proxy means comprises the name resolution query/response transmission/reception means for further transmitting, to the name resolution server, the name resolution query transmitted from the application to resolve the IP address of said other node apparatus, receiving, from the name resolution server, the name resolution response containing a determination result indicating whether said other node apparatus is an encryption communication target node, encryption communication path setting information, and the IP address of said other node apparatus, replacing the IP address of said other node apparatus contained in the name resolution response with the first intercept address in the correspondence between the IP address of said other node apparatus, the encryption communication path setting information, and a first intercept address that is not used in any other communication session, and transmitting the name resolution response to the application if it is determined that said other node apparatus is the encryption communication target node, and the encryption communication path setting means for further registering, in the first encryption communication path setting table, the correspondence between the IP address of said other node apparatus, the first intercept address that is not used in any other communication session, and the encryption communication path setting information if said other node apparatus is the encryption communication target node.

48. A non-transitory computer-readable storage medium which stores a program, which causes a computer included in a node apparatus in which an application that communicates with another node apparatus connected to a network operates, to function as communication encryption means provided in a communication encryption module which operates as an independent process, a redirection means provided in a data transmission/reception unit of a kernel unit, and name resolution proxy means for relaying a name resolution query transmitted from the application to a name resolution server to resolve an IP address of said other node apparatus and a name resolution response as a response to the name resolution query, wherein said redirection means intercepts a data packet transmitted from the application to said other node apparatus, determines on the basis of a criterion held in a redirection table that holds the criterion to determine a data packet to be encrypted and a rewrite rule of communication partner identification information whether the data packet is the data packet to be encrypted, and if the data packet is the data packet to be encrypted, rewrites predetermined information of the data packet in accordance with the rewrite rule and redirects the data packet to the communication encryption module, and said communication encryption means rewrites the communication partner identification information of the data packet redirected from the data transmission/reception unit by looking up an encryption communication path setting table that holds a correspondence between the rewrite rule of the communication partner identification information of the data packet redirected from the data transmission/reception unit and an IP address of said other node apparatus of the application, encrypts the data packet in which a destination IP address of said other node apparatus is set, and transmits the data packet to said other node apparatus, wherein said name resolution proxy means comprises:

communication method resolution means for determining on the basis of a domain name contained in the name resolution query transmitted from the application to resolve the IP address of said other node apparatus and the name resolution response as the response to the name resolution query whether said other node apparatus is an encryption communication target node, encryption communication path setting means for registering, in the first encryption communication path setting table, a correspondence between the IP address of said other node apparatus and a first intercept address that is not used in any other communication session when said other node apparatus is the encryption communication target node, and name resolution query/response transmission/reception means for replacing the IP address of said other node apparatus contained in the name resolution response with the first intercept address in the correspondence and transmitting the name resolution response to the application.

49. A non-transitory computer-readable storage medium which stores a program, which causes a computer included in a communication encryption node apparatus connected, through a network, to a client node apparatus in which an application that communicates with another node apparatus connected to the network operates, to function as:

communication encryption means provided in a communication encryption module which operates as an independent process, redirection means provided in a data transmission/reception unit of a kernel unit, and name resolution proxy means for relaying a name resolution query transmitted from the application to a name resolution server to resolve an IP address of said other node apparatus and a name resolution response as a response to the name resolution query, wherein said redirection means receives a data packet having an intercept address set as a destination address and transmitted from the application, reads out, from a redirection table that holds a correspondence between an intercept address and a loopback address, a loopback address corresponding to the intercept address set as the destination address of the data packet, and redirects the data packet to the communication encryption module by rewriting the destination address of the data packet to the readout loopback address, and said communication encryption means reads out, from an encryption communication path setting table that holds a correspondence between a communication partner IP address, a loopback address, and encryption communication path setting information, encryption communication path setting information and a communication partner IP address corresponding to the loopback address set as the destination address of the data packet redirected from the data transmission/reception unit, encrypts the data packet in which the readout communication partner IP address is set as the destination address of the data packet in accordance with the readout encryption communication path setting information, and transmits the data packet wherein said name resolution proxy means comprises:

communication method resolution means for determining on the basis of a domain name contained in the name resolution query transmitted from the application to resolve the IP address of said other node apparatus and the name resolution response as the response to the name resolution query whether said other node apparatus is an encryption communication target node, encryption communication path setting means for registering, in the first encryption communication path setting table, a correspondence between the IP address of said other node apparatus and a first intercept address that is not used in any other communication session when said other node apparatus is the encryption communication target node, and name resolution query/response transmission/reception means for replacing the IP address of said other node apparatus contained in the name resolution response with the first intercept address in the correspondence and transmitting the name resolution response to the application.

50. A non-transitory computer-readable storage medium which stores a program which causes a computer included in a node apparatus in which an application that communicates with another node apparatus connected to a network operates, to function as communication encryption means provided in a communication encryption module which operates as an independent process, redirection means provided in a data transmission/reception unit of a kernel unit, and name resolution proxy means for relaying a name resolution query transmitted from the application to a name resolution server to resolve an IP address of said other node apparatus and a name resolution response as a response to the name resolution query, wherein said redirection means intercepts a data packet transmitted from the application to said other node apparatus, determines whether the data packet is an encryption target by comparing a destination IP address of the intercepted data packet with an IP address of an encryption communication target node held in a redirection table that holds a correspondence between an IP address of an encryption communication target node and a rewrite rule of communication partner identification information, and if the data packet is the encryption target, redirects the data packet to the communication encryption module by rewriting the communication partner identification information of the data packet in accordance with the rewrite rule of corresponding communication partner identification information on the redirection table and rewriting the destination address of the data packet to a loopback address serving as an IP address for closed communication in a self node, said communication encryption means reads out, from an encryption communication path setting table that holds a correspondence between a communication partner IP address, communication partner identification information, and encryption communication path setting information, encryption communication path setting information and a communication partner IP address corresponding to the communication partner identification information of the data packet redirected from the data transmission/reception unit, rewrites the destination address of the data packet to the readout communication partner IP address, encrypts the data packet in accordance with the readout encryption communication path setting information, and transmits the data packet, and said name resolution proxy means comprises name resolution query/response transmission/reception means for transmitting, to the name resolution server, the name resolution query transmitted from the application to resolve the IP address of said other node apparatus, receiving, from the name resolution server, the name resolution response containing a determination result indicating whether said other node apparatus is an encryption communication target node, encryption communication path setting information, and the IP address of said other node apparatus, and transmitting, to the application as the name resolution response, the IP address of said other node apparatus contained in the name resolution response, and encryption communication path setting means for registering, in the encryption communication path setting table, the correspondence between the IP address of said other node apparatus, the communication partner identification information that is not used in any other communication session, and the encryption communication path setting information, and registering, in the redirection table, the correspondence between an IP address of an encryption communication target node and a rewrite rule of communication partner identification information that is not used in any other communication session when said other node apparatus is the encryption communication target node.

51. A non-transitory computer-readable storage medium which stores a program which causes a computer included in a communication encryption node apparatus connected, through a network, to a client node apparatus in which an application that communicates with another node apparatus connected to the network operates, to function as communication encryption means provided in a communication encryption module which operates as an independent process, redirection means provided in a data transmission/reception unit of a kernel unit, and name resolution proxy means for relaying a name resolution query transmitted from the client node to a name resolution server to resolve an IP address of said other node apparatus and a name resolution response as a response to the name resolution query, wherein said redirection means intercepts a data packet transmitted from the client node apparatus to said other node apparatus, and redirects the data packet to the communication encryption module by rewriting communication partner identification information of the data packet in accordance with a rewrite rule of communication partner identification information corresponding to an intercept address designated as a destination address of the data packet while looking up a redirection table that holds a correspondence between an intercept address and a rewrite rule of communication partner identification information, and rewriting the destination address of the data packet to a loopback address serving as an IP address for closed communication in a self node, said communication encryption means reads out, from an encryption communication path setting table that holds a correspondence between a communication partner IP address, communication partner identification information, and encryption communication path setting information, encryption communication path setting information and a communication partner IP address corresponding to the communication partner identification information of the data packet redirected from the data transmission/reception unit, rewrites the destination address of the data packet to the readout communication partner IP address, encrypts the data packet in accordance with the readout encryption communication path setting information, and transmits the data packet, and said name resolution proxy means comprises name resolution query/response transmission/reception means for transmitting, to the name resolution server, the name resolution query transmitted from the application to resolve the IP address of said other node apparatus, receiving, from the name resolution server, the name resolution response containing a determination result indicating whether said other node apparatus is an encryption communication target node, encryption communication path setting information, and the IP address of said other node apparatus, and if said other node apparatus is the encryption communication target node, replacing the IP address of said other node apparatus contained in the name resolution response to the intercept address in a correspondence between the encryption communication path setting information, the IP address of said other node apparatus resolved by the name resolution response, and an intercept address that is not used in any other communication session, and transmitting the name resolution response to the client node apparatus, and encryption communication path setting means for registering, in the encryption communication path setting table, the correspondence between the encryption communication path setting information, the IP address of said other node apparatus resolved by the name resolution response, and the communication partner identification information that is not used in any other communication session, and registering, in the redirection table, the correspondence between a rewrite rule of communication partner identification information that is not used in any other communication session and the intercept address that is not used in any other communication session when said other node apparatus is the encryption communication target node.

52. A non-transitory computer-readable storage medium which stores a program which causes a computer included in a name resolution server to function as:

name resolution query/response transmission/reception means for transmitting/receiving a name resolution query to resolve an IP address corresponding to a domain name and a name resolution response as a response to the name resolution query; and communication method resolution means for identifying for the name resolution query on the basis of the domain name whether communication to be executed in a query source of the name resolution query by using a response result to the name resolution query is a target to be encrypted, for the name resolution query received by said name resolution query/response transmission/reception means, said communication method resolution means identifying on the basis of information contained in one of the name resolution query and the response to the name resolution query whether the communication to be executed in the query source of the name resolution query by using the response result to the name resolution query is the encryption communication target, and if it is determined that the communication is the encryption communication target, returning, through said name resolution query/response transmission/reception unit, the name resolution response containing information necessary for the encryption communication in addition to the IP address corresponding to the domain name.

53. A name resolution server according to claim 52, wherein said communication method resolution means identifies whether the communication to be executed in the query source of the name resolution query by using the response result to the name resolution query is the encryption communication target by checking whether the domain name for name resolution matches the domain name set on a database in which at least part of the domain name as the encryption communication target is set.

* * * * *

UNITED STATES PATENT AND TRADEMARK OFFICE
CERTIFICATE OF CORRECTION

PATENT NO. : 8,356,169 B2  
APPLICATION NO. : 10/585997  
DATED : January 15, 2013  
INVENTOR(S) : Yuichi Ishikawa et al.

Page 1 of 1

It is certified that error appears in the above-identified patent and that said Letters Patent is hereby corrected as shown below:

In the Claims

Column 59, Line 29: In Claim 5, after "method" delete "characterized by".

Column 61, Line 38: In Claim 11, after "method" delete "characterized by".

Column 62, Line 24: In Claim 13, after "apparatus" delete "characterized by".

Column 76, Line 1: In Claim 38, after "system" delete "characterized by".

Signed and Sealed this  
Sixth Day of August, 2013

Teresa Stanek Rea  
*Acting Director of the United States Patent and Trademark Office*